(12) United States Patent
Hannuksela

(10) Patent No.: US 12,022,117 B2
(45) Date of Patent: Jun. 25, 2024

(54) APPARATUS, A METHOD AND A COMPUTER PROGRAM FOR VIDEO CODING AND DECODING

(71) Applicant: Nokia Technologies Oy, Espoo (FI)

(72) Inventor: Miska Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/121,729

(22) Filed: Mar. 15, 2023

(65) Prior Publication Data

US 2023/0276073 A1    Aug. 31, 2023

Related U.S. Application Data

(63) Continuation of application No. 17/419,080, filed as application No. PCT/FI2019/050925 on Dec. 30, 2019, now Pat. No. 11,671,625.

(30) Foreign Application Priority Data

Jan. 2, 2019 (FI) .................................. 20195001

(51) Int. Cl.
  H04N 19/597 (2014.01)
  H04N 19/119 (2014.01)
  (Continued)

(52) U.S. Cl.
  CPC ......... H04N 19/597 (2014.11); H04N 19/119 (2014.11); H04N 19/167 (2014.11);
  (Continued)

(58) Field of Classification Search
  CPC .. H04N 19/188; H04N 19/177; H04N 19/167; H04N 19/119; H04N 19/597
  See application file for complete search history.

(56) References Cited

U.S. PATENT DOCUMENTS

2017/0094288 A1*  3/2017  Hannuksela ......... H04N 19/187
2017/0105004 A1*  4/2017  Chen .................... H04N 19/162
(Continued)

FOREIGN PATENT DOCUMENTS

EP       3349467 A1    7/2018

OTHER PUBLICATIONS

"Information technology—Dynamic Adaptive Streaming over HTTP (DASH)—Part 1: Media presentation Description and Segment Formats", ISO/IEC 23009-1, Second Edition, May 15, 2014, 152 pages.
(Continued)

Primary Examiner — On S Mung
(74) Attorney, Agent, or Firm — Harrington & Smith

(57) ABSTRACT

Four or more bitstream versions of a same content are encoded and divided into segments of independently coded tile sets representing multiple spatial regions. First and second bitstreams include independently coded tile sets encoded at a first quality. Third and fourth bitstreams include independently coded tile sets encoded at a second quality. First and third bitstreams have first random access picture interval. Second and fourth bitstreams have second random access picture interval. Independently coded tile sets are grouped into multiple groups of collocated sub-picture tracks, only one of said tile sets per group is intended to be received and/or decoded per any segment. Instruction(s) are generated for merging tile sets of different spatial locations into coded picture(s), causing a tile set originating from a random access picture to be decoded as a tile set originating from a non-random-access picture when merged with a tile set originating from a non-random-access picture.

18 Claims, 20 Drawing Sheets

(51) Int. Cl.
| | |
|---|---|
| H04N 19/167 | (2014.01) |
| H04N 19/169 | (2014.01) |
| H04N 19/177 | (2014.01) |
| H04N 19/46 | (2014.01) |
| H04N 19/593 | (2014.01) |
| H04N 19/70 | (2014.01) |
| H04N 19/85 | (2014.01) |

(52) U.S. Cl.
CPC ......... *H04N 19/177* (2014.11); *H04N 19/188* (2014.11); *H04N 19/46* (2014.11); *H04N 19/593* (2014.11); *H04N 19/70* (2014.11); *H04N 19/85* (2014.11)

(56) References Cited

U.S. PATENT DOCUMENTS

| | | | |
|---|---|---|---|
| 2018/0103199 A1 | 4/2018 | Hendry et al. | |
| 2021/0203942 A1* | 7/2021 | Choi | H04N 19/136 |

OTHER PUBLICATIONS

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.

"High Efficiency Video Coding", Series H: Audiovisual And Multimedia Systems, Infrastructure of audiovisual services—Coding ofmoving video, Recommendationn ITU-T H.265, Feb. 2018, 692 pages.

Schulzrinne et al., "RTP: A Transport Protocol for Real-Time Applications", RFC 3550, network Working Group, Jul. 2003, pp. 1-104.

"Information Technology—Generic coding of moving pictures and associated audio information: Systems", Series H: Audiovisual Anti Multimedia Systems, Infratructure of audiovisual services— Transmission multiplexing and synchronization, Recommendation ITU-T H.222, Mar. 2017, 291 pages.

"Information Technology—Coding Of Audio-Visual Objects—Part 12: ISO Base Media File Format", ISO/IEC 14496-12, Fifth Edition, Dec. 15, 2015, 248 pages.

"Information Technology—Coding Of Audio-Visual Objects—Part 14: MP4 File Format", ISO/IEC 14496-14, First edition, Nov. 15, 2003, 18 pages.

"Information Technology—Coding Of Audio-Visual Objects—Part 15: Advanced Video Coding (AVC) File Format", ISO/ IEC 14496-15, First edition, Apr. 15, 2004, 29 pages.

"3rd Generation Partnershp Project; Technical Specification Group Services and System Aspects; Transparent end-to-end packed switched streaming services (PSS); 3GPP file format (3GP) (Releae 15)", 3GPP TS 26.244, V15.0.0, Jun. 2018, pp. 1-67.

"Video Coding For Low Bit Rate Communication", Series H: Audiovisual And Mutlimedia Systems, Infrastructure of audiovisual services—Coding of moving Video, ITU-T Recommendation H.263, Jan. 2005, 226 pages.

"Parameter Values for Ultra-High Definition Television Systems for Production And International Programme Exchange", Recommendation ITU-R BT.2020, Aug. 2012, 7 pages.

"Parameter Values for the HDTV Standards for Production and International Programme Exchange", Recommendation ITU-R BT.709. 6, Jun. 2015, 19 pages.

"3rd Generation Partnership Project; Technical Specification Group Services and System Aspects; Transparent end-to-end Packet switched Streaming Service (PSS); Protocols and codecs (Release 15)", 3GPP TS 26.234, V15.1.0, Sep. 2018, pp. 1-174.

"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 16)", 3GPP TS 26.247, V16.1.0, Dec. 2018, pp. 1-138.

Moats, "URN Syntax", RFC 2141, Network Working Group, May 1997, pp. 1-8.

Berners-Lee et al., "Uniform Resource Identifier (URI): Generic Syntax", RFC 3986, Network Working Group, Jan. 2005, pp. 1-61.

Wang et al., "WD 3 of ISO/IEC 23090-2 OMAF 2nd edition", Systems, ISO/IEC JTC1/SC29/WG11 N17963-v1, Oct. 2018, 226 pages.

Sanchez et al., "Random access point period optimization for viewport adaptive tile based streaming of 360 video", IEEE International Conference on Image Processing (ICIP), Sep. 17-20, 2017, pp. 1915-1919.

"Versatile Video Coding", Series H: Audiovisual And Multimedia Systems, Infrastructure of audiovisual services—Coding of moving Video, Recommendation ITU-T H.266, Aug. 2020, 516 pages.

"Information Technology—Coded representation of immersive media (MPEG-1)—Part 2: Ominidirectional media format", ISO/IEC, JTC 1/SC29/WG11, ISO/IEC FDIS 23090-2:201x (E), Apr. 26, 2018, 182 pages.

* cited by examiner

APPARATUS, A METHOD AND A COMPUTER PROGRAM FOR VIDEO CODING AND DECODING

TECHNICAL FIELD

The present invention relates to an apparatus, a method and a computer program for video coding and decoding.

BACKGROUND

In viewport-adaptive streaming, the streaming bitrate of virtual reality (VR) video is aimed to be reduced such that a subset of 360-degree video content covering the primary viewport (i.e., the current view orientation) is transmitted at the best quality/resolution, while the remaining of 360-degree video is transmitted at a lower quality/resolution. When the viewing orientation changes, e.g. when the user turns his/her head when viewing the content with a head-mounted display, another version of the content needs to be streamed, matching the new viewing orientation. In general, the new version can be requested starting from a stream access point (SAP). In single-layer video bitstreams, SAPs are intra-coded and hence costly in terms of rate-distortion performance. Conventionally, relatively long SAP intervals in the order of seconds are hence used. Thus, the delay in upgrading the quality after a viewing orientation change (e.g. a head turn) is conventionally in the order of seconds and is therefore clearly noticeable and annoying.

In order to reduce the viewport quality update delay, an approach has been proposed for merging the coded tile rectangles or tile sets from a first Representation having relatively long SAP intervals and from one or more second Representations having more frequent SAPs. In the approach, the tile rectangles at the SAP intervals of the higher quality bitstream are encoded as intra tile rectangles and the tile rectangles at the SAP intervals of the lower quality bitstream are encoded as non-intra tile rectangles.

However, the current video coding standards do not allow mixing of coded video data of random-access pictures and non-random-access pictures into the same coded picture. This set limitations to partial intra updates responding to viewing orientation changes.

SUMMARY

Now in order to at least alleviate the above problems, a method for viewport-dependent streaming is introduced herein.

A method according to a first aspect comprises encoding at least four bitstream versions of a same content divided into segments of independently coded tile sets representing a plurality of spatial regions, wherein a first and a second bitstream comprise independently coded tile sets encoded at a first quality, and a third and a fourth bitstream comprise independently coded tile sets encoded at a second quality, wherein the first and the third bitstream have first random access picture interval and the second and the fourth bitstream have second random access picture interval, which is an integer multiple of the first random access picture interval; grouping the independently coded tile sets of all four bitstreams representing a common spatial region into a plurality of groups of collocated sub-picture tracks, wherein only one of said tile sets per group is intended to be received and/or decoded per any segment; and generating at least one instruction for merging tile sets of different spatial locations into at least one coded picture, the at least one instruction causing a tile set originating from a random access picture to be decoded as a tile set originating from a non-random-access picture when merged with a tile set originating from a non-random-access picture.

An apparatus according to a second aspect comprises means for encoding at least four bitstream versions of a same content divided into segments of independently coded tile sets representing a plurality of spatial regions, wherein a first and a second bitstream comprise independently coded tile sets encoded at a first quality, and a third and a fourth bitstream comprise independently coded tile sets encoded at a second quality, wherein the first and the third bitstream have first random access picture interval and the second and the fourth bitstream have second random access picture interval, which is an integer multiple of the first random access picture interval; means for grouping the independently coded tile sets of all four bitstreams representing a common spatial region into a plurality of groups of collocated sub-picture tracks, wherein only one of said tile sets per group is intended to be received and/or decoded per any segment; and means for generating at least one instruction for merging tile sets of different spatial locations into at least one coded picture, the at least one instruction causing a tile set originating from a random access picture to be decoded as a tile set originating from a non-random-access picture when merged with a tile set originating from a non-random-access picture.

According to an embodiment, the apparatus further comprises means for encapsulating the at least one instruction into a collector track.

According to an embodiment, the apparatus further comprises means for forming a collector representation element in a streaming manifest from the collector track.

According to an embodiment, the apparatus further comprises means for indicating, in the streaming manifest, the first random access picture interval and the second random access picture interval; and means for indicating, in the streaming manifest, a mapping of the first random access picture interval and the second random access picture interval to the sub-picture representation elements.

According to an embodiment, the apparatus further comprises means for including, as said at least one instruction for merging tile sets of different spatial locations into at least one coded picture, an indication into a container file indicating a possibility to rewrite network abstraction layer (NAL) unit types.

According to an embodiment, the apparatus further comprises means for including, as said at least one instruction for merging tile sets of different spatial locations into at least one coded picture, an in-line picture-level indication in the collector track.

According to an embodiment, the apparatus further comprises means for including, as said at least one instruction for merging tile sets of different spatial locations into at least one coded picture, an indication into a file and/or in a Media Presentation Description (MPD) indicating which track or representation contains picture-level syntax structures that apply to all bitstreams.

According to an embodiment, the apparatus further comprises means for indicating a set of switch-point pictures considered as random-access pictures for the first random access picture interval that are not integer multiples of the second random access picture interval as non-random-access pictures, the switch-point pictures being intra-coded and causing the same reference picture selection implications as respective random-access pictures.

A method according to a third aspect comprises obtaining sub-picture tracks representing a plurality of spatial regions and grouping information of the sub-picture tracks, the grouping information being indicative of groups comprising sub-picture tracks of a common spatial resolution, wherein content for one sub-picture track per group is intended to be received and/or decoded per any segment, the content for sub-picture tracks being derived from at least four bitstream versions of a same content divided into segments of independently coded tile sets representing the plurality of spatial regions, wherein a first and a second bitstream comprise independently coded tile sets encoded at a first quality, and a third and a fourth bitstream comprise independently coded tile sets encoded at a second quality, wherein the first and the third bitstream have first random access picture interval and the second and the fourth bitstream have second random access picture interval; selecting sub-picture tracks of different random access picture intervals from groups to be received or decoded for a segment; obtaining or inferring at least one instruction for merging tile sets of different spatial locations into at least one coded picture, the at least one instruction causing a tile set originating from a random access picture to be decoded as a tile set originating from a non-random-access picture when merged with a tile set originating from a non-random-access picture; and processing the at least one instruction to form the at least one coded picture.

An apparatus according to a fourth aspect comprises means for obtaining sub-picture tracks representing a plurality of spatial regions and grouping information of the sub-picture tracks, the grouping information being indicative of groups comprising sub-picture tracks of a common spatial resolution, wherein content for one sub-picture track per group is intended to be received and/or decoded per any segment, the content for sub-picture tracks being derived from at least four bitstream versions of a same content divided into segments of independently coded tile sets representing the plurality of spatial regions, wherein a first and a second bitstream comprise independently coded tile sets encoded at a first quality, and a third and a fourth bitstream comprise independently coded tile sets encoded at a second quality, wherein the first and the third bitstream have first random access picture interval and the second and the fourth bitstream have second random access picture interval; means for selecting sub-picture tracks of different random access picture intervals from groups to be received or decoded for a segment; means for obtaining or inferring at least one instruction for merging tile sets of different spatial locations into at least one coded picture, the at least one instruction causing a tile set originating from a random access picture to be decoded as a tile set originating from a non-random-access picture when merged with a tile set originating from a non-random-access picture; and means for processing the at least one instruction to form the at least one coded picture.

According to an embodiment, the apparatus further comprises means for obtaining the at least one instruction from a collector track.

According to an embodiment, the apparatus further comprises means for obtaining a collector representation element from a streaming manifest.

According to an embodiment, the apparatus further comprises means for inferring, upon receiving network abstraction layer (NAL) units from both random-access and non-random-access pictures for a single time instance, said at least one instruction for merging tile sets of different spatial locations into at least one coded picture.

According to an embodiment, the apparatus further comprises means for inferring, upon receiving NAL units from both random-access and non-random-access pictures for a single time instance, an in-line picture-level indication from the collector track as said at least one instruction for merging tile sets of different spatial locations into at least one coded picture.

Further aspects relate to apparatuses comprising at least one processor and at least one memory, said at least one memory stored with code thereon, which when executed by said at least one processor, causes an apparatus to perform at least the above methods and one or more embodiments related thereto, as described more in detail further below.

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
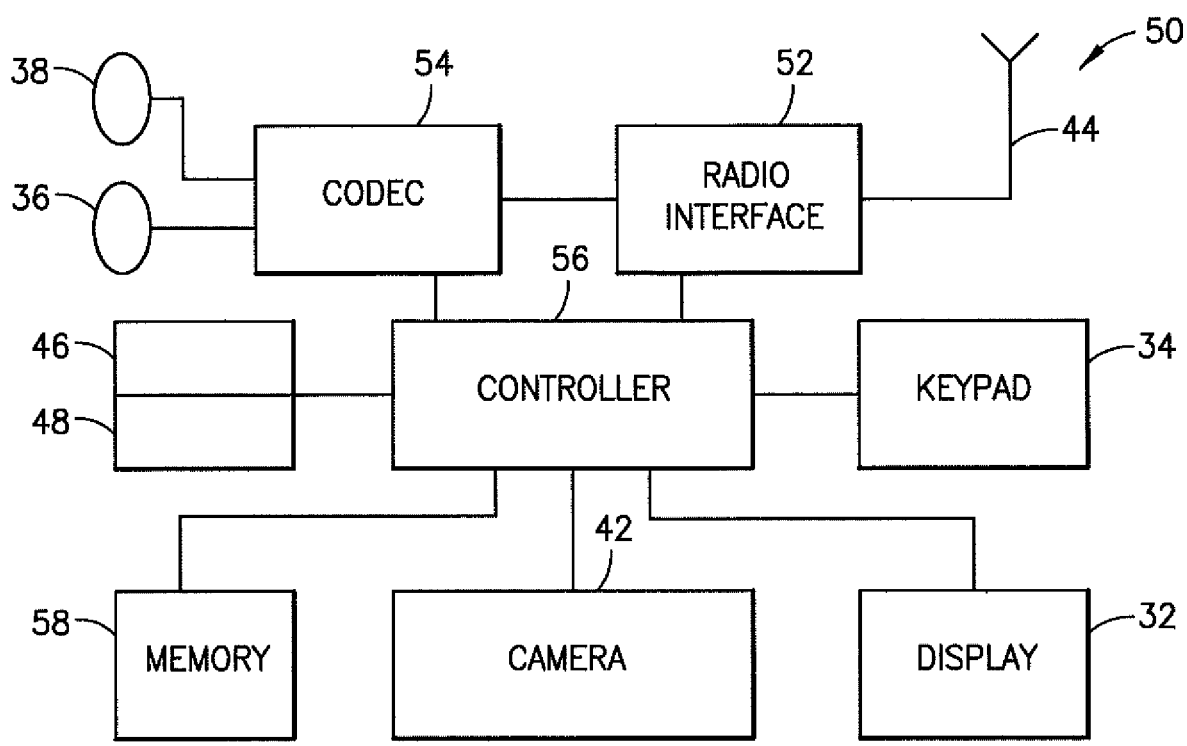
FIG. 1 shows schematically an electronic device employing embodiments of the invention.
Figure 2:
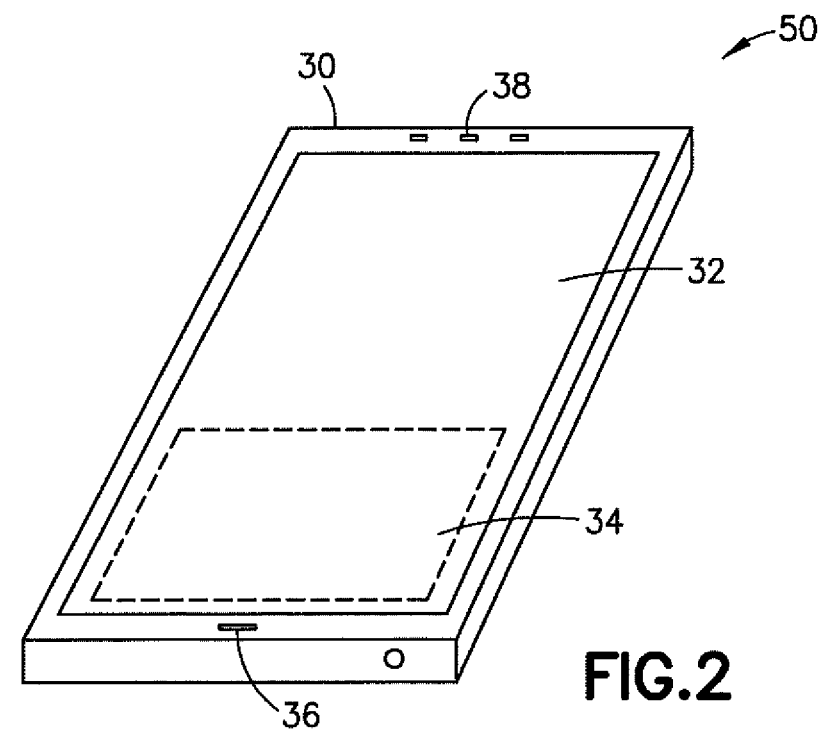
FIG. 2 shows schematically a user equipment suitable for employing embodiments of the invention.

The following describes in further detail suitable apparatus and possible mechanisms for initiating a viewpoint switch. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding.

Figure 3:
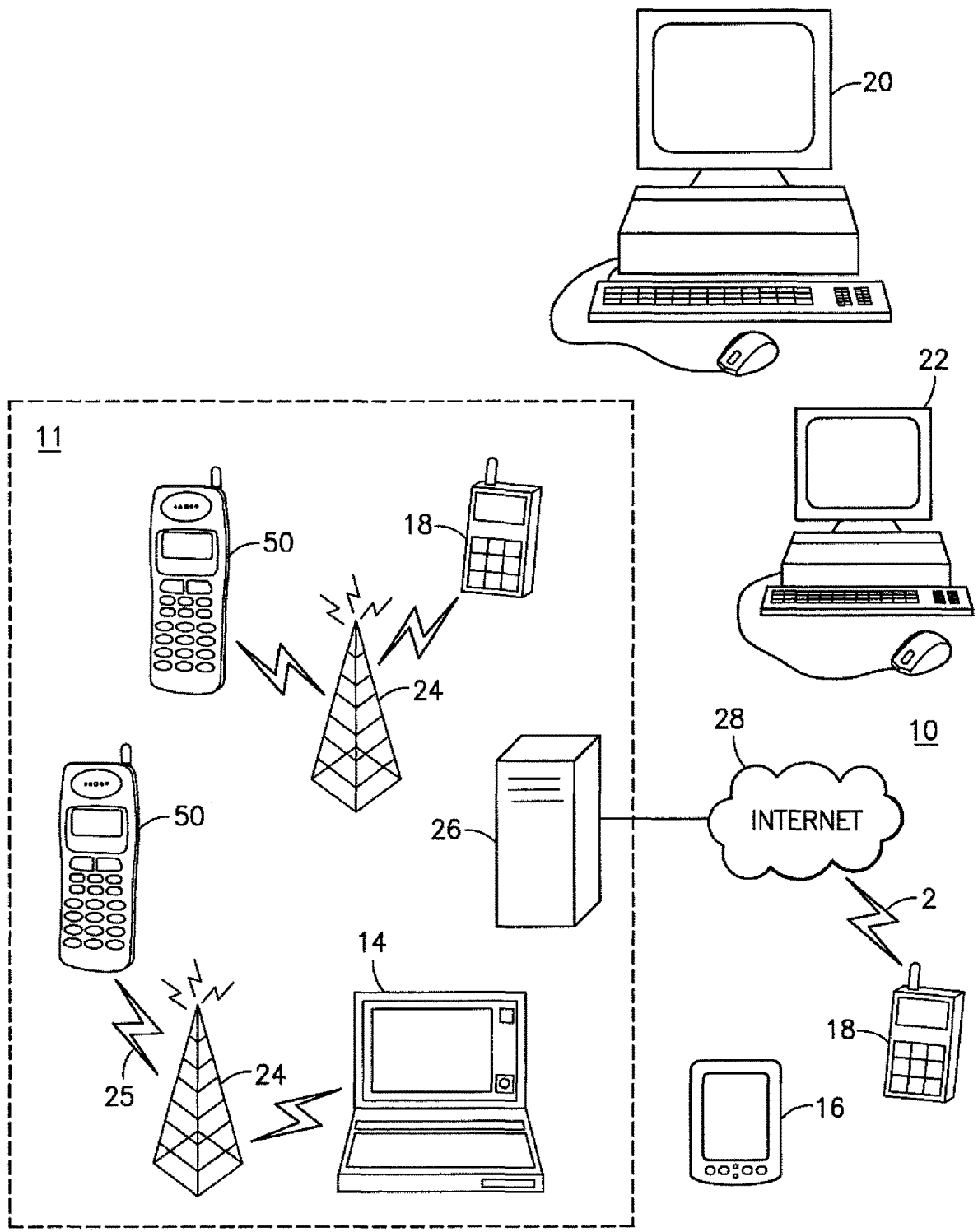
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

Real-time Transport Protocol (RTP) is widely used for real-time transport of timed media such as audio and video. RTP may operate on top of the User Datagram Protocol (UDP), which in turn may operate on top of the Internet Protocol (IP). RTP is specified in Internet Engineering Task Force (IETF) Request for Comments (RFC) 3550, available from www.ietf.org/rfc/rfc3550.txt. In RTP transport, media data is encapsulated into RTP packets. Typically, each media type or media coding format has a dedicated RTP payload format.

An RTP session is an association among a group of participants communicating with RTP. It is a group communications channel which can potentially carry a number of RTP streams. An RTP stream is a stream of RTP packets comprising media data. An RTP stream is identified by an SSRC belonging to a particular RTP session. SSRC refers to either a synchronization source or a synchronization source identifier that is the 32-bit SSRC field in the RTP packet header. A synchronization source is characterized in that all packets from the synchronization source form part of the same timing and sequence number space, so a receiver may group packets by synchronization source for playback. Examples of synchronization sources include the sender of a stream of packets derived from a signal source such as a microphone or a camera, or an RTP mixer. Each RTP stream is identified by a SSRC that is unique within the RTP session. An RTP stream may be regarded as a logical channel.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). The ISO file format is the base for derivation of all the above mentioned file formats (excluding the ISO file format itself). These file formats (including the ISO file format itself) are generally called the ISO family of file formats.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data 'mdat' box and the movie 'moov' box may be used to enclose the metadata. In some cases, for a file to be operable, both of the 'mdat' and 'moov' boxes may be required to be present. The movie 'moov' box may include one or more tracks, and each track may reside in one corresponding TrackBox ('trak'). A track may be one of the many types, including a media track that refers to samples formatted according to a media compression format (and its encapsulation to the ISO base media file format). A track may be regarded as a logical channel.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs (a.k.a. track fragment runs), each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es). The syntax may be specified as follows:

```
aligned(8) class TrackReferenceBox extends Box('tref') {
    TrackReferenceTypeBox [ ];
}
aligned(8) class TrackReferenceTypeBox (unsigned int(32)
reference_type) extends Box(reference_type) {
    unsigned int(32) track_IDs[ ];
}
```

TrackGroupBox, which is contained in TrackBox, enables indication of groups of tracks where each group shares a particular characteristic or the tracks within a group have a particular relationship. The box contains zero or more boxes, and the particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group. The syntax of the contained boxes may be defined through TrackGroupTypeBox is follows:

```
aligned(8) class TrackGroupTypeBox(unsigned int(32)
track_group_type) extends FullBox(track_group_type, version = 0,
flags = 0)
{
    unsigned int(32) track_group_id;
    // the remaining data may be specified
    //for a particular track_group_type
}
```

Files conforming to the ISOBMFF may contain any non-timed objects, referred to as items, meta items, or metadata items, in a meta box (fourCC: 'meta'), which may also be called MetaBox. While the name of the meta box refers to metadata, items can generally contain metadata or media data. The meta box may reside at the top level of the file, within a movie box (fourCC: 'moov'), and within a track box (fourCC: 'trak'), but at most one meta box may occur at each of the file level, movie level, or track level. The meta box may be required to contain a 'hdlr' box indicating the structure or format of the 'meta' box contents. The meta box may list and characterize any number of items that can be referred and each one of them can be associated with a file name and are uniquely identified with the file by item identifier (item_id) which is an integer value. The metadata items may be for example stored in the 'idat' box of the meta box or in an 'mdat' box or reside in a separate file. If the metadata is located external to the file then its location may be declared by the DataInformationBox (fourCC: 'dinf'). In the specific case that the metadata is formatted using XML syntax and is required to be stored directly in the MetaBox, the metadata may be encapsulated into either the XMLBox (fourCC: 'xml') or the BinaryXMLBox (fourcc: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource; the resource can be formed by concatenating the extents.

An entity may be defined as a collective term of a track or an item. An entity group is a grouping of items, which may also group tracks. An entity group can be used instead of item references, when the grouped entities do not have clear dependency or directional reference relation. The entities in an entity group share a particular characteristic or have a particular relationship, as indicated by the grouping type.

An entity group is a grouping of items, which may also group tracks. The entities in an entity group share a particular characteristic or have a particular relationship, as indicated by the grouping type.

Entity groups are indicated in GroupsListBox. Entity groups specified in GroupsListBox of a file-level MetaBox refer to tracks or file-level items. Entity groups specified in GroupsListBox of a movie-level MetaBox refer to movie-level items. Entity groups specified in GroupsListBox of a track-level MetaBox refer to track-level items of that track.

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied. Inter prediction typically improves compression efficiency significantly compared to when using intra coding only.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
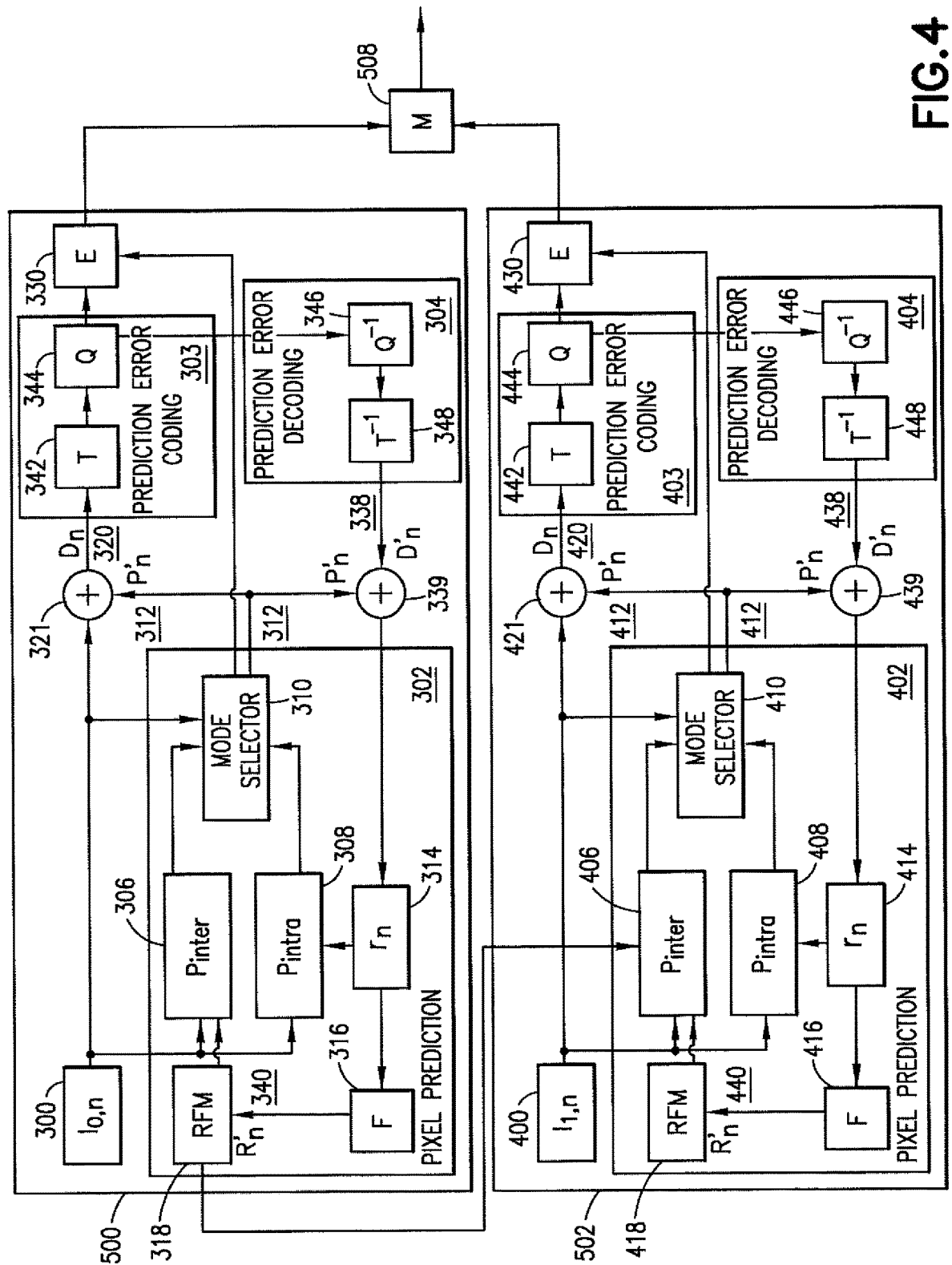
FIG. 4 shows schematically an encoder suitable for implementing embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team—Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Version 2 of H.265/HEVC included scalable, multiview, and fidelity range extensions, which may be abbreviated SHVC, MV-HEVC, and REXT, respectively. Version 2 of H.265/HEVC was pre-published as ITU-T Recommendation H.265 (October 2014) and is likely to be published as Edition 2 of ISO/IEC 23008-2 in 2015. There are currently ongoing standardization projects to develop further extensions to H.265/HEVC, including three-dimensional and screen content coding extensions, which may be abbreviated 3D-HEVC and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

The Versatile Video Coding standard (VVC, H.266, or H.266/VVC) is presently under development by the Joint Video Experts Team (JVET), which is a collaboration between the ISO/IEC MPEG and ITU-T VCEG.

Some key definitions, bitstream and coding structures, and concepts of some video codecs, such as H.264/AVC, HEVC and VVC, are described in this section as an example of a video encoder, decoder, encoding method, decoding method, and a bitstream structure, wherein the embodiments may be implemented. The aspects of the invention are not limited to H.264/AVC, HEVC, or VVC, but rather the description is given for one possible basis on top of which the invention may be partly or fully realized.

Video coding standards may specify the bitstream syntax and semantics as well as the decoding process for error-free bitstreams, whereas the encoding process might not specified, but encoders may just be required to generate conforming bitstreams. Bitstream and decoder conformance can be verified with the Hypothetical Reference Decoder (HRD). The standards may contain coding tools that help in coping with transmission errors and losses, but the use of the tools in encoding may be optional and decoding process might have not been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order. In the description of existing standards as well as in the description of example embodiments, a phrase "by external means" or "through external means" may be used. For example, an entity, such as a syntax structure or a value of a variable used in the decoding process, may be provided "by external means" to the decoding process. The phrase "by external means" may indicate that the entity is not included in the bitstream created by the encoder, but rather conveyed externally from the bitstream for example using a control protocol. It may alternatively or additionally mean that the entity is not created by the encoder, but may be created for example in the player or decoding control logic or alike that is using the decoder. The decoder may have an interface for inputting the external means, such as variable values.

An elementary unit for the input to an encoder and the output of a decoder, respectively, is typically a picture. A picture given as an input to an encoder may also referred to as a source picture, and a picture decoded by a decoded may be referred to as a decoded picture or a reconstructed picture.

The source and decoded pictures are each comprised of one or more sample arrays, such as one of the following sets of sample arrays:
 Luma (Y) only (monochrome).
 Luma and two chroma (YCbCr or YCgCo).
 Green, Blue and Red (GBR, also known as RGB).
 Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC and/or VVC. A component may be defined as an array or single sample from one of the three sample arrays (luma and two chroma) or the array or a single sample of the array that compose a picture in monochrome format.

A picture may be defined to be either a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:
 In monochrome sampling there is only one sample array, which may be nominally considered the luma array.
 In 4:2:0 sampling, each of the two chroma arrays has half the height and half the width of the luma array.
 In 4:2:2 sampling, each of the two chroma arrays has the same height and half the width of the luma array.
 In 4:4:4 sampling when no separate color planes are in use, each of the two chroma arrays has the same height and width as the luma array.

A coding format or specification may allow to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

A coding format or standard may partition a picture and/or respective sample arrays into a regular grid of blocks, each of which is coded as a unit. Blocks may be further partitioned into smaller units. Examples of block grids and block partitioning are provided next. It needs to be understood that embodiments may be applied but are not limited to block grids or block partitioning schemes presented below.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures are divided into coding units (CU) covering the area of the picture. In some video codecs, a CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

In a draft version of H.266/VVC, the following partitioning applies. It is noted that what is described here might still evolve in later draft versions of H.266/VVC until the standard is finalized. Pictures are partitioned into CTUs similarly to HEVC, although the maximum CTU size has been increased to 128×128. A coding tree unit (CTU) is first partitioned by a quaternary tree (a.k.a. quadtree) structure. Then the quaternary tree leaf nodes can be further partitioned by a multi-type tree structure. There are four splitting types in multi-type tree structure, vertical binary splitting, horizontal binary splitting, vertical ternary splitting, and horizontal ternary splitting. The multi-type tree leaf nodes are called coding units (CUs). CU, PU and TU have the same block size, unless the CU is too large for the maximum transform length. A segmentation structure for a CTU is a quadtree with nested multi-type tree using binary and ternary splits, i.e. no separate CU, PU and TU concepts are in use except when needed for CUs that have a size too large for the maximum transform length. A CU can have either a square or rectangular shape. Pictures are also partitioned to tile along a tile grid (similarly to HEVC). Tiles are ordered in the bitstream in tile raster scan order within a picture, and CTUs are ordered in the bitstream in raster scan order within a tile. A tile group contains one or more entire tiles in bitstream order (i.e. tile raster scan order within a picture), and a VCL NAL unit contains one tile group. Slices have not been included in the draft version of H.266/VVC.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. An MCTS sequence may be defined as a sequence of respective MCTSs in one or more coded video sequences or alike. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures. A motion-constrained tile set may be regarded as an independently coded tile set, since it may be decoded without the other tile sets.

It is noted that sample locations used in inter prediction may be saturated by the encoding and/or decoding process so that a location that would be outside the picture otherwise is saturated to point to the corresponding boundary sample of the picture. Hence, if a tile boundary is also a picture boundary, in some use cases, encoders may allow motion vectors to effectively cross that boundary or a motion vector to effectively cause fractional sample interpolation that would refer to a location outside that boundary, since the sample locations are saturated onto the boundary. In other use cases, specifically if a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

The temporal motion-constrained tile sets SEI message of HEVC can be used to indicate the presence of motion-constrained tile sets in the bitstream.

A draft VVC standard supports subpictures (a.k.a. subpictures). A subpicture may be defined as a rectangular region of one or more slices within a picture, wherein the one or more slices are complete. Consequently, a subpicture consists of one or more slices that collectively cover a rectangular region of a picture. The slices of a subpicture may be required to be rectangular slices. Partitioning of a picture to subpictures (a.k.a. a subpicture layout) may be indicated in and/or decoded from an SPS. One or more of the following properties may be indicated (e.g. by an encoder) or decoded (e.g. by a decoder) or inferred (e.g. by an encoder and/or a decoder) for the subpictures collectively or per each subpicture individually: i) whether or not a subpicture is treated as a picture in the decoding process; in some cases, this property excludes in-loop filtering operations, which may be separately indicated/decoded/inferred; ii) whether or not in-loop filtering operations are performed across the subpicture boundaries. Treating a subpicture as a picture in a decoding process may comprise saturating the sample locations in inter prediction that would otherwise be outside the subpicture onto the subpicture boundary.

It needs to be understood that embodiments described with reference to MCTSs could likewise be realized with subpictures (as specified for the draft VVC standard), and embodiments described with reference to subpictures could likewise be realized with MCTSs (as described above).

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

Typical video codecs enable the use of uni-prediction, where a single prediction block is used for a block being (de)coded, and bi-prediction, where two prediction blocks are combined to form the prediction for a block being (de)coded. Some video codecs enable weighted prediction, where the sample values of the prediction blocks are weighted prior to adding residual information. For example, multiplicative weighting factor and an additive offset which can be applied. In explicit weighted prediction, enabled by some video codecs, a weighting factor and offset may be coded for example in the slice header for each allowable reference picture index. In implicit weighted prediction, enabled by some video codecs, the weighting factors and/or offsets are not coded but are derived e.g. based on the relative picture order count (POC) distances of the reference pictures.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C = D + \lambda R, \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to image segments, such as coded slices, tiles, tile groups, or alike. Such image segments may enable parallel processing, i.e. they may be coded or decoded independently of other image segments of the same picture. "Slices" in this description may refer to image segments constructed of certain number of basic coding units that are processed in default coding or decoding order. "Tiles" may refer to image segments that have been defined as rectangular image regions. A tile group may be defined as a group of one or more tiles. Image segments may be coded as separate units in the bitstream, such as VCL NAL units. Coded image segments may comprise a header and a payload, wherein the header contains parameter values needed for decoding the payload. For example, a slice may comprise a slice header and a slice payload, or a tile group may comprise a tile group header and a tile group payload.

There may be different alternatives in specifying (de) coding order or bitstream order of image segments and coding units, or alike. For example, coding units, such as macroblocks of H.264/AVC, may be ordered in the bitstream in a raster scan order along a coding unit grid within a picture. In another example, tiles are ordered in tile raster scan order along a tile grid within a picture, and coding units (e.g. CTUs of HEVC) are ordered in raster scan order within a tile. In yet another example, tile groups are ordered in raster scan order (e.g. according to their top left corner) within a picture, tiles are ordered in raster scan order within a tile group, and coding units (e.g. CTUs) are ordered in raster scan order within a tile.

In-picture prediction is typically disabled across image segment boundaries. Thus, image segments can be regarded as a way to split a coded picture to independently decodable pieces and image segments are therefore often regarded as elementary units for transmission. In many cases, encoders may indicate in the bitstream which types of in-picture prediction are turned off across image segment boundaries, and the decoder operation takes this information into account for example when concluding which prediction sources are available. For example, samples from a neighboring macroblock or CU may be regarded as unavailable for intra prediction, if the neighboring macroblock or CU resides in a different image segment.

Bitstreams or coded video sequences can be encoded to be temporally scalable as follows. Each picture may be assigned to a particular temporal sub-layer. Temporal sub-layers may be enumerated e.g. from 0 upwards. The lowest temporal sub-layer, sub-layer 0, may be decoded independently. Pictures at temporal sub-layer 1 may be predicted from reconstructed pictures at temporal sub-layers 0 and 1. Pictures at temporal sub-layer 2 may be predicted from reconstructed pictures at temporal sub-layers 0, 1, and 2, and so on. In other words, a picture at temporal sub-layer N does not use any picture at temporal sub-layer greater than N as a reference for inter prediction. The bitstream created by excluding all pictures greater than or equal to a selected sub-layer value and including pictures remains conforming.

An elementary unit for the output of encoders of some coding formats, such as HEVC, and the input of decoders of some coding formats, such as HEVC, is a Network Abstraction Layer (NAL) unit. For transport over packet-oriented networks or storage into structured files, NAL units may be encapsulated into packets or similar structures. A bytestream format may be present for transmission or storage environments that do not provide framing structures. An example bytestream format, aligned with that specified in H.264/AVC and HEVC, summarized next. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit.

In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The nuh_temporal_id_plus1 syntax element may be regarded as a temporal identifier for the NAL unit, and a zero-based TemporalId variable may be derived as follows: TemporalId=nuh_temporal_id_plus1−1. The abbreviation TID may be used to interchangeably with the TemporalId variable. TemporalId equal to 0 corresponds to the lowest temporal level. The value of nuh_temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units are typically coded slice NAL units or alike, which may be generally referred to as coded image segment NAL units. In H.264/AVC, coded slice NAL units contain syntax elements representing one or more coded macroblocks, each of which corresponds to a block of samples in the uncompressed picture. In HEVC, VCL NAL units contain syntax elements representing one or more CU.

In H.264/AVC, a coded slice NAL unit can be indicated to be a coded slice in an Instantaneous Decoding Refresh (IDR) picture or coded slice in a non-IDR picture.

In HEVC, a coded slice NAL unit can be indicated to be one of the following types:

| nal_unit_type | Name of nal_unit_type | Content of NAL unit and RBSP syntax structure |
|---|---|---|
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved // reserved non-RAP non-reference VCL NAL unit types |
| 11, 13, 15 | RSV_VCL_R11 RSV_VCL_R13 RSV_VCL_R15 | Reserved // reserved non-RAP reference VCL NAL unit types |

-continued

| nal_unit_type | Name of nal_unit_type | Content of NAL unit and RBSP syntax structure |
|---|---|---|
| 16, 17, 18 | BLA_W_LP<br>BLA_W_DLP (a.k.a. IDR_W_RADL)<br>BLA_N_LP | Coded slice segment of a BLA picture<br>slice_segment_layer_rbsp( ) |
| 19, 20 | IDR_W_DLP (a.k.a. IDR_W_RADL)<br>IDR_N_LP | Coded slice segment of an IDR picture<br>slice_segment_layer_rbsp( ) |
| 21 | CRA_NUT | Coded slice segment of a CRA picture<br>slice_segment_layer_rbsp( ) |
| 22, 23 | RSV_IRAP_VCL22 . . . RSV_IRAP_VCL23 | Reserved // reserved RAP VCL NAL unit types |
| 24 . . . 31 | RSV_VCL24 . . . RSV_VCL31 | Reserved // reserved non-RAP VCL NAL unit types |

In HEVC, VCL NAL unit types indicate a type of the coded picture that comprises the VCL NAL unit. Picture types of HEVC comprise trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture. Some picture types are more fine-grained as indicated in the table above. For example, three types of BLA pictures are specified, BLA without leading pictures, BLA with decodable leading pictures (i.e. without RASL pictures), and BLA with any leading pictures.

In HEVC, nal_unit_type values of non-IRAP VCL NAL units indicate whether a picture is a sub-layer reference picture (NAL unit types with _R postfix) or a sub-layer non-reference picture (NAL units with _N postfix). A sub-layer reference picture may be defined as a picture that contains samples that may be used for inter prediction in the decoding process of subsequent pictures of the same sub-layer in decoding order. A sub-layer non-reference (SLNR) picture may be defined as a picture that contains samples that cannot be used for inter prediction in the decoding process of subsequent pictures of the same sub-layer in decoding order. In VVC, such a distinction between sub-layer reference and non-reference pictures is not made with nal_unit_type values. Consequently, mnemonic NAL unit types may be defined for VVC e.g. with_NUT postfix (e.g., TRAIL_NUT, RASL_NUT, RADL_NUT, STSA_NUT).

A Random Access Point (RAP) picture, which may also be referred to as a random-access picture or an intra random access point (IRAP) picture, may comprise only intra-coded image segments. Furthermore, a RAP picture may constrain subsequent pictures in output order to be such that they can be correctly decoded without performing the decoding process of any pictures that precede the RAP picture in decoding order. In HEVC, an IRAP picture may be a BLA picture, a CRA picture or an IDR picture. In HEVC, provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. There may be pictures in a bitstream that contain only intra-coded slices that are not IRAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture is either a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture.

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture.

The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in HEVC, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations. A header parameter set (HPS) has been proposed to contain such parameters that may change on picture basis.

VPS may provide information about the dependency relationships of the layers in a bitstream, as well as many other information that are applicable to all slices across all (scalability or view) layers in the entire coded video sequence.

Many instances of parameter sets may be allowed, and each instance may be identified with a unique identifier. In order to limit the memory usage needed for parameter sets, the value range for parameter set identifiers may be limited. In H.264/AVC and HEVC, each slice header includes the identifier of the picture parameter set that is active for the decoding of the picture that contains the slice. Generally, an image segment header may include the identifier of parameter set(s) that are active for the decoding of the image segment. A parameter set at a lower hierarchy level may contain an identifier of a parameter set at a higher hierarchy level. For example, a picture parameter set may contain the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) may be used in claims and described embodiments to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream.

A parameter set may be activated by a reference from an image segment, such as from a slice, or from another active parameter set or in some cases from another syntax structure such as a buffering period SEI message. In general, a parameter set may be activated when it is referenced e.g. through its identifier. For example, a header of an image segment, such as a slice header, may contain an identifier of the PPS that is activated for decoding the coded picture containing the image segment. A PPS may contain an identifier of the SPS that is activated, when the PPS is activated. An activation of a parameter set of a particular type may cause the deactivation of the previously active parameter set of the same type.

Instead of or in addition to parameter sets at different hierarchy levels (e.g. sequence and picture), video coding formats may include header syntax structures, such as a sequence header or a picture header. A sequence header may precede any other data of the coded video sequence in the bitstream order. A picture header may precede any coded video data for the picture in the bitstream order.

A SEI NAL unit may contain one or more SEI messages, which are not required for the decoding of output pictures but may assist in related processes, such as picture output timing, rendering, error detection, error concealment, and resource reservation. Coding standards may contain the syntax and semantics for the specified SEI messages but no process for handling the messages in the recipient is defined. Consequently, encoders are required to follow the coding standard when they create SEI messages, and decoders conforming to the coding standard, respectively, are not required to process SEI messages for output order conformance. One of the reasons to include the syntax and semantics of SEI messages in coding standards is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In some coding standards, such a HEVC, there are two types of SEI NAL units, namely the suffix SEI NAL unit and the prefix SEI NAL unit, having a different nal_unit_type value from each other. The SEI message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

A coded picture may be defined as a coded representation of a picture. In some coding standards or formats, such as HEVC, a coded picture may be defined as a coded representation of a picture containing all coding tree units of the picture.

An access unit may comprise coded video data for a single time instance and associated other data. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

It may be required that coded pictures appear in certain order within an access unit. For example a coded picture with nuh_layer_id equal to nuhLayerIdA may be required to precede, in decoding order, all coded pictures with nuh_layer_id greater than nuhLayerIdA in the same access unit.

A bitstream may be defined as a sequence of bits, which may in some coding formats or standards be in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. In some coding formats or standards, the end of the first bitstream may be indicated by a specific NAL unit, which may be referred to as the end of bitstream (EOB) NAL unit and which is the last NAL unit of the bitstream.

A coded video sequence (CVS) may be defined as such a sequence of coded pictures in decoding order that is independently decodable and is followed by another coded video sequence or the end of the bitstream.

A coded layer video sequence (CLVS) may be defined as a sequence of picture units (PUs) with the same scalable layer (e.g. with the same value of nuh_layer_id in VVC) that consists, in decoding order, of a CLVS Start Picture Unit (CLVSS PU), followed by zero or more PUs that are not CLVSS PUs, including all subsequent PUs up to but not including any subsequent PU that is a CLVSS PU. A picture unit (PU) may be defined as a coded picture and all non-VCL NAL units associated with the coded picture. A CLVSS PU may be defined as a PU that is allowed to start a CLVS, i.e. that can start a decoding process of the layer. A CLVSS PU may for example comprise an IRAP picture or a gradual decoding refresh (GDR) picture.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. An open GOP coding structure is potentially more efficient in the compression compared to a closed GOP coding structure, due to a larger flexibility in selection of reference pictures.

The bitstream syntax of coding formats or standards may indicate whether a particular picture is a reference picture for inter prediction of any other picture. In many coding formats or standards, pictures of any coding type (I, P, B) can be reference pictures or non-reference pictures.

One or more syntax structures for (decoded) reference picture marking may exist in a video coding system. An encoder generates an instance of a syntax structure e.g. in each coded picture, and a decoder decodes an instance of the syntax structure e.g. from each coded picture. For example, the decoding of the syntax structure may cause pictures to be adaptively marked as "used for reference" or "unused for reference".

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In HEVC, reference picture marking syntax structures and related decoding processes are not used, but instead a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr0 (a.k.a. RefPicSetStCurrBefore), RefPicSetStCurr1 (a.k.a. RefPicSetStCurrAfter), RefPicSetStFoll0, RefPicSetStFoll1, RefPicSetLtCurr, and RefPicSetLtFoll. RefPicSetStFoll0 and RefPicSetStFoll1 may also be considered to form jointly one subset RefPicSetStFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In HEVC, a reference picture set may be specified in a sequence parameter set and taken into use in the slice header through an index to the reference picture set. A reference picture set may also be specified in a slice header. A reference picture set may be coded independently or may be predicted from another reference picture set (known as inter-RPS prediction). In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPic- SetStCurr1, RefPicSetStFoll0, RefPicSetStFoll1, RefPicSetLtCurr, and RefPicSetLtFoll are all set to empty.

In VVC, reference picture lists are indicated directly in a reference picture list syntax structure rather than indicating reference picture sets and using an initialization and optional reordering process as described above. When a picture is present in any reference picture list of the current picture (within active or inactive entries of any reference picture list), it marked as "used for long-term reference" or "used for short-term reference". When a picture is present in no reference picture list of the current picture, it is marked as "unused for reference". The abbreviation RPL may be used to refer to the reference picture list syntax structure and/or to one or more reference picture lists. The number of active entries in a reference picture list may be indicated by an encoder and/or decoded by a decoder, and may indicate the number of pictures starting from the first list entry that may be used as reference for prediction of the current picture. The entries in a reference picture list that are no among the active entries may be defined to be inactive entries, are not used as reference for prediction of the current picture, and may be used as reference for prediction of subsequent pictures in decoding order.

One or two reference picture lists may be derived for an inter-coded picture. Reference picture list 0 may be used for predicting a uni-predicted slice (a.k.a. P slice), and both reference picture lists 0 and 1 may be used for predicting a bi-predicted slice (a.k.a. B slice). Reference picture lists 0 and 1 may be represented by array variables RefPicList[0] and RefPicList[1], respectively, where each entry in the array (RefPicList[0] or RefPicList[1]) corresponds an reference picture in the respective reference picture list.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer.

Spatial scalability: Base layer pictures are coded at a lower resolution (i.e. have fewer samples) than enhancement layer pictures. Spatial scalability and quality scalability, may sometimes be considered the same type of scalability.

Bit-depth scalability: Base layer pictures are coded at lower bit-depth (e.g. 8 bits) than enhancement layer pictures (e.g. 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view.

Depth scalability, which may also be referred to as depth-enhanced coding. A layer or some layers of a bitstream may represent texture view(s), while other layer or layers may represent depth view(s).

It should be understood that many of the scalability types may be combined and applied together. For example color gamut scalability and bit-depth scalability may be combined.

The term layer may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

Various technologies for providing three-dimensional (3D) video content are currently investigated and developed. It may be considered that in stereoscopic or two-view video, one video sequence or view is presented for the left eye while a parallel view is presented for the right eye. More than two parallel views may be needed for applications which enable viewpoint switching or for autostereoscopic displays which may present a large number of views simultaneously and let the viewers to observe the content from different viewpoints.

A view may be defined as a sequence of pictures representing one camera or viewpoint. The pictures representing a view may also be called view components. In other words, a view component may be defined as a coded representation of a view in a single access unit. In multiview video coding, more than one view is coded in a bitstream. Since views are typically intended to be displayed on stereoscopic or multiview autostrereoscopic display or to be used for other 3D arrangements, they typically represent the same scene and are content-wise partly overlapping although representing different viewpoints to the content. Hence, inter-view prediction may be utilized in multiview video coding to take advantage of inter-view correlation and improve compression efficiency. One way to realize inter-view prediction is to include one or more decoded pictures of one or more other views in the reference picture list(s) of a picture being coded or decoded residing within a first view. View scalability may refer to such multiview video coding or multiview video bitstreams, which enable removal or omission of one or more coded views, while the resulting bitstream remains conforming and represents video with a smaller number of views than originally.

A sender, a gateway, a client, or another entity may select the transmitted layers and/or sub-layers of a scalable video bitstream. Terms layer extraction, extraction of layers, or layer down-switching may refer to transmitting fewer layers than what is available in the bitstream received by the sender, the gateway, the client, or another entity. Layer up-switching may refer to transmitting additional layer(s) compared to those transmitted prior to the layer up-switching by the sender, the gateway, the client, or another entity, i.e. restarting the transmission of one or more layers whose transmission was ceased earlier in layer down-switching. Similarly to layer down-switching and/or up-switching, the sender, the gateway, the client, or another entity may perform down- and/or up-switching of temporal sub-layers. The sender, the gateway, the client, or another entity may also perform both layer and sub-layer down-switching and/or up-switching. Layer and sub-layer down-switching and/or up-switching may be carried out in the same access unit or alike (i.e. virtually simultaneously) or may be carried out in different access units or alike (i.e. virtually at distinct times).

Scalability may be enabled in two basic ways. Either by introducing new coding modes for performing prediction of pixel values or syntax from lower layers of the scalable representation or by placing the lower layer pictures to a reference picture buffer (e.g. a decoded picture buffer, DPB) of the higher layer. The first approach may be more flexible and thus may provide better coding efficiency in most cases. However, the second, reference frame based scalability, approach may be implemented efficiently with minimal changes to single layer codecs while still achieving majority of the coding efficiency gains available. Essentially a reference frame based scalability codec may be implemented by utilizing the same hardware or software implementation for all the layers, just taking care of the DPB management by external means.

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

A direct reference layer may be defined as a layer that may be used for inter-layer prediction of another layer for which the layer is the direct reference layer. A direct predicted layer may be defined as a layer for which another layer is a direct reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer. An indirect predicted layer may be defined as a layer for which another layer is an indirect reference layer. An independent layer may be defined as a layer that does not have direct reference layers. In other words, an independent layer is not predicted using inter-layer prediction. A non-base layer may be defined as any other layer than the base layer, and the base layer may be defined as the lowest layer in the bitstream. An independent non-base layer may be defined as a layer that is both an independent layer and a non-base layer.

Virtual reality is a rapidly developing area of technology in which image or video content, sometimes accompanied by audio, is provided to a user device such as a user headset (a.k.a. head-mounted display). As is known, the user device may be provided with a live or stored feed from a content source, the feed representing a virtual space for immersive output through the user device. Currently, many virtual reality user devices use so-called three degrees of freedom (3DoF), which means that the head movement in the yaw, pitch and roll axes are measured and determine what the user sees, i.e. to determine the viewport. It is known that rendering by taking the position of the user device and changes of the position into account can enhance the immersive experience. Thus, an enhancement to 3DoF is a six degrees-of-freedom (6DoF) virtual reality system, where the user may freely move in Euclidean space as well as rotate their head in the yaw, pitch and roll axes. Six degrees-of-freedom virtual reality systems enable the provision and consumption of volumetric content. Volumetric content comprises data representing spaces and/or objects in three-dimensions from all angles, enabling the user to move fully around the space and/or objects to view them from any angle. Such content may be defined by data describing the geometry (e.g. shape, size, position in a three-dimensional space) and attributes such as colour, opacity and reflectance. The data may also define temporal changes in the geometry and attributes at given time instances, similar to frames in two-dimensional video.

Terms 360-degree video or virtual reality (VR) video may sometimes be used interchangeably and may be constrained for 3DoF. They may generally refer to video content that provides such a large field of view that only a part of the video is displayed at a single point of time in typical displaying arrangements. For example, VR video may be viewed on a head-mounted display (HMD) that may be capable of displaying e.g. about 100-degree field of view. The spatial subset of the VR video content to be displayed may be selected based on the orientation of the HMD. In another example, a typical flat-panel viewing environment is assumed, wherein e.g. up to 40-degree field-of-view may be displayed. When displaying wide-FOV content (e.g. fisheye) on such a display, it may be preferred to display a spatial subset rather than the entire picture.

MPEG Omnidirectional Media Format (ISO/IEC 23090-2) is a virtual reality (VR) system standard. OMAF defines a media format (comprising both file format derived from ISOBMFF and streaming formats for DASH and MPEG Media Transport). OMAF version 1 supports 360° video, images, and audio, as well as the associated timed text and facilitates three degrees of freedom (3DoF) content consumption, meaning that a viewport can be selected with any azimuth and elevation range and tilt angle that are covered by the omnidirectional content but the content is not adapted to any translational changes of the viewing position. The viewport-dependent streaming scenarios described further below have also been designed for 3DoF although could potentially be adapted to a different number of degrees of freedom.

Figure 5:
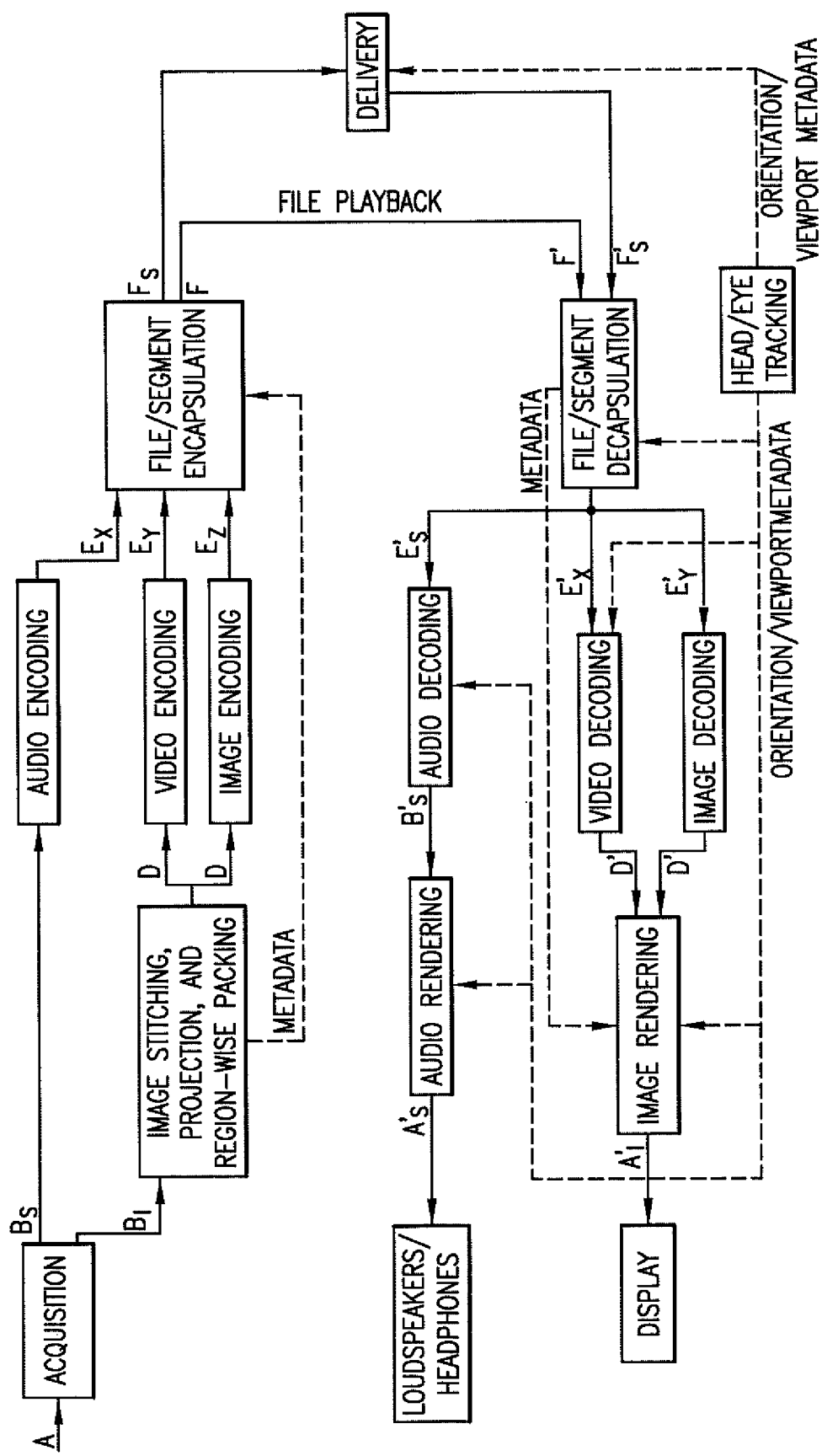
FIG. 5 shows an example of 3D video processing according to MPEG Omnidirectional Media Format (OMAF)

OMAF may be described with reference to FIG. 5. A real-world audio-visual scene (A) is captured by audio sensors as well as a set of cameras or a camera device with multiple lenses and sensors. The acquisition results in a set of digital image/video (Bi) and audio (Ba) signals. The cameras/lenses typically cover all directions around the center point of the camera set or camera device, thus the name of 360-degree video.

Audio can be captured using many different microphone configurations and stored as several different content formats, including channel-based signals, static or dynamic (i.e. moving through the 3D scene) object signals, and scene-based signals (e.g., Higher Order Ambisonics). The channel-based signals typically conform to one of the loudspeaker layouts defined in CICP. In an omnidirectional media application, the loudspeaker layout signals of the rendered immersive audio program are binaralulized for presentation via headphones.

The images (Bi) of the same time instance are stitched, projected, and mapped onto a packed picture (D).

Figure 6A:
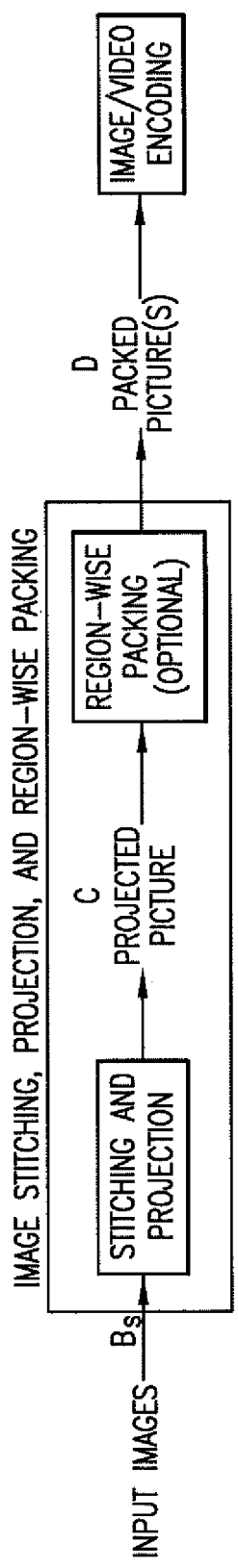
FIG. 6a shows an example of image stitching, projection, and region-wise packing process for monoscopic content images of the same time instance onto a packed virtual reality frame.

For monoscopic 360-degree video, the input images of one time instance are stitched to generate a projected picture representing one view. The breakdown of image stitching, projection, and region-wise packing process for monoscopic content is illustrated with FIG. 6a and described as follows. Input images (Bi) are stitched and projected onto a three-dimensional projection structure that may for example be a unit sphere. The projection structure may be considered to comprise one or more surfaces, such as plane(s) or part(s) thereof. A projection structure may be defined as three-dimensional structure consisting of one or more surface(s) on which the captured VR image/video content is projected, and from which a respective projected picture can be formed. The image data on the projection structure is further arranged onto a two-dimensional projected picture (C). The term projection may be defined as a process by which a set of input images are projected onto a projected frame. There may be a pre-defined set of representation formats of the projected picture, including for example an equirectangular projection (ERP) format and a cube map projection (CMP) format. It may be considered that the projected picture covers the entire sphere.

Optionally, region-wise packing is then applied to map the projected picture onto a packed picture. If the region-wise packing is not applied, the packed picture is identical to the projected picture, and this picture is given as input to image/video encoding. Otherwise, regions of the projected picture are mapped onto a packed picture (D) by indicating the location, shape, and size of each region in the packed picture, and the packed picture (D) is given as input to image/video encoding. The term region-wise packing may be defined as a process by which a projected picture is mapped to a packed picture. The term packed picture may be defined as a picture that results from region-wise packing of a projected picture.

In the case of stereoscopic 360-degree video, the input images of one time instance are stitched to generate a projected picture representing two views, one for each eye. Both views can be mapped onto the same packed picture, as described in FIG. 6b, and encoded by a traditional 2D video encoder. Alternatively, each view of the projected picture can be mapped to its own packed picture, in which case the image stitching, projection, and region-wise packing is like described above with FIG. 6a. A sequence of packed pictures of either the left view or the right view can be independently coded or, when using a multiview video encoder, predicted from the other view.

Figure 6B:
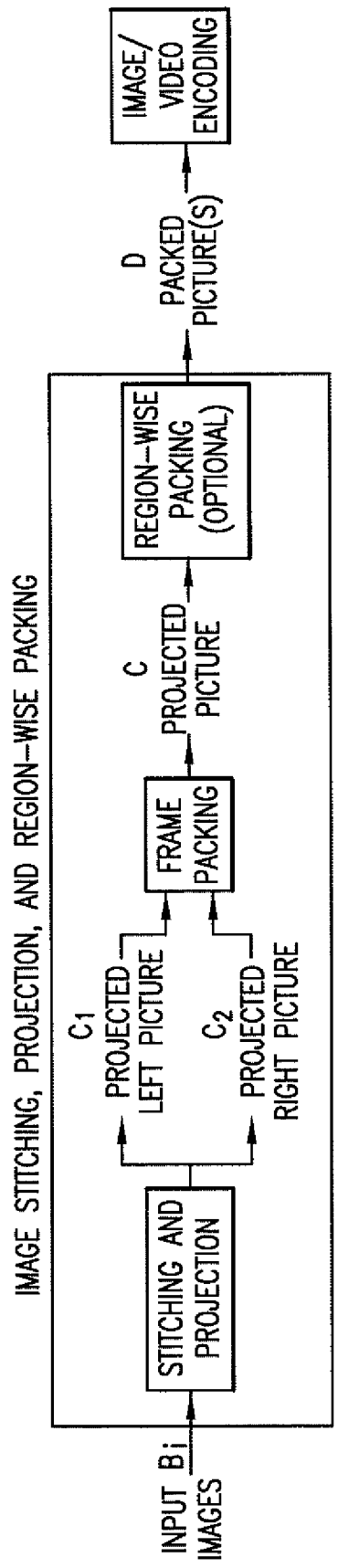
FIG. 6b shows an example of image stitching, projection, and region-wise packing process for stereoscopic content images of the same time instance onto a packed virtual reality frame.

The breakdown of image stitching, projection, and region-wise packing process for stereoscopic content where both views are mapped onto the same packed picture is illustrated with the FIG. 6b and described as follows. Input images (Bi) are stitched and projected onto two three-dimensional projection structures, one for each eye. The image data on each projection structure is further arranged onto a two-dimensional projected picture (CL for left eye, CR for right eye), which covers the entire sphere. Frame packing is applied to pack the left view picture and right view picture onto the same projected picture. Optionally, region-wise packing is then applied to the pack projected picture onto a packed picture, and the packed picture (D) is given as input to image/video encoding. If the region-wise packing is not applied, the packed picture is identical to the projected picture, and this picture is given as input to image/video encoding.

The image stitching, projection, and region-wise packing process can be carried out multiple times for the same source images to create different versions of the same content, e.g. for different orientations of the projection structure. Similarly, the region-wise packing process can be performed multiple times from the same projected picture to create more than one sequence of packed pictures to be encoded.

Figure 7:
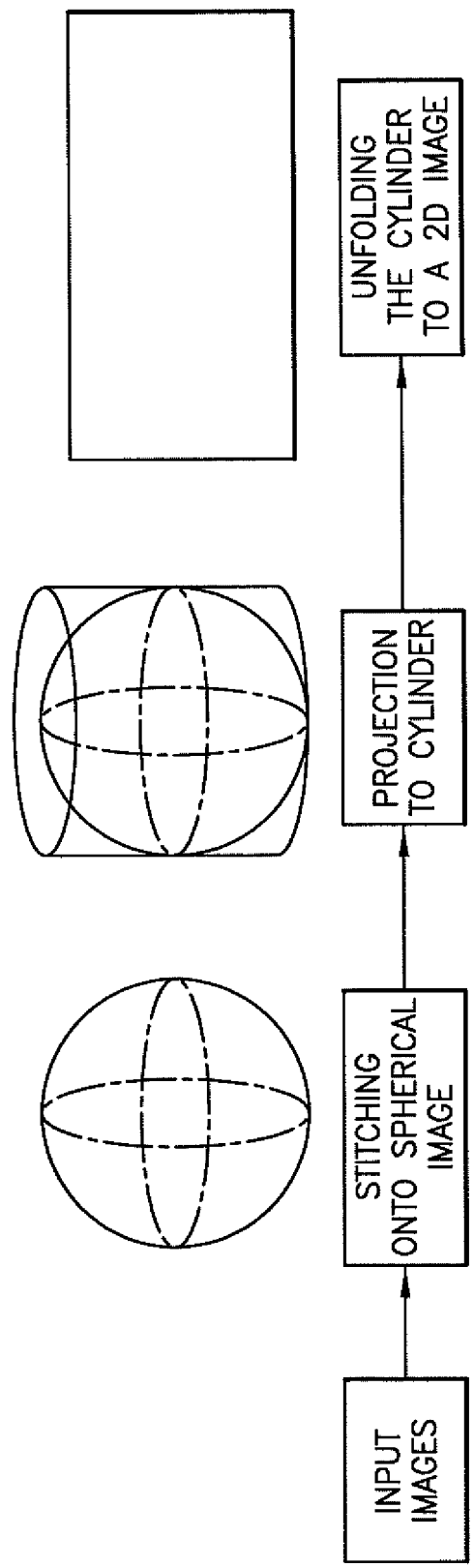
FIG. 7 shows a process of forming a monoscopic equirectangular panorama picture.

360-degree panoramic content (i.e., images and video) cover horizontally the full 360-degree field-of-view around the capturing position of an imaging device. The vertical field-of-view may vary and can be e.g. 180 degrees. Panoramic image covering 360-degree field-of-view horizontally and 180-degree field-of-view vertically can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. The process of forming a monoscopic equirectangular panorama picture is illustrated in FIG. 7. A set of input images, such as fisheye images of a camera array or a camera device with multiple lenses and sensors, is stitched onto a spherical image. The spherical image is further projected onto a cylinder (without the top and bottom faces). The cylinder is unfolded to form a two-dimensional projected frame. In practice one or more of the presented steps may be merged; for example, the input images may be directly projected onto a cylinder without an intermediate projection onto a sphere. The projection structure for equirectangular panorama may be considered to be a cylinder that comprises a single surface.

In general, 360-degree content can be mapped onto different types of solid geometrical structures, such as polyhedron (i.e. a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto a sphere first), cone, etc. and then unwrapped to a two-dimensional image plane.

In some cases panoramic content with 360-degree horizontal field-of-view but with less than 180-degree vertical field-of-view may be considered special cases of equirectangular projection, where the polar areas of the sphere have not been mapped onto the two-dimensional image plane. In some cases a panoramic image may have less than 360-degree horizontal field-of-view and up to 180-degree vertical field-of-view, while otherwise has the characteristics of equirectangular projection format.

Region-wise packing information may be encoded as metadata in or along the bitstream. For example, the packing information may comprise a region-wise mapping from a pre-defined or indicated source format to the packed frame format, e.g. from a projected picture to a packed picture, as described earlier.

Rectangular region-wise packing metadata is described next: For each region, the metadata defines a rectangle in a projected picture, the respective rectangle in the packed picture, and an optional transformation of rotation by 90, 180, or 270 degrees and/or horizontal and/or vertical mirroring. Rectangles may for example be indicated by the locations of the top-left corner and the bottom-right corner. The mapping may comprise resampling. As the sizes of the respective rectangles can differ in the projected and packed pictures, the mechanism infers region-wise resampling.

Among others, region-wise packing provides signalling for the following usage scenarios:
1) Additional compression for viewport-independent projections is achieved by densifying sampling of different regions to achieve more uniformity across the sphere. For example, the top and bottom parts of ERP are oversampled, and region-wise packing can be applied to down-sample them horizontally.
2) Arranging the faces of plane-based projection formats, such as cube map projection, in an adaptive manner.
3) Generating viewport-dependent bitstreams that use viewport-independent projection formats. For example, regions of ERP or faces of CMP can have different sampling densities and the underlying projection structure can have different orientations.
4) Indicating regions of the packed pictures represented by an extractor track. This is needed when an extractor track collects tiles from bitstreams of different resolutions.

OMAF allows the omission of image stitching, projection, and region-wise packing and encode the image/video data in their captured format. In this case, images D are considered the same as images Bi and a limited number of fisheye images per time instance are encoded.

For audio, the stitching process is not needed, since the captured signals are inherently immersive and omnidirectional.

The stitched images (D) are encoded as coded images (Ei) or a coded video bitstream (Ev). The captured audio (Ba) is encoded as an audio bitstream (Ea). The coded images, video, and/or audio are then composed into a media file for file playback (F) or a sequence of an initialization segment and media segments for streaming (Fs), according to a particular media container file format. In this specification, the media container file format is the ISO base media file format. The file encapsulator also includes metadata into the file or the segments, such as projection and region-wise packing information assisting in rendering the decoded packed pictures.

The metadata in the file may include:
the projection format of the projected picture,
fisheye video parameters,
the area of the spherical surface covered by the packed picture,
the orientation of the projection structure corresponding to the projected picture relative to the global coordinate axes,
region-wise packing information, and
region-wise quality ranking (optional).

Region-wise packing information may be encoded as metadata in or along the bitstream, for example as region-wise packing SEI message(s) and/or as region-wise packing boxes in a file containing the bitstream. For example, the packing information may comprise a region-wise mapping from a pre-defined or indicated source format to the packed frame format, e.g. from a projected frame to a packed VR frame, as described earlier. The region-wise mapping information may for example comprise for each mapped region a source rectangle in the projected frame and a destination rectangle in the packed VR frame, where samples within the source rectangle are mapped to the destination rectangle and rectangles may for example be indicated by the locations of the top-left corner and the bottom-right corner. The mapping may comprise resampling. Additionally or alternatively, the packing information may comprise one or more of the following: the orientation of the three-dimensional projection structure relative to a coordinate system, indication which VR projection format is used, region-wise quality ranking indicating the picture quality ranking between regions and/or first and second spatial region sequences, one or more transformation operations, such as rotation by 90, 180, or 270 degrees, horizontal mirroring, and vertical mirroring. The semantics of packing information may be specified in a manner that they are indicative for each sample location within packed regions of a decoded picture which is the respective spherical coordinate location.

A sphere region may be defined as region on a sphere. A type may be indicated or inferred for a sphere region. A first sphere region type may be specified by four great circles, where a great circle may be defined as the intersection of the sphere and a plane that passes through the centre point of the sphere. A second sphere region type by two azimuth circles and two elevation circles, where an azimuth circle may be defined as a circle on the sphere connecting all points with the same azimuth value and an elevation circle may be defined as a circle on the sphere connecting all points with the same elevation value. A first and/or second sphere region types may additionally cover a defined type of a region on the rotated sphere after applying certain amount of yaw, pitch, and roll rotations.

Region-wise quality ranking metadata may be present in or along a video or image bitstream. Quality ranking values of quality ranking regions may be relative to other quality ranking regions of the same bitstream or the same track or quality ranking regions of other tracks. Region-wise quality ranking metadata can be indicated for example by using the SphereRegionQualityRankingBox or the 2DRegionQualityRankingBox, which are specified as a part of MPEG Omnidirectional Media Format. SphereRegionQualityRankingBox provides quality ranking values for sphere regions, i.e., regions defined on sphere domain, while 2DRegionQualityRankingBox provides quality ranking values for rectangular regions on decoded pictures (and potentially a leftover region covering all areas not covered by any of the rectangular regions). Quality ranking values indicate a relative quality order of quality ranking regions. When quality ranking region A has a non-zero quality ranking value less than that of quality ranking region B, quality ranking region A has a higher quality than quality ranking region B. When the quality ranking value is non-zero, the picture quality within the entire indicated quality ranking region may be defined to be approximately constant. In general, the boundaries of the quality ranking sphere or 2D regions may or may not match with the boundaries of the packed regions or the boundaries of the projected regions specified in region-wise packing metadata. DASH MPD or other streaming manifests may include region-wise quality ranking signaling. For example, OMAF specifies the spherical region-wise quality ranking (SRQR) and the 2D region-wise quality ranking (2DQR) descriptor for carrying quality ranking metadata for sphere regions and for 2D regions on decoded pictures, respectively.

Content coverage may be defined as one or more sphere regions that are covered by the content represented by the track or an image item. Content coverage metadata may be present in or along a video or image bitstream, e.g. in a CoverageInformationBox specified in OMAF. Content coverage may be indicated to apply for monoscopic content, either view of stereoscopic content (as indicated), or both views of stereoscopic content. When indicated for both views, the content coverage of left view might or might not match with the content coverage of the right view. DASH MPD or other streaming manifests may include content coverage signaling. For example, OMAF specifies the content coverage (CC) descriptor carrying content coverage metadata.

The segments Fs are delivered using a delivery mechanism to a player.

The file that the file encapsulator outputs (F) is identical to the file that the file decapsulator inputs (F). A file decapsulator processes the file (F) or the received segments (Fs) and extracts the coded bitstreams (E'a, E'v, and/or E'i) and parses the metadata. The audio, video, and/or images are then decoded into decoded signals (B'a for audio, and D' for images/video). The decoded packed pictures (D') are projected onto the screen of a head-mounted display or any other display device based on the current viewing orientation or viewport and the projection, spherical coverage, projection structure orientation, and region-wise packing metadata parsed from the file. Likewise, decoded audio (B'a) is rendered, e.g. through headphones, according to the current viewing orientation. The current viewing orientation is determined by the head tracking and possibly also eye tracking functionality. Besides being used by the renderer to render the appropriate part of decoded video and audio signals, the current viewing orientation may also be used the video and audio decoders for decoding optimization.

The process described above is applicable to both live and on-demand use cases.

At any point of time, a video rendered by an application on a HMD renders a portion of the 360-degrees video. Viewport may be defined as this portion of the 360-degree video. A viewport may be understood as a window on the 360 world represented in the omnidirectional video displayed via a rendering display. According to another definition, a viewport may defined as a part of the spherical video that is currently displayed. A viewport may be characterized by horizontal and vertical field of views (FOV or FoV).

A viewport size may correspond to the HMD FoV or may have a smaller size, depending on the application. For the sake of clarity, we define as primary viewport the part of the 360 degrees space viewed by a user at any given point of time.

When a bitstream with multiple sub-layers (a.k.a. multi-sub-layer bitstream), such as an HEVC bitstream with multiple sub-layers, is stored in a file, such as an ISOBMFF file, it may be allowed to store of one or more sub-layers into a track and more than one track may be used to contain the bitstream. For example, a track may contain only certain sub-layers and need not contain the lowest sub-layer (e.g. the sub-layer with TemporalId equal to 0 in HEVC).

A viewpoint may be defined as the point or space from which the user views the scene; it usually corresponds to a camera position. Slight head motion does not imply a different viewpoint. A viewing position may be defined as the position within a viewing space from which the user views the scene. A viewing space may be defined as a 3D space of viewing positions within which rendering of image and video is enabled and VR experience is valid.

Typical representation formats for volumetric content include triangle meshes, point clouds and voxels. Temporal information about the content may comprise individual capture instances, i.e. frames or the position of objects as a function of time.

Advances in computational resources and in three-dimensional acquisition devices enable reconstruction of highly-detailed volumetric representations. Infrared, laser, time-of-flight and structured light technologies are examples of how such content may be constructed. The representation of volumetric content may depend on how the data is to be used. For example, dense voxel arrays may be used to represent volumetric medical images. In three-dimensional graphics, polygon meshes are extensively used. Point clouds, on the other hand, are well suited to applications such as capturing real-world scenes where the topology of the scene is not necessarily a two-dimensional surface or manifold. Another method is to code three-dimensional data to a set of texture and depth maps. Closely related to this is the use of elevation and multi-level surface maps. For the avoidance of doubt, embodiments herein are applicable to any of the above technologies.

"Voxel" of a three-dimensional world corresponds to a pixel of a two-dimensional world. Voxels exist in a three-dimensional grid layout. An octree is a tree data structure used to partition a three-dimensional space. Octrees are the three-dimensional analog of quadtrees. A sparse voxel octree (SVO) describes a volume of a space containing a set of solid voxels of varying sizes. Empty areas within the volume are absent from the tree, which is why it is called "sparse".

A three-dimensional volumetric representation of a scene may be determined as a plurality of voxels on the basis of input streams of at least one multicamera device. Thus, at least one but preferably a plurality (i.e. 2, 3, 4, 5 or more) of multicamera devices may be used to capture 3D video representation of a scene. The multicamera devices are distributed in different locations in respect to the scene, and therefore each multicamera device captures a different 3D video representation of the scene. The 3D video representations captured by each multicamera device may be used as input streams for creating a 3D volumetric representation of the scene, said 3D volumetric representation comprising a plurality of voxels. Voxels may be formed from the captured 3D points e.g. by merging the 3D points into voxels comprising a plurality of 3D points such that for a selected 3D point, all neighbouring 3D points within a predefined threshold from the selected 3D point are merged into a voxel without exceeding a maximum number of 3D points in a voxel.

Voxels may also be formed through the construction of the sparse voxel octree. Each leaf of such a tree represents a solid voxel in world space; the root node of the tree represents the bounds of the world. The sparse voxel octree construction may have the following steps: 1) map each input depth map to a world space point cloud, where each pixel of the depth map is mapped to one or more 3D points; 2) determine voxel attributes such as colour and surface normal vector by examining the neighbourhood of the source pixel(s) in the camera images and the depth map; 3) determine the size of the voxel based on the depth value from the depth map and the resolution of the depth map; 4) determine the SVO level for the solid voxel as a function of its size relative to the world bounds; 5) determine the voxel coordinates on that level relative to the world bounds; 6) create new and/or traversing existing SVO nodes until arriving at the determined voxel coordinates; 7) insert the solid voxel as a leaf of the tree, possibly replacing or merging attributes from a previously existing voxel at those coordinates. Nevertheless, the size of voxel within the 3D volumetric representation of the scene may differ from each other. The voxels of the 3D volumetric representation thus represent the spatial locations within the scene.

A volumetric video frame may be regarded as a complete sparse voxel octree that models the world at a specific point in time in a video sequence. Voxel attributes contain information like colour, opacity, surface normal vectors, and surface material properties. These are referenced in the sparse voxel octrees (e.g. colour of a solid voxel), but can also be stored separately.

Point clouds are commonly used data structures for storing volumetric content.

Compared to point clouds, sparse voxel octrees describe a recursive subdivision of a finite volume with solid voxels of varying sizes, while point clouds describe an unorganized set of separate points limited only by the precision of the used coordinate values.

In technologies such as dense point clouds and voxel arrays, there may be tens or even hundreds of millions of points. In order to store and transport such content between entities, such as between a server and a client over an IP network, compression is usually required.

User's position can be detected relative to content provided within the volumetric virtual reality content, e.g. so that the user can move freely within a given virtual reality space, around individual objects or groups of objects, and can view the objects from different angles depending on the movement (e.g. rotation and location) of their head in the real world. In some examples, the user may also view and explore a plurality of different virtual reality spaces and move from one virtual reality space to another one.

The angular extent of the environment observable or hearable through a rendering arrangement, such as with a head-mounted display, may be called the visual field of view (FOV). The actual FOV observed or heard by a user depends on the inter-pupillary distance and on the distance between the lenses of the virtual reality headset and the user's eyes, but the FOV can be considered to be approximately the same for all users of a given display device when the virtual reality headset is being worn by the user.

When viewing volumetric content from a single viewing position, a portion (often half) of the content may not be seen because it is facing away from the user. This portion is sometimes called "back facing content".

A volumetric image/video delivery system may comprise providing a plurality of patches representing part of a volumetric scene, and providing, for each patch, patch visibility information indicative of a set of directions from which a forward surface of the patch is visible. A volumetric image/video delivery system may further comprise providing one or more viewing positions associated with a client device, and processing one or more of the patches dependent on whether the patch visibility information indicates that the forward surface of the one or more patches is visible from the one or more viewing positions.

Patch visibility information is data indicative of where in the volumetric space the forward surface of the patch can be seen. For example, patch visibility information may comprise a visibility cone, which may comprise a visibility cone direction vector (X, Y, Z) and an opening angle (A). The opening angle (A) defines a set of spatial angles from which the forward surface of the patch can be seen. In another example, the patch visibility metadata may comprise a definition of a bounding sphere surface and sphere region metadata, identical or similar to that specified by the omnidirectional media format (OMAF) standard (ISO/IEC 23090-2). The bounding sphere surface may for example be defined by a three-dimensional location of the centre of the sphere, and the radius of the sphere. When the viewing position collocates with the bounding sphere surface, the patch may be considered visible within the indicated sphere region. In general, the geometry of the bounding surface may also be something other than a sphere, such as cylinder, cube, or cuboid. Multiple sets of patch visibility metadata may be defined for the same three-dimensional location of the centre of the bounding surface, but with different radii (or information indicative of the distance of the bounding surface from the three-dimensional location). Indicating several pieces of patch visibility metadata may be beneficial to handle occlusions.

A volumetric image/video delivery system may comprise one or more patch culling modules. One patch culling module may be configured to determine which patches are transmitted to a user device, for example the rendering module of the headset. Another patch culling module may be configured to determine which patches are decoded. A third patch culling module may be configured to determine which decoded patches are passed to rendering. Any combination of patch culling modules may be present or active in a volumetric image/video delivery or playback system. Patch culling may utilize the patch visibility information of patches, the current viewing position, the current viewing orientation, the expected future viewing positions, and/or the expected future viewing orientations.

In some cases, each volumetric patch may be projected to a two-dimensional colour (or other form of texture) image and to a corresponding depth image, also known as a depth map. This conversion enables each patch to be converted back to volumetric form at a client rendering module of the headset using both images.

In some cases, a source volume of a volumetric image, such as a point cloud frame, may be projected onto one or more projection surfaces. Patches on the projection surfaces may be determined, and those patches may be arranged onto one or more two-dimensional frames. As above, texture and depth patches may be formed similarly. shows a projection of a source volume to a projection surface, and inpainting of a sparse projection. In other words, a three-dimensional (3D) scene model, comprising geometry primitives such as mesh elements, points, and/or voxel, is projected onto one or more projection surfaces. These projection surface geometries may be "unfolded" onto 2D planes (typically two planes per projected source volume: one for texture, one for depth). The "unfolding" may include determination of patches. 2D planes may then be encoded using standard 2D image or video compression technologies. Relevant projection geometry information may be transmitted alongside the encoded video files to the decoder. The decoder may then decode the coded image/video sequence and perform the inverse projection to regenerate the 3D scene model object in any desired representation format, which may be different from the starting format e.g. reconstructing a point cloud from original mesh model data.

It should be understood that volumetric image/video can comprise, additionally or alternatively to texture and depth, other types of patches, such as reflectance, opacity or transparency (e.g. alpha channel patches), surface normal, albedo, and/or other material or surface attribute patches.

Two-dimensional form of patches may be packed into one or more atlases. Texture atlases are known in the art, comprising an image consisting of sub-images, the image being treated as a single unit by graphics hardware and which can be compressed and transmitted as a single image for subsequent identification and decompression. Geometry atlases may be constructed similarly to texture atlases. Texture and geometry atlases may be treated as separate pictures (and as separate picture sequences in case of volumetric video), or texture and geometry atlases may be packed onto the same frame, e.g. similarly to how frame packing is conventionally performed. Atlases may be encoded as frames with an image or video encoder.

The sub-image layout in an atlas may also be organized such that it is possible to encode a patch or a set of patches having similar visibility information into spatiotemporal units that can be decoded independently of other spatiotemporal units. For example, a tile grid, as understood in the context of High Efficiency Video Coding (HEVC), may be selected for encoding and an atlas may be organized in a manner such that a patch or a group of patches having similar visibility information can be encoded as a motion-constrained tile set (MCTS).

In some cases, one or more (but not the entire set of) spatiotemporal units may be provided and stored as a track, as is understood in the context of the ISO base media file format, or as any similar container file format structure. Such a track may be referred to as a patch track. Patch tracks may for example be sub-picture tracks, as understood in the context of OMAF, or tile tracks, as understood in the context of ISO/IEC 14496-15.

In some cases, several versions of the one or more atlases are encoded. Different versions may include, but are not limited to, one or more of the following: different bitrate versions of the one or more atlases at the same resolution; different spatial resolutions of the atlases; and different versions for different random access intervals; these may include one or more intra-coded atlases (where every picture can be randomly accessed).

In some cases, combinations of patches from different versions of the texture atlas may be prescribed and described as metadata, such as extractor tracks, as will be understood in the context of OMAF and/or ISO/IEC 14496-15.

When the total sample count of a texture atlas and, in some cases, of the respective geometry pictures and/or other auxiliary pictures (if any) exceeds a limit, such as a level limit of a video codec, a prescription may be authored in a manner so that the limit is obeyed. For example, patches may be selected from a lower-resolution texture atlas according to subjective importance. The selection may be performed in a manner that is not related to the viewing position. The prescription may be accompanied by metadata characterizing the obeyed limit(s), e.g. the codec Level that is obeyed.

A prescription may be made specific to a visibility cone (or generally to a specific visibility) and hence excludes the patches not visible in the visibility cone. The selection of visibility cones for which the prescriptions are generated may be limited to a reasonable number, such that switching from one prescription to another is not expected to occur frequently. The visibility cones of prescriptions may overlap to avoid switching back and forth between two prescriptions. The prescription may be accompanied by metadata indicative of the visibility cone (or generally visibility information).

A prescription may use a specific grid or pattern of independent spatiotemporal units. For example, a prescription may use a certain tile grid, wherein tile boundaries are also MCTS boundaries. The prescription may be accompanied by metadata indicating potential sources (e.g. track groups, tracks, or representations) that are suitable as spatiotemporal units.

In some cases, a patch track forms a Representation in the context of DASH. Consequently, the Representation element in DASH MPD may provide metadata on the patch, such as patch visibility metadata, related to the patch track. Clients may select patch Representations and request (Sub) segments from the selected Representations on the basis of patch visibility metadata.

A collector track may be defined as a track that extracts implicitly or explicitly coded video data, such as coded video data of MCTSs or sub-pictures, from other tracks. When resolved by a file reader or alike, a collector track may result into a bitstream that conforms to a video coding standard or format. A collector track may for example extract MCTSs or sub-pictures to form a coded picture sequence where MCTSs or sub-pictures are arranged to a grid. For example, when a collector track extracts two MCTSs or sub-pictures, they may be arranged into a 2×1 grid of MCTSs or sub-pictures. As discussed subsequently, an extractor track that extracts MCTSs or sub-pictures from other tracks may be regarded as a collector track. A tile base track as discussed subsequently is another example of a collector track. A collector track may also called a collection track. A track that is a source for extracting to a collector track may be referred to as a collection item track.

Extractors specified in ISO/IEC 14496-15 for H.264/AVC and HEVC enable compact formation of tracks that extract NAL unit data by reference. An extractor is a NAL-unit-like structure. A NAL-unit-like structure may be specified to comprise a NAL unit header and NAL unit payload like any NAL units, but start code emulation prevention (that is required for a NAL unit) might not be followed in a NAL-unit-like structure. For HEVC, an extractor contains one or more constructors. A sample constructor extracts, by reference, NAL unit data from a sample of another track. An in-line constructor includes NAL unit data. The term in-line may be defined e.g. in relation to a data unit to indicate that a containing syntax structure contains or carries the data unit (as opposed to includes the data unit by reference or through a data pointer). When an extractor is processed by a file reader that requires it, the extractor is logically replaced by the bytes resulting when resolving the contained constructors in their appearance order. Nested extraction may be disallowed, e.g. the bytes referred to by a sample constructor shall not contain extractors; an extractor shall not reference, directly or indirectly, another extractor. An extractor may contain one or more constructors for extracting data from the current track or from another track that is linked to the track in which the extractor resides by means of a track reference of type 'scal'. The bytes of a resolved extractor may represent one or more entire NAL units. A resolved extractor starts with a valid length field and a NAL unit header. The bytes of a sample constructor are copied only from the single identified sample in the track referenced through the indicated 'scal' track reference. The alignment is on decoding time, i.e. using the time-to-sample table only, followed by a counted offset in sample number. Extractors are a media-level concept and hence apply to the destination track before any edit list is considered. (However, one would normally expect that the edit lists in the two tracks would be identical).

The following syntax may be used:

```
class aligned(8) Extractor ( ) {
    NALUnitHeader( );
    do {
        unsigned int(8)  constructor_type;
        if( constructor_type == 0 )
            SampleConstructor( );
        else if( constructor_type == 2 )
            InlineConstructor( );
    } while( !EndOfNALUnit( ) )
}
```

The semantics may be defined as follows:
NALUnitHeader( ): The first two bytes of HEVC NAL units. A particular nal_unit_type value indicates an extractor, e.g. nal_unit_type equal to 49.
constructor_type specifies the constructor being used.
EndOfNALUnit( ) is a function that returns 0 (false) when more data follows in this extractor; otherwise it returns 1 (true).

The sample constructor (SampleConstructor) may have the following syntax:

```
class aligned(8) SampleConstructor ( ) {
    unsigned int(8) track_ref_index;
    signed int(8) sample_offset;
    unsigned int((lengthSizeMinusOne+1)*8)
        data_offset;
    unsigned int((lengthSizeMinusOne+1)*8)
        data_length;
}
``` track_ref_index identifies the source track from which data is extracted. track_ref_index is the index of the track reference of type 'scal'. The first track reference has the index value 1; the value 0 is reserved.

The sample in that track from which data is extracted is temporally aligned or nearest preceding in the media decoding timeline, i.e. using the time-to-sample table only, adjusted by an offset specified by sample_offset with the sample containing the extractor. sample_offset gives the relative index of the sample in the linked track that shall be used as the source of information. Sample 0 (zero) is the sample with the same, or the closest preceding, decoding time compared to the decoding time of the sample containing the extractor; sample 1 (one) is the next sample, sample −1 (minus 1) is the previous sample, and so on.

data_offset: The offset of the first byte within the reference sample to copy. If the extraction starts with the first byte of data in that sample, the offset takes the value 0.

data_length: The number of bytes to copy.

The syntax of the in-line constructor may be specified as follows:

```
class aligned(8) InlineConstructor ( ) {
    unsigned int(8) length;
    unsigned int(8) inline_data[length];
}
``` length: the number of bytes that belong to the InlineConstructor following this field.
inline_data: the data bytes to be returned when resolving the in-line constructor.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

In many video communication or transmission systems, transport mechanisms, and multimedia container file formats, there are mechanisms to transmit or store a scalability layer separately from another scalability layer of the same bitstream, e.g. to transmit or store the base layer separately from the enhancement layer(s). It may be considered that layers are stored in or transmitted through separate logical channels. Examples are provided in the following:

- ISO Base Media File Format (ISOBMFF, ISO/IEC International Standard 14496-12): Base layer can be stored as a track and each enhancement layer can be stored in another track. Similarly, in a hybrid codec scalability case, a non-HEVC-coded base layer can be stored as a track (e.g. of sample entry type 'avc1'), while the enhancement layer(s) can be stored as another track which is linked to the base-layer track using so-called track references.
- Real-time Transport Protocol (RTP): an RTP stream can be used to convey one ore more layers, and hence RTP streams of the same RTP session can logically separate different layers.
- MPEG-2 transport stream (TS): Each layer can have a different packet identifier (PID) value.

Many video communication or transmission systems, transport mechanisms, and multimedia container file formats provide means to associate coded data of separate logical channels, such as of different tracks or sessions, with each other. For example, there are mechanisms to associate coded data of the same access unit together. For example, decoding or output times may be provided in the container file format or transport mechanism, and coded data with the same decoding or output time may be considered to form an access unit.

Recently, Hypertext Transfer Protocol (HTTP) has been widely used for the delivery of real-time multimedia content over the Internet, such as in video streaming applications. Unlike the use of the Real-time Transport Protocol (RTP) over the User Datagram Protocol (UDP), HTTP is easy to configure and is typically granted traversal of firewalls and network address translators (NAT), which makes it attractive for multimedia streaming applications.

Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats," International Standard, 2nd Edition, 2014). 3GPP continued to work on adaptive HTTP streaming in communication with MPEG and published 3GP-DASH (Dynamic Adaptive Streaming over HTTP; 3GPP TS 26.247: "Transparent end-to-end packet-switched streaming Service (PSS); Progressive download and dynamic adaptive Streaming over HTTP (3GP-DASH)". MPEG DASH and 3GP-DASH are technically close to each other and may therefore be collectively referred to as DASH. Some concepts, formats, and operations of DASH are described below as an example of a video streaming system, wherein the embodiments may be implemented. The aspects of the invention are not limited to DASH, but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MDP provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

Figure 8:
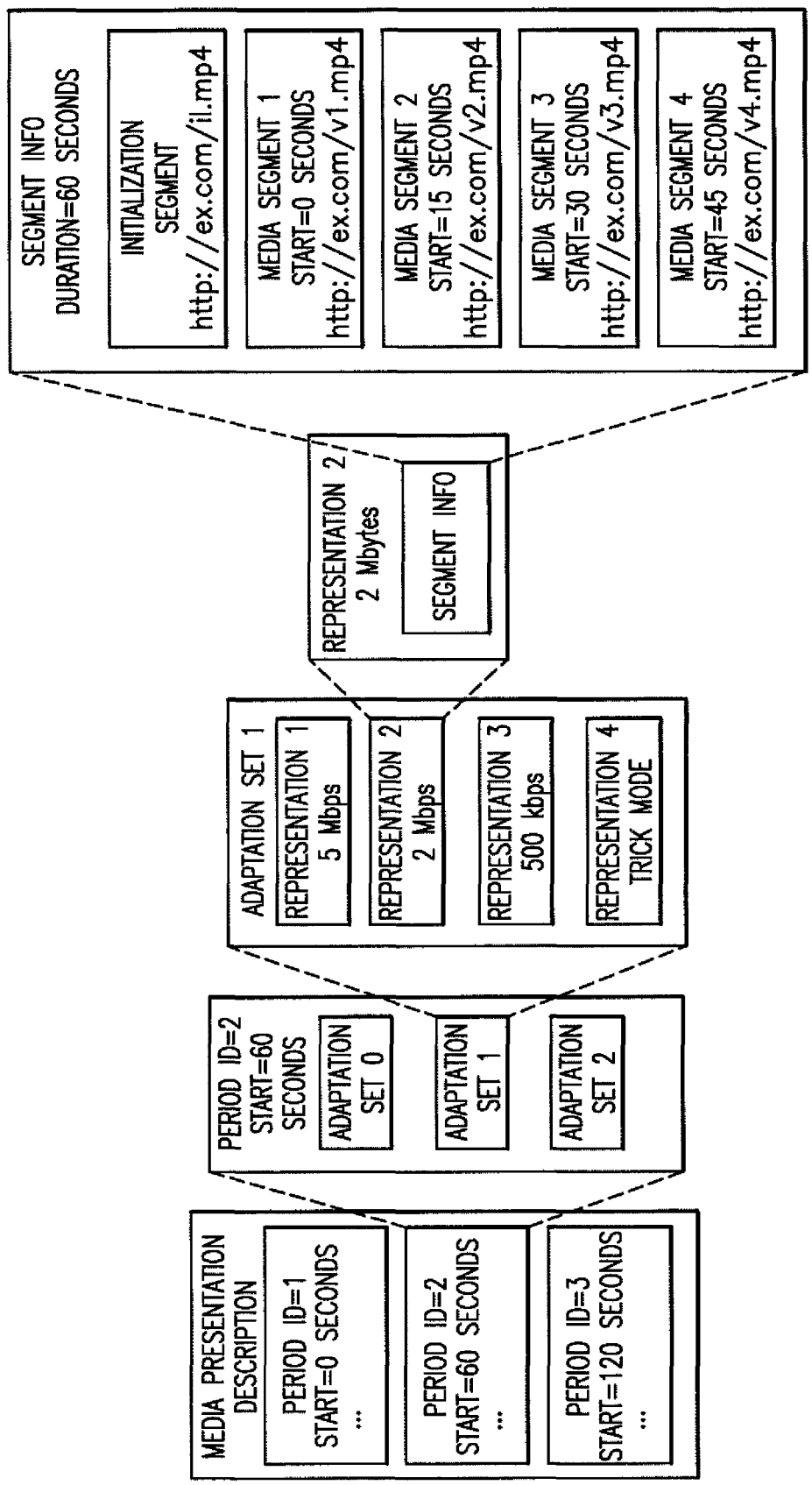
FIG. 8 shows an example of a hierarchical data model used in DASH.

In DASH, hierarchical data model is used to structure media presentation as shown in FIG. 8. A media presentation consists of a sequence of one or more Periods, each Period contains one or more Groups, each Group contains one or more Adaptation Sets, each Adaptation Sets contains one or more Representations, each Representation consists of one or more Segments. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attribute as defined in XML. The MPD may be specified using the following conventions: Elements in an XML document may be identified by an upper-case first letter and may appear in bold face as Element although element names in this document might or might not be bolded. To express that an element Element1 is contained in another element Element2, one may write Element2.Element1. If an element's name consists of two or more combined words, camel-casing may be used, e.g. ImportantElement. Elements may be present either exactly once, or the minimum and maximum occurrence may be defined by <minOccurs> . . . <maxOccurs>. Attributes in an XML document may be identified by a lower-case first letter as well as they may be preceded by a '@'-sign, e.g. @attribute. To point to a specific attribute @attribute contained in an element Element, one may write Element@attribute. If an attribute's name consists of two or more combined words, camelcasing may be used after the first word, e.g. @veryImportantAttribute. Attributes may have assigned a status in the XML as mandatory (M), optional (O), optional with default value (OD) and conditionally mandatory (CM).

In DASH, all descriptor elements are structured in the same way, namely they contain a @schemeIdUri attribute that provides a URI to identify the scheme and an optional attribute @value and an optional attribute @id. The semantics of the element are specific to the scheme employed. The URI identifying the scheme may be a URN or a URL. Some descriptors are specified in MPEG-DASH (ISO/IEC 23009-1), while descriptors can additionally or alternatively be specified in other specifications. When specified in specifications other than MPEG-DASH, the MPD does not provide any specific information on how to use descriptor elements. It is up to the application or specification that employs DASH formats to instantiate the description elements with appropriate scheme information. Applications or specifications that use one of these elements define a Scheme Identifier in the form of a URI and the value space for the element when that Scheme Identifier is used. The Scheme Identifier appears in the @schemeIdUri attribute. In the case that a simple set of enumerated values are required, a text string may be defined for each value and this string may be included in the @value attribute. If structured data is required then any extension element or attribute may be defined in a separate namespace. The @id value may be used to refer to a unique descriptor or to a group of descriptors. In the latter case, descriptors with identical values for the attribute @id may be required to be synonymous, i.e. the processing of one of the descriptors with an identical value for @id is sufficient. Two elements of type DescriptorType are equivalent, if the element name, the value of the @schemeIdUri and the value of the @value attribute are equivalent. If the @schemeIdUri is a URN, then equivalence may refer to lexical equivalence as defined in clause of RFC 2141. If the @schemeIdUri is a URL, then equivalence may refer to equality on a character-for-character basis as defined in clause 6.2.1 of RFC3986. If the @value attribute is not present, equivalence may be determined by the equivalence for @schemeIdUri only. Attributes and element in extension namespaces might not be used for determining equivalence. The @id attribute may be ignored for equivalence determination.

MPEG-DASH specifies descriptors EssentialProperty and SupplementalProperty. For the element EssentialProperty the Media Presentation author expresses that the successful processing of the descriptor is essential to properly use the information in the parent element that contains this descriptor unless the element shares the same @id with another EssentialProperty element. If EssentialProperty elements share the same @id, then processing one of the EssentialProperty elements with the same value for @id is sufficient. At least one EssentialProperty element of each distinct @id value is expected to be processed. If the scheme or the value for an EssentialProperty descriptor is not recognized the DASH client is expected to ignore the parent element that contains the descriptor. Multiple EssentialProperty elements with the same value for @id and with different values for @id may be present in an MPD.

For the element SupplementalProperty the Media Presentation author expresses that the descriptor contains supplemental information that may be used by the DASH client for optimized processing. If the scheme or the value for a SupplementalProperty descriptor is not recognized the DASH client is expected to ignore the descriptor. Multiple SupplementalProperty elements may be present in an MPD.

In DASH, an independent representation may be defined as a representation that can be processed independently of any other representations. An independent representation may be understood to comprise an independent bitstream or an independent layer of a bitstream. A dependent representation may be defined as a representation for which Segments from its complementary representations are necessary for presentation and/or decoding of the contained media content components. A dependent representation may be understood to comprise e.g. a predicted layer of a scalable bitstream. A complementary representation may be defined as a representation which complements at least one dependent representation. A complementary representation may be an independent representation or a dependent representation. Dependent Representations may be described by a Representation element that contains a @dependencyId attribute. Dependent Representations can be regarded as regular Representations except that they depend on a set of complementary Representations for decoding and/or presentation. The @dependencyId contains the values of the @id attribute of all the complementary Representations, i.e. Representations that are necessary to present and/or decode the media content components contained in this dependent Representation.

Track references of ISOBMFF can be reflected in the list of four-character codes in the @associationType attribute of DASH MPD that is mapped to the list of Representation@id values given in the @associationId in a one to one manner. These attributes may be used for linking media Representations with metadata Representations.

A DASH service may be provided as on-demand service or live service. In the former, the MPD is a static and all Segments of a Media Presentation are already available when a content provider publishes an MPD. In the latter, however, the MPD may be static or dynamic depending on the Segment URLs construction method employed by a MPD and Segments are created continuously as the content is produced and published to DASH clients by a content provider. Segment URLs construction method may be either template-based Segment URLs construction method or the Segment list generation method. In the former, a DASH client is able to construct Segment URLs without updating an MPD before requesting a Segment. In the latter, a DASH client has to periodically download the updated MPDs to get Segment URLs. For live service, hence, the template-based Segment URLs construction method is superior to the Segment list generation method.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments e.g. to enable downloading segments in multiple parts. Subsegments may be required to contain complete access units.

Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

The notation (Sub)segment refers to either a Segment or a Subsegment. If Segment Index boxes are not present, the notation (Sub)segment refers to a Segment. If Segment Index boxes are present, the notation (Sub)segment may refer to a Segment or a Subsegment, e.g. depending on whether the client issues requests on Segment or Subsegment basis.

Segments (or respectively Subsegments) may be defined to be non-overlapping as follows: Let $T_E(S,i)$ be the earliest presentation time of any access unit in stream i of a Segment or Subsegment S, and let $T_L(S,i)$ be the latest presentation time of any access unit in stream i of a Segment or Subsegment S. Two segments (respectively Subsegments), A and B, which may or may not be of different Representations, may be defined to be non-overlapping, when $T_L(A,i)<T_E(B,i)$ for all media streams i in A and B or if $T_L(B,i)<T_E(A,i)$ for all streams i in A and B where i refers to the same media component.

It may be required that for any dependent Representation X that depends on complementary Representation Y, the m-th Subsegment of X and the n-th Subsegment of Y shall be non-overlapping whenever m is not equal to n. It may be required that for dependent Representations the concatenation of the Initialization Segment with the sequence of Subsegments of the dependent Representations, each being preceded by the corresponding Subsegment of each of the complementary Representations in order as provided in the @dependencyId attribute shall represent a conforming Subsegment sequence conforming to the media format as specified in the @mimeType attribute for this dependent Representation.

MPEG-DASH defines segment-container formats for both ISO Base Media File Format and MPEG-2 Transport Streams. Other specifications may specify segment formats based on other container formats. For example, a segment format based on Matroska container file format has been proposed and may be summarized as follows. When Matroska files are carried as DASH segments or alike, the association of DASH units and Matroska units may be specified as follows. A subsegment (of DASH) may be are defined as one or more consecutive Clusters of Matroska-encapsulated content. An Initialization Segment of DASH may be required to comprise the EBML header, Segment header (of Matroska), Segment Information (of Matroska) and Tracks, and may optionally comprise other level1 elements and padding. A Segment Index of DASH may comprise a Cues Element of Matroska.

DASH specifies different timelines including Media Presentation timeline and Segment availability times. The former indicates the presentation time of access unit with a media content which is mapped to the global common presentation timeline. Media Presentation timeline enables DASH to seamlessly synchronize different media components which is encoded with different coding techniques and shares a common timeline. The latter indicates a wall-clock time and is used to signal clients the availability time of Segments which is identified by HTTP URLs. A DASH client is able to identify an availability time of a certain Segment by comparing the wall-clock time to the Segment availability time assigned to that Segment. Segment availability time plays a key role in live delivery of media Segments, referred as live service. For live service, the Segment availability time is different from Segment to Segment and a certain Segment's availability time depends on the position of the Segment in the Media Presentation timeline. For on-demand service, the Segment availability time is typically the same for all Segments.

DASH supports rate adaptation by dynamically requesting Media Segments from different Representations within an Adaptation Set to match varying network bandwidth. When a DASH client switches up/down Representation, coding dependencies within Representation have to be taken into account. A Representation switch may happen at a random access point (RAP), which is typically used in video coding techniques such as H.264/AVC. In DASH, a more general concept named Stream Access Point (SAP) is introduced to provide a codec-independent solution for accessing a Representation and switching between Representations. In DASH, a SAP is specified as a position in a Representation that enables playback of a media stream to be started using only the information contained in Representation data starting from that position onwards (preceded by initialising data in the Initialisation Segment, if any). Hence, Representation switching can be performed in SAP.

In DASH the automated selection between Representations in the same Adaptation Set have been performed based on the width and height (@width and @height); the frame rate (@frameRate); the bitrate (@bandwidth); indicated quality ordering between the Representations (@qualityRanking). The semantics of @qualityRanking are specified as follows: specifies a quality ranking of the Representation relative to other Representations in the same Adaptation Set. Lower values represent higher quality content. If not present, then no ranking is defined.

Several types of SAP have been specified, including the following. SAP Type 1 corresponds to what is known in some coding schemes as a "Closed GOP random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times less than intra-coded picture associated with the SAP.

Stream access points (which may also or alternatively be referred to as layer access point) for layered coding may be defined similarly in a layer-wise manner. A SAP for layer may be defined as a position in a layer (or alike) that enables playback of the layer to be started using only the information from that position onwards assuming that the reference layers of the layer have already been decoded earlier.

A stream access point (SAP) sample group as specified in ISOBMFF identifies samples as being of the indicated SAP type. The grouping_type_parameter for the SAP sample group comprises the fields target_layers and layer_id_method_idc. target_layers specifies the target layers for the indicated SAPs. The semantics of target_layers may depend on the value of layer_id_method_idc. layer_id_method_idc specifies the semantics of target_layers. layer_id_method_idc equal to 0 specifies that the target layers consist of all the layers represented by the track. The sample group description entry for the SAP sample group comprises the fields dependent_flag and SAP_type. dependent_flag may be required to be 0 for non-layered media. dependent_flag equal to 1 specifies that the reference layers, if any, for predicting the target layers may have to be decoded for accessing a sample of this sample group. dependent_flag equal to 0 specifies that the reference layers, if any, for predicting the target layers need not be decoded for accessing any SAP of this sample group. sap_type values in the range of 1 to 6, inclusive, specify the SAP_type, of the associated samples.

A sync sample may be defined as a sample corresponding to SAP_type 1 or 2. A sync sample can be regarded as a media sample that starts a new independent sequence of samples; if decoding starts at the sync sample, it and succeeding samples in decoding order can all be correctly decoded, and the resulting set of decoded samples forms the correct presentation of the media starting at the decoded sample that has the earliest composition time. Sync samples can be indicated with the SyncSampleBox (for those samples whose metadata is present in a TrackBox) or within sample flags (more specifically the sample_is_non_sync_sample flag) indicated or inferred for track fragment runs.

A content provider may create Segment and Subsegment of multiple Representations in a way that makes switching simpler. In a simple case, each Segment and Subsegment starts with a SAP and the boundaries of Segment and Subsegment are aligned across the Representation of an Adaptation Set. In such a case a DASH client is able to switch Representations without error drift by requesting Segments or Subsegments from an original Representation to a new Representation. In DASH, restrictions to construct Segment and Subsegment are specified in MPD and Segment Index in order to facilitate a DASH client to switch Representations without introducing an error drift. One of the usages of profile specified in DASH is to provide different levels of restrictions to construct Segments and Subsegments.

MPEG-DASH includes a feature, which may be referred to as Segment Independent SAP Signaling (SISSI) enabling signaling of Segments starting with SAP having uneven durations. SISSI facilitates switching within an Adaptation Set and across Adaptation Sets.

In switching within an Adaptation Set, the switching refers to the presentation of decoded data from one Representation up to a certain time t, and presentation of decoded data of another Representation from time t onwards. If Representations are included in one Adaptation Set, and the client switches properly, the Media Presentation is expected to be perceived seamless across the switch. Clients may ignore Representations that rely on codecs or other rendering technologies they do not support or that are otherwise unsuitable.

The Switching element as defined in Table 1 provides instructions of switch points within an Adaptation Set and the permitted switching options as defined in Table 2. This element may be used instead of the attributes @segmentAlignment or @bitstreamSwitching.

TABLE 1

Switch Point Signalling

| Element or Attribute Name | Use | Description |
|---|---|---|
| Switching | | Switching logic description for the associated Representation |
| @interval | M | specifies the interval between two switching points in the scale of the @timescale on Representation level. Any Segment for which the earliest presentation time minus the @t value of the S element describing the segment is an integer multiple of the product of @timescale and @interval is a switch-to opportunity, i.e. it enables to switch to this Representation with the switching strategy as defined by the @type value. The value may be such that it is aligned with the values in the Segment Timeline, i.e. a multiple of the value of the @d attribute. |
| @type | OD default: 'media' | specifies the switching strategy for the switch points identified in by the @interval attribute. Switching strategies are defined in Table 2. |

Table 2 defines different switching strategies that provide instructions to the client on the procedures to switch appropriately within an Adaptation Set.

TABLE 2

Switching Strategies

| Type | Description |
|---|---|
| media | Media level switching: In this case switching is possible at the switch point by decoding and presenting switch-from Representation up to switch point t, initializing the switch-to Representation with the associated |

TABLE 2-continued

Switching Strategies

| Type | Description |
|---|---|
| | Initialization Segment and continue decoding and presenting the switch-to Representation from time t onwards. |
| bitstream | Bitstream switching: In this case switching is possible at the switch point by decoding and presenting switch-from Representation up to switch point t, and continue decoding and presenting the switch-to Representation from time t onwards. Initialization of the switch-to Representation is not necessary and is not recommended. |

The XML schema snippet is as follows:

```
<!-- Switching -->
<xs:complexType name="SwitchingType">
   <xs:attribute name="interval" type="xs:unsignedInt" use="required"/>
   <xs:attribute name="type" type="SwitchingTypeType"/>
   <xs:anyAttribute namespace="##other" processContents="lax"/>
</xs:complexType>
<!--Switching Type type enumeration -->
<xs:simpleType name="SwitchingTypeType">
   <xs:restriction base="xs:string">
      <xs:enumeration value="media"/>
      <xs:enumeration value="bitstream"/>
   </xs:restriction>
</xs:simpleType>
```

In switching across Adaptation Sets, Representations in two or more Adaptation Sets may provide the same content. In addition, the content may be time-aligned and may be offered such that seamless switching across Representations in different Adaptation Sets is possible. Typical examples are the offering of the same content with different codecs, for example H.264/AVC and H.265/HEVC and the content author wants to provide such information to the receiver in order to seamlessly switch Representations across different Adaptation Sets. Such switching permission may be used by advanced clients.

A content author may signal such seamless switching property across Adaptation Sets by providing a Supplemental Descriptor along with an Adaptation Set with @schemeIdURI set to urn:mpeg:dash:adaptation-set-switching:2016 and the @value is a comma-separated list of Adaptation Set IDs that may be seamlessly switched to from this Adaptation Set.

If the content author signals the ability of Adaptation Set switching and as @segmentAlignment or @subsegmentAlignment are set to TRUE or the Switching element is provided for one Adaptation Set, the (Sub)Segment alignment or Switching element is valid for all Representations in all Adaptation Sets for which the @id value is included in the @value attribute of the Supplemental descriptor.

As an example, a content author may signal that seamless switching across an H.264/AVC Adaptation Set with AdaptationSet@id="h264" and an HEVC Adaptation Set with AdaptationSet@id="h265" is possible by adding a Supplemental Descriptor to the H.264/AVC Adaptation Set with @schemeIdURI set to urn:mpeg:dash:adaptation-set-switching:2016 and the @value="h265" and by adding a Supplemental Descriptor to the HEVC Adaptation Set with @schemeIdURI set to urn:mpeg:dash:adaptation-set-switching:2016 and the @value="h264".

In addition, if the content author signals the ability of Adaptation Set switching for any Adaptation Sets then the parameters as defined for an Adaption Set also holds for all Adaptation Sets that are included in the @value attribute. Note that this constraint may result that the switching may only be signaled with one Adaptation Set, but not with both as for example one Adaptation Set signaling may include all spatial resolutions of another one, whereas it is not the case the other way round.

Random Access may refer to start processing, decoding and presenting the Representation from the random access point at time t onwards by initializing the Representation with the Initialization Segment, if present and decoding and presenting the Representation from the signaled Segment onwards, i.e. from the earliest presentation time of the signaled Segment. Random Access point may be signaled with the RandomAccess element as defined in Table 3.

TABLE 3

Random Access Point Signalling

| Element or Attribute Name | Use | Description |
|---|---|---|
| RandomAccess | | Random Access Information |
| @interval | M | specifies the position of the random access points in the Representations. The information is specified in the scale of the @timescale on Representation level. Any Segment for which the earliest presentation time minus the @t value of the S element describing the segment is an integer multiple of the product of @timescale and @interval is a random access opportunity, i.e. it enables randomly access to this Representation with the random access strategy as defined by the @type value. The value should be such that it is aligned with the values in the Segment Timeline, i.e. a multiple of the value of the @d attribute. |
| @type | OD default: "closed" | specifies the random access strategy for the random access points in by the @interval attribute. The value uses a type present in Table 4. If the value of the type is unknown, the DASH client is expected to ignore the containing Random Access element. |
| @minBufferTime | O | specifies a common duration used in the definition of the Representation data rate (using the @bandwidth attribute). If not present, then the value of the MPD level is inherited. |
| @bandwidth | O | Consider a hypothetical constant bitrate channel of bandwidth with the value of this attribute in bits per second (bps). Then, if the Representation is continuously delivered at this bitrate, starting at any RAP indicated in this element a client can be assured of having enough data for continuous playout providing playout begins after @minBufferTime * @bandwidth bits have been received (i.e. at time @minBufferTime after the first bit is received). For dependent Representations this value specifies the bandwidth according to the above definition for the aggregation of this Representation and all complementary Representations. If not present, the value of the Representation is inherited. |

TABLE 4

Random Access Type Values

| Type | Informative description |
| --- | --- |
| closed | Closed GOP random access. This implies that the segment is a Random Access Segment as well as the segment starts with a SAP type of 1 or 2. Note that SAP type 1 or 2 is a necessary condition, but not sufficient. In addition, all requirements of a Random Access Segment need to be fulfilled. |
| open | Open GOP random access. This implies that the segment is a Random Access Segment as well as the segment starts with a SAP type of 1, 2 or 3. Note that SAP type 1, 2 or 3 is a necessary condition, but not sufficient. In addition, all requirements of a Random Access Segment need to be fulfilled. |
| gradual | Gradual decoder refresh random. This implies that the segment is a Random Access Segment as well as the segment starts with a SAP type of 1, 2, 3 or 4. Note that SAP type 1 2, 3 or 4 is a necessary condition, but not sufficient. In addition, all requirements of a Random Access Segment need to be fulfilled. |

The DASH standard includes mechanisms to enable fast start-up of a media session. For example, the MPD may announce more than one representation, with different bitrates, in an Adaptation Set. Moreover, each segment and/or subsegment could start with a stream access point, where the pictures within the segment and/or subsegment are coded without referencing to any other picture from a different segment. This way a DASH client may start with a lower bitrate representation in order to increase the buffer occupancy level quickly. Then the client may then switch to requesting segment(s) and/or subsegment(s) of a higher bit rate representation (which may have e.g. a higher spatial resolution than the representation received earlier). The client may target to reach a certain buffer occupancy level, e.g. in terms of media duration, during the fast start-up and may target to keep the same or similar buffer occupancy level during the operation after a fast start-up phase. The client may start media playback after initiating a media streaming session and/or after a random access operation only after a certain amount of media has been buffered. This amount of media may be equal to but need not relate to the buffer occupancy level that is targeted to be reached at fast start-up. In all cases, the fast start-up may enable the client to start the media playback faster than would be possible if only a higher bitrate representation would be consistently received after initiating a media streaming session and/or after a random access operation.

As described above, the client or player may request Segments or Subsegments to be transmitted from different representations similarly to how the transmitted layers and/or sub-layers of a scalable video bitstream may be determined. Terms representation down-switching or bitstream down-switching may refer to requesting or transmitting a lower bitrate representation than what was requested or transmitted (respectively) previously. Terms representation up-switching or bitstream up-switching may refer to requesting or transmitting a higher bitrate representation than what was requested or transmitted (respectively) previously. Terms representation switching or bitstream switching may refer collectively to representation or bitstream up- and down-switching and may also or alternatively cover switching of representations or bitstreams of different viewpoints.

A DASH Preselection defines a subset of media components of an MPD that are expected to be consumed jointly by a single decoder instance, wherein consuming may comprise decoding and rendering. The Adaptation Set that contains the main media component for a Preselection is referred to as main Adaptation Set. In addition, each Preselection may include one or multiple partial Adaptation Sets. Partial Adaptation Sets may need to be processed in combination with the main Adaptation Set. A main Adaptation Set and partial Adaptation Sets may be indicated by one of the two means: a preselection descriptor or a Preselection element.

Streaming systems similar to MPEG-DASH include for example HTTP Live Streaming (a.k.a. HLS), specified in the IETF Internet Draft draft-pantos-http-live-streaming-13 (and other versions of the same Internet Draft). As a manifest format corresponding to the MPD, HLS uses an extended M3U format. M3U is a file format for multimedia playlists, originally developed for audio files. An M3U Playlist is a text file that consists of individual lines, and each line is a URI, blank, or starts with the character '#' indicating a tag or a comment. A URI line identifies a media segment or a Playlist file. Tags begin with #EXT. The HLS specification specifies a number of tags, which may be regarded as key-value pairs. The value part of tags may comprise an attribute list, which is a comma-separated list of attribute-value pairs, where an attribute-value pair may be considered to have the syntax AttributeName= Attribute-Value. Hence, tags of HLS M3U8 files may be considered similar to Elements in MPD or XML, and attributes of HLS M3U8 files may be considered similar to Attributes in MPD or XML. Media segments in HLS are formatted according to the MPEG-2 Transport Stream and contain a single MPEG-2 Program. Each media segment is recommended to start with a Program Association Table (PAT) and a Program Map Table (PMT).

In viewport-dependent streaming, which may be also referred to as viewport-adaptive or viewport-specific streaming, a subset of 360-degree video content covering the viewport (i.e., the current view orientation) is transmitted at a better quality and/or higher resolution than the quality and/or resolution for the remaining of 360-degree video. There are several alternatives to achieve viewport-dependent omnidirectional video streaming. In tile-based viewport-dependent streaming, projected pictures are partitioned into tiles that are coded as motion-constrained tile sets (MCTSs) or alike. Several versions of the content are encoded at different bitrates or qualities using the same MCTS partitioning. Each MCTS sequence is made available for streaming as a DASH Representation or alike. The player selects on MCTS basis which bitrate or quality is received.

H.264/AVC does not include the concept of tiles, but the operation like MCTSs can be achieved by arranging regions vertically as slices and restricting the encoding similarly to encoding of MCTSs. For simplicity, the terms tile and MCTS are used in this document but should be understood to apply to H.264/AVC too in a limited manner. In general, the terms tile and MCTS should be understood to apply to similar concepts in any coding format or specification.

One possible subdivision of the tile-based viewport-dependent streaming schemes is the following:

Region-wise mixed quality (RWMQ) 360° video: Several versions of the content are coded with the same resolution, the same tile grid, and different bitrate/picture quality. Players choose high-quality MCTSs for the viewport.

Viewport+360° video: One or more bitrate and/or resolution versions of a complete low-resolution/low-quality omnidirectional video are encoded and made available for streaming. In addition, MCTS-based encoding is performed and MCTS sequences are made available for streaming. Players receive a complete low-resolution/low-quality omnidirectional video and select and receive the high-resolution MCTSs covering the viewport.

Region-wise mixed resolution (RWMR) 360° video: MCTSs are encoded at multiple resolutions. Players select a combination of high resolution MCTSs covering the viewport and low-resolution MCTSs for the remaining areas.

It needs to be understood that there may be other ways to subdivide tile-based viewport-dependent streaming methods to categories than the one described above. Moreover, the above-described subdivision may not be exhaustive, i.e. they may be tile-based viewport-dependent streaming methods that do not belong to any of the described categories.

All above-described viewport-dependent streaming approaches, tiles or MCTSs (or guard bands of tiles or MCTSs) may overlap in sphere coverage by an amount selected in the pre-processing or encoding.

All above-described viewport-dependent streaming approaches may be realized with client-driven bitstream rewriting (a.k.a. late binding) or with author-driven MCTS merging (a.k.a. early binding). In late binding, a player selects MCTS sequences to be received, selectively rewrites portions of the received video data as necessary (e.g. parameter sets and slice segment headers may need to be rewritten) for combining the received MCTSs into a single bitstream, and decodes the single bitstream. Early binding refers to the use of author-driven information for rewriting portions of the received video data as necessary, for merging of MCTSs into a single bitstream to be decoded, and in some cases for selection of MCTS sequences to be received. There may be approaches in between early and late binding: for example, it may be possible to let players select MCTS sequences to be received without author guidance, while an author-driven approach is used for MCTS merging and header rewriting. Early binding approaches include an extractor-driven approach and tile track approach, which are described subsequently.

In the tile track approach, one or more motion-constrained tile set sequences are extracted from a bitstream, and each extracted motion-constrained tile set sequence is stored as a tile track (e.g. an HEVC tile track) in a file. A tile base track (e.g. an HEVC tile base track) may be generated and stored in a file. The tile base track represents the bitstream by implicitly collecting motion-constrained tile sets from the tile tracks. At the receiver side the tile tracks to be streamed may be selected based on the viewing orientation. The client may receive tile tracks covering the entire omnidirectional content. Better quality or higher resolution tile tracks may be received for the current viewport compared to the quality or resolution covering the remaining 360-degree video. A tile base track may include track references to the tile tracks, and/or tile tracks may include track references to the tile base track. For example, in HEVC, the 'sabt' track reference is used used to refer to tile tracks from a tile base track, and the tile ordering is indicated by the order of the tile tracks contained by a 'sabt' track reference. Furthermore, in HEVC, a tile track has is a 'tbas' track reference to the tile base track.

In the extractor-driven approach, one or more motion-constrained tile set sequences are extracted from a bitstream, and each extracted motion-constrained tile set sequence is modified to become a compliant bitstream of its own (e.g. HEVC bitstream) and stored as a sub-picture track (e.g. with untransformed sample entry type 'hvc1' for HEVC) in a file. One or more extractor tracks (e.g. an HEVC extractor tracks) may be generated and stored in a file. The extractor track represents the bitstream by explicitly extracting (e.g. by HEVC extractors) motion-constrained tile sets from the sub-picture tracks. At the receiver side the sub-picture tracks to be streamed may be selected based on the viewing orientation. The client may receive sub-picture tracks covering the entire omnidirectional content. Better quality or higher resolution sub-picture tracks may be received for the current viewport compared to the quality or resolution covering the remaining 360-degree video.

It needs to be understood that even though the tile track approach and extractor-driven approach are described in details, specifically in the context of HEVC, they apply to other codecs and similar concepts as tile tracks or extractors. Moreover, a combination or a mixture of tile track and extractor-driven approach is possible. For example, such a mixture could be based on the tile track approach, but where a tile base track could contain guidance for rewriting operations for the client, e.g. the tile base track could include rewritten slice or tile group headers.

As an alternative to MCTS-based content encoding, content authoring for tile-based viewport-dependent streaming may be realized with sub-picture-based content authoring, described as follows. The pre-processing (prior to encoding) comprises partitioning uncompressed pictures to sub-pictures. Several sub-picture bitstreams of the same uncompressed sub-picture sequence are encoded, e.g. at the same resolution but different qualities and bitrates. The encoding may be constrained in a manner that merging of coded sub-picture bitstream to a compliant bitstream representing omnidirectional video is enabled. For example, dependencies on samples outside the decoded picture boundaries may be avoided in the encoding by selecting motion vectors in a manner that sample locations outside the picture would not be referred in the inter prediction process. Each sub-picture bitstream may be encapsulated as a sub-picture track, and one or more extractor tracks merging the sub-picture tracks of different sub-picture locations may be additionally formed. If a tile track based approach is targeted, each sub-picture bitstream is modified to become an MCTS sequence and stored as a tile track in a file, and one or more tile base tracks are created for the tile tracks.

Tile-based viewport-dependent streaming approaches may be realized by executing a single decoder instance or one decoder instance per MCTS sequence (or in some cases, something in between, e.g. one decoder instance per MCTSs of the same resolution), e.g. depending on the capability of the device and operating system where the player runs. The use of single decoder instance may be enabled by late binding or early binding. To facilitate multiple decoder instances, the extractor-driven approach may use sub-picture tracks that are compliant with the coding format or standard without modifications. Other approaches may need either to rewrite image segment headers, parameter sets, and/or alike information in the client side to construct a conforming bitstream or to have a decoder implementation capable of decoding an MCTS sequence without the presence of other coded video data.

There may be at least two approaches for encapsulating and referencing tile tracks or sub-picture tracks in the tile track approach and the extractor-driven approach, respectively:

Referencing track identifiers from a tile base track or an extractor track.

For the tile track approach, tile tracks and the tile base track of each bitstream may be encapsulated in an own file, and the same track identifiers are used in all files (e.g. representing different bitrate versions of the same content). In other words, the same track identifier value is used for each tile track of the same tile grid position in all these files. Thus, the tile base track is identical in all files, and the any one of the collocated tile tracks may be received.

For the extractor-driven approach, each of the sub-picture tracks of the same content at the same resolution but different bitrate may be encapsulated in an own file, and the same track identifiers may be used in all files (e.g. representing different bitrate versions of the same content); thus, track references from the extractor track resolve correctly to any bitrate versions of the received sub-picture tracks.

Referencing tile group identifiers from a tile base track or an extractor track. Several files are required in the track-identifier-based referencing described above, which may make its usage e.g. for file playback somewhat cumbersome. An option would be to store all tile or sub-picture tracks into the same file with different track identifiers, but then a separate tile base track or extractor track may be needed for each combination of tile or sub-picture tracks, respectively, that forms a conforming bitstream. To avoid creating an excessive number of tile base tracks or extractor tracks (e.g., to avoid creating an extractor track for each combination of high-resolution and low-resolution tiles), tracks that are alternatives for extraction may be grouped with a mechanism described in the following. Likewise, to enable the use of the same tile base track for collocated tile tracks representing different bitrate versions of the same content, the following mechanism may be used.

A file writer indicates in a file that a track group, e.g. referred to as 'alte' track group, contains tracks that are alternatives to be used as a source for extraction.

The identifier for the 'alte' group may be taken from the same numbering space as the identifier for tracks. In other words, the identifier for the 'alte' group may be required to differ from all the track identifier values. Consequently, the 'alte' track group identifier may be used in places where track identifier is conventionally used. Specifically, the 'alte' track group identifier may be used as a track reference indicating the source for extraction.

Members of the track group formed by this box are alternatives to be used as a source for extraction. Members of the track group with track_group_type equal to 'alte' are alternatives to be used as a source for 'scal' or 'sabt' track reference. A TrackReferenceTypeBox of reference_type equal to track_ref_4cc may list the track_group_id value(s) of an 'alte' track group(s) of containing the same alte_track_ref_4cc value in addition to or instead of track ID values. For example, an extractor track may, through a 'scal' track reference, point to an 'alte' track group in addition to or instead of individual tracks. Any single track of the 'alte' track group is a suitable source for extraction. A player or a file reader or alike may change the source track for extraction at a position where the track switched to has a sync sample or a SAP sample of type 1 or 2.

In the RWMQ method, one extractor track per each picture size and each tile grid is sufficient. In 360°+viewport video and RWMR video, one extractor track may be needed for each distinct viewing orientation.

An approach similar to above-described tile-based viewport-dependent streaming approaches, which may be referred to as tile rectangle based encoding and streaming, is described next. This approach may be used with any video codec, even if tiles similar to HEVC were not available in the codec or even if motion-constrained tile sets or alike were not implemented in an encoder. In tile rectangle based encoding, the source content is split into tile rectangle sequences before encoding. Each tile rectangle sequence covers a subset of the spatial area of the source content, such as full panorama content, which may e.g. be of equirectangular projection format. Each tile rectangle sequence is then encoded independently from each other as a single-layer bitstream. Several bitstreams may be encoded from the same tile rectangle sequence, e.g. for different bitrates. Each tile rectangle bitstream may be encapsulated in a file as its own track (or alike) and made available for streaming. At the receiver side the tracks to be streamed may be selected based on the viewing orientation. The client may receive tracks covering the entire omnidirectional content. Better quality or higher resolution tracks may be received for the current viewport compared to the quality or resolution covering the remaining, currently non-visible viewports. In an example, each track may be decoded with a separate decoder instance.

In viewport-adaptive streaming, the primary viewport (i.e., the current viewing orientation) is transmitted at a good quality/resolution, while the remaining of 360-degree video is transmitted at a lower quality/resolution. When the viewing orientation changes, e.g. when the user turns his/her head when viewing the content with a head-mounted display, another version of the content needs to be streamed, matching the new viewing orientation. In general, the new version can be requested starting from a stream access point (SAP), which are typically aligned with (Sub)segments. In single-layer video bitstreams, SAPs are intra-coded and hence costly in terms of rate-distortion performance. Conventionally, relatively long SAP intervals and consequently relatively long (Sub)segment durations in the order of seconds are hence typically used. Thus, the delay (here referred to as the viewport quality update delay) in upgrading the quality after a viewing orientation change (e.g. a head turn) is conventionally in the order of seconds and is therefore clearly noticeable and annoying.

As explained above, viewport switching in viewport-dependent streaming, which may be compliant with MPEG OMAF, is enabled at stream access points, which involve intra coding and hence a greater bitrate compared to respective inter coded pictures at the same quality. A compromise between the stream access point interval and the rate-distortion performance is hence chosen in an encoding configuration.

In order to reduce the viewport quality update delay, an approach has been proposed for merging the MCTSs from a first Representation having relatively long SAP intervals and from one or more second Representations having more frequent SAPs. This approach is discussed below in relation to FIGS. 9 and 10.

DASH allows creating Representations of a different stream access point interval. The RandomAccess element enables indicating intervals of stream access points for Segments flexibly and the SegmentIndexBox can be used for the same purpose for Subsegments. A content author may provide the same content at several quality and at several stream access point intervals. Segments or Subsegments have the same duration across the different Representations; i.e. they are time aligned.

Figure 9:
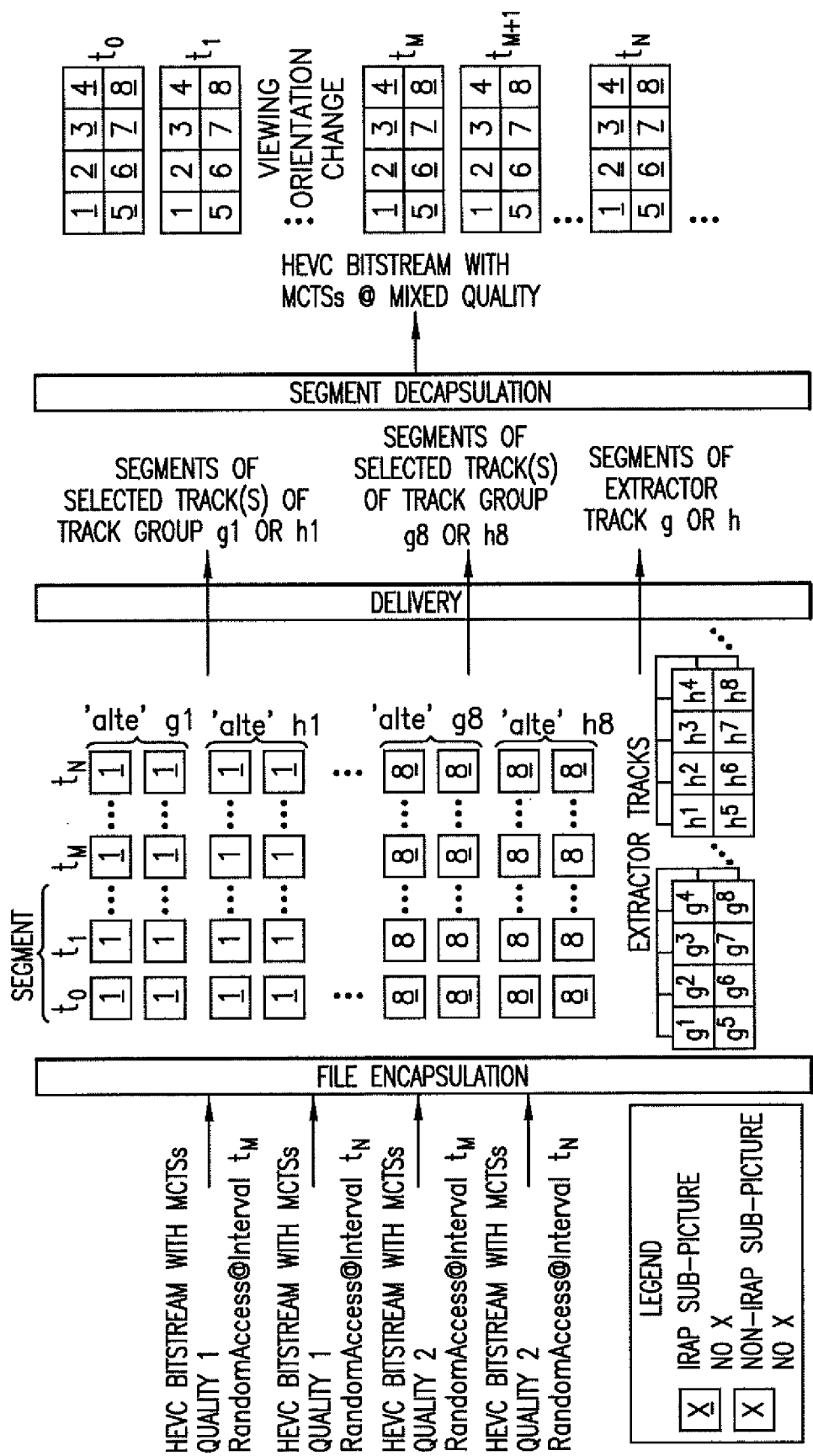
FIG. 9 shows an example of creating Representations of a different stream access point interval in DASH.

An example is described with reference to FIG. 9 by referring to Segments and hence by using the RandomAccess element but a similar operation could be achieved for Subsegments through the use of SegmentIndexBoxes.

Encoding: Four versions of the content are generated using either MCTS-based content authoring or sub-picture-based content authoring:
Bitstream 1: Quality 1, IDR picture interval $t_M$
Bitstream 2 (horizontal shading): Quality 1, IDR picture interval $t_N$ where N is an integer multiple of M
Bitstream 3 (vertical shading): Quality 2, IDR picture interval $t_M$ where M is the same as that in bitstream 1
Bitstream 4 (grid shading): Quality 2, IDR picture interval $t_N$ where N is the same as that in bitstream 2

The picture output order and the picture decoding order are kept respectively identical in all the four bitstreams.

Encapsulation of coded data: Groups of collocated sub-picture tracks of the same IDR picture interval are formed and indicated with the 'alte' track group.

Creation of extractor tracks: An extractor track is created per an IDR picture interval. The 'scal' track references in an extractor track refer to track group identifier values of the 'alte' track groups with the same IDR picture interval.

MPD and Segment Generation:
Each track forms a Representation in the MPD. An Adaptation Set is generated per each 'alte' track group, i.e., 16 sub-picture Adaptation Sets are created in this example.
Each extractor track is carried in a Representation in its own Adaptation Set, i.e., there are two extractor Adaptation Sets are created in this example.
A preselection descriptor is included in the Adaptation Set carrying to extractor track. The preselection descriptor points to the sub-picture Adaptation Sets used as source for extraction. The sub-picture Adaptation Sets contain a preselection essential descriptor or a content coverage descriptor to indicate that they do not provide a full coverage.
All Adaptation Sets or Representations contain the RandomAccess element with @interval set according to the IDR picture interval. In this example, a Segment is generated for each period of duration $t_M$.
Seamless switching between the two Adaptation Sets carrying extractor tracks is indicated with a supplemental descriptor with @schemeIdUri equal to urn:mpeg:dash:adaptation-set-switching:2016.

Example player behavior: The player discovers the main Adaptation Sets and selects the one with the greater @interval value ($t_N$ in this example), assuming that it would provide a better rate-distortion performance. When a viewing orientation switch causing a new selection of high-quality sub-picture tracks takes place, the player switches to the Adaptation Set with RandomAccess@interval equal to $t_M$ for the remaining of the interval of duration $t_N$. For the next interval of duration $t_N$, this process is repeated, i.e. the player first selects the Representation with the greater @interval value. It is remarked that this player behavior is provided only as an example, and other player strategies can be realized.

Figure 10A:
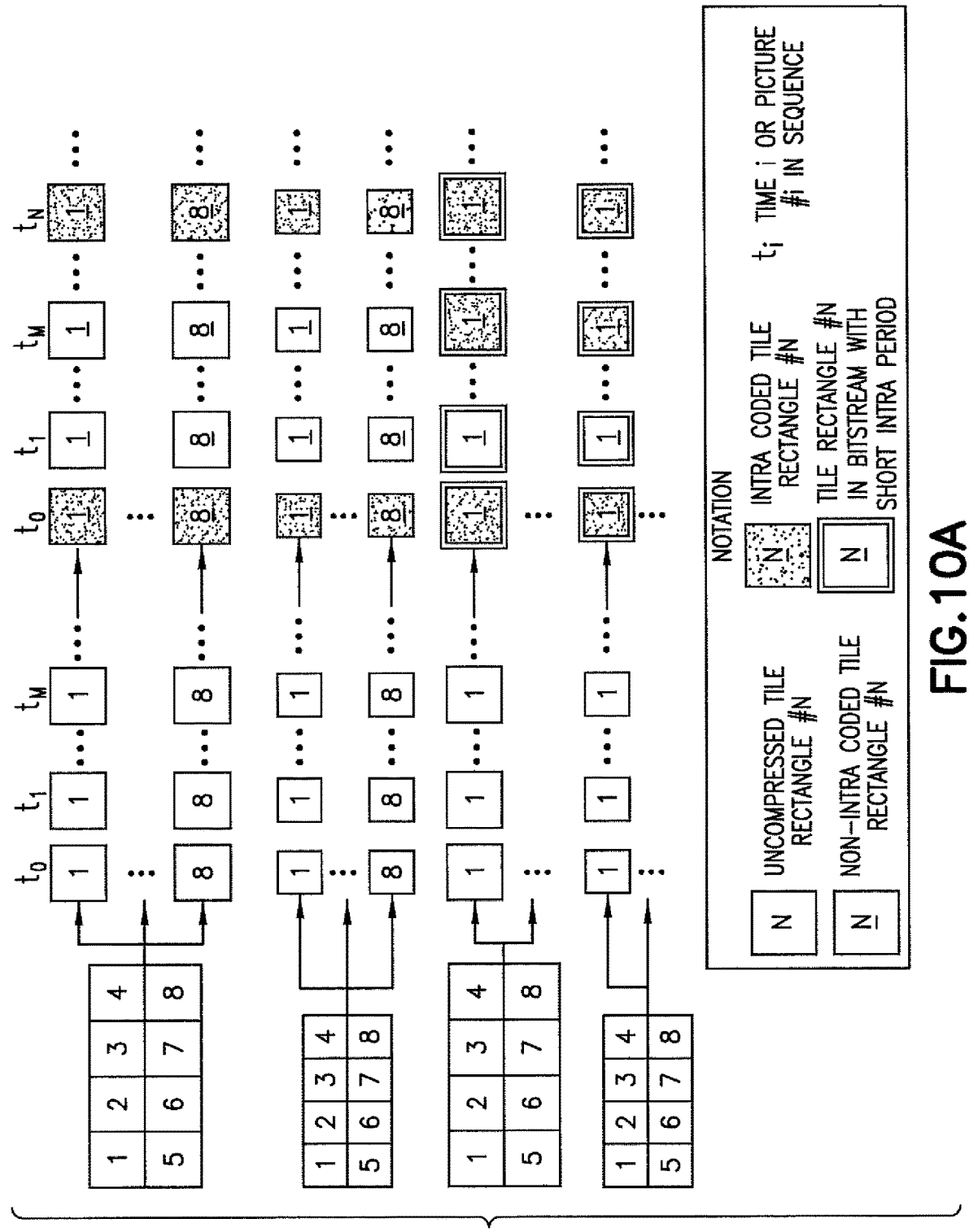
FIG. 10a shows an example of tile-based encoding first bitstreams having longer SAP intervals and second bitstreams having shorter SAP intervals.
Figure 10B:
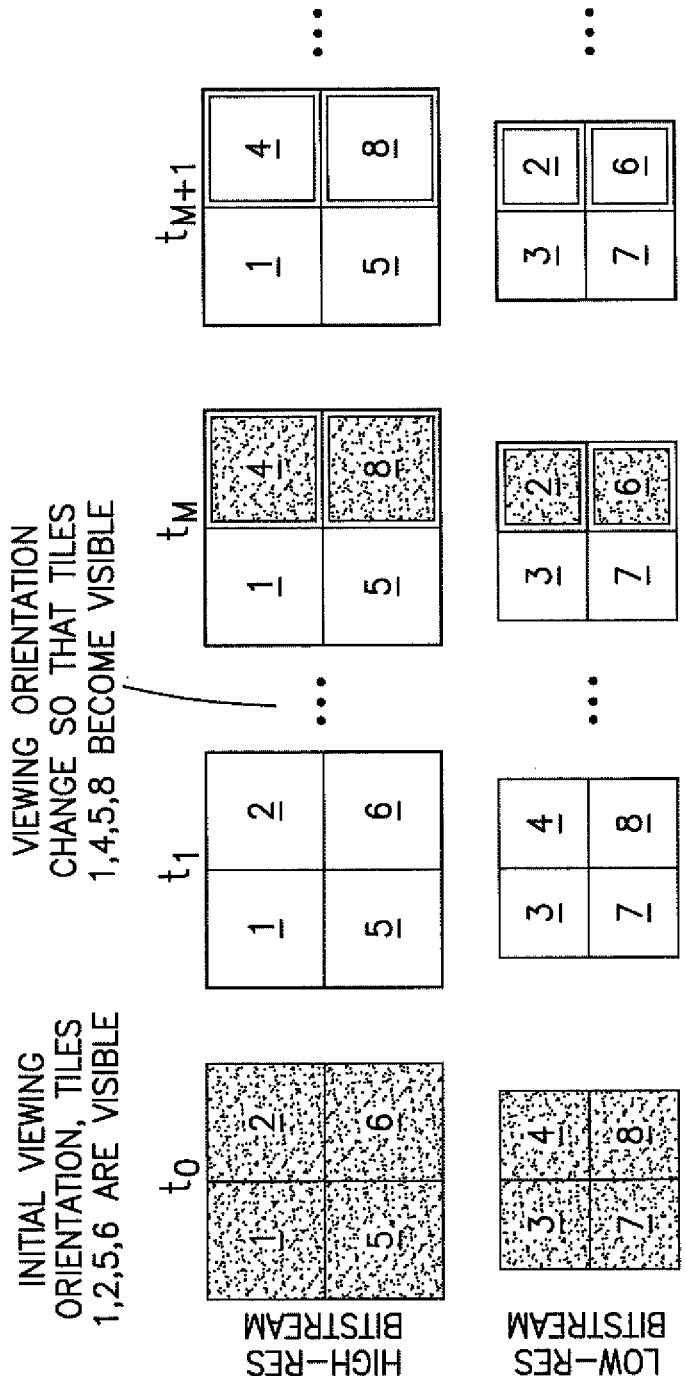
FIG. 10b shows an example of two bitstreams merged from tile rectangles of different quality.

Another realization of the approach for reducing the quality update delay may be illustrated by referring to FIGS. 10a and 10b using tile rectangles and tile rectangle sequences. FIG. 10a shows an example of tile-based encoding first bitstreams having longer SAP intervals and second bitstreams having shorter SAP intervals. Both the first and the second bitstreams include a bitstream streamed at higher quality, such as higher resolution (quality 1, intended for primary viewport streaming) and a bitstream streamed at lower quality, such as lower resolution (quality 2). In FIG. 10a, the two top-most bitstreams have the SAP period of N, and the two bottom-most bitstreams have the SAP period of M, M<N. The notation included in FIG. 10a indicates the different markings for uncompressed tile rectangles, intra/non-intra tile rectangles and tile rectangles having the short SAP period of M. It is assumed that tile rectangle sequences are encoded as described earlier in relation to sub-picture-based content authoring, which allows merging of tile rectangle sequence in coded domain. However, it should be understood that the described approach could be used when encoding has not been constrained provided that multiple decoders are used.

The initial viewing orientation is such that tile rectangles 1, 2, 5 and 6 are streamed at quality 1 (higher quality), and the remaining tile rectangles 3, 4, 7 and 8 are streamed at quality 2 (lower quality). Now two bitstreams, shown in FIG. 10b, can be merged from tile rectangles of different quality, such as different resolution, where the higher quality bitstream contains tile rectangles 1, 2, 5 and 6 and the lower quality bitstream contains tile rectangles 3, 4, 7 and 8. Content from the bitstreams having long SAP interval (i.e. the two top-most bitstreams) is initially streamed. At time instance to, the tile rectangles are encoded as intra tile rectangles and time instance ti, the tile rectangles are encoded as non-intra tile rectangles, as shown in FIG. 10b.

It is further considered that the viewing orientation changes before requesting or streaming pictures starting from $t_M$ so that different tile rectangles are merged into the same bitstream. As a result, tile rectangles 1, 4, 5, and 8 are streamed at quality 1 and the remaining tile rectangles 2, 3, 6 and 7 at quality 2. It is noted that the quality of tile rectangles 1, 3, 5 and 7 does not change as a response to the viewing orientation change. Consequently, they can be located in the same position within the merged frame as earlier and they need not to be streamed from the short SAP interval bitstreams, but temporal prediction is continued for the tile rectangles 1, 3, 5 and 7, thereby achieving a better streaming bitrate by continuing to stream tile rectangles 1, 3, 5 and 7 from the bitstreams having long SAP interval (i.e., the two top-most bitstreams). Tile rectangles whose resolution changes, i.e. tile rectangles 2, 4, 6 and 8, in response to the viewing orientation change are taken from the bitstreams with a short SAP interval (i.e., the two bottom-most bitstreams) and are located in available positions within the merged frame.

As a result, at time instances $t_M$ and $t_{M+1}$, the tile rectangles 1 and 5 are continued to streamed as higher quality non-intra tile rectangles, having an intra tile rectangle for temporal prediction at time instance to. Similarly, the tile rectangles 3 and 7 are continued to streamed at time instances $t_M$ and $t_{M+1}$ as lower quality non-intra tile rectangles, having an intra tile rectangle for temporal prediction at time instance to. The tile rectangles 4 and 8, in turn, are taken from the bitstreams with a short SAP interval and streamed as higher quality intra tile rectangles at time instance $t_M$ and as higher quality non-intra tile rectangles at time instance $t_{M+1}$, (i.e. predicted from the intra tile rectangles at time instance $t_M$). Similarly, tile rectangles 2 and 6 are taken from the bitstreams with a short SAP interval and streamed as lower quality intra tile rectangles at time instance $t_M$ and as lower quality non-intra tile rectangles at time instance $t_{M+1}$, (i.e. predicted from the intra tile rectangles at time instance $t_M$), as shown in FIG. 10b. As a result, significant streaming bitrate reduction may be achieved.

However, the finalized video coding standards do not allow mixing of coded video data of random-access pictures and non-random-access pictures into the same coded picture. Using the HEVC terminology, mixing VCL NAL units of IRAP and non-IRAP NAL unit types is not allowed. On the other hand, it may be referred intra-coded (sub-)pictures as random-access pictures, since that simplifies configuring the encoder and allows starting the decoding from those pictures. Consequently tiles 4, 8, 2, and 6 at time instance $t_M$ in the example of FIGS. 10a and 10b should preferably originate from random-access pictures whereas the other tiles should originate from non-random-access pictures.

Furthermore, it has been proposed to use the Switching element of DASH in the context of switching from one extractor Representation to another extractor Representation of the approach described with FIGS. 10a and 10b. While providing many benefits in switching between two extractor Representations, the approach has some limitations relating to region-wise mixed-quality tile-based viewport-dependent streaming, especially regarding switching from one sub-picture Representation to another sub-picture Representation.

Now an improved method for viewport-dependent streaming is introduced in order to at least alleviate the above problems. The method may additionally or alternatively be used for point cloud video or volumetric video for enabling delivery and/or decoding that is adaptive to viewing orientation and/or viewing position and may involve the content in multiple resolutions.

In addition to describing a method and embodiments for viewport-dependent streaming, several embodiments are described subsequently in relation to bitstream, video encoder, and/or video decoder. These embodiments may be applied independently of other embodiments (e.g. related to viewport-dependent streaming) or together with other embodiments. Several embodiments are described in relation to bitstream or its syntax. The bitstream embodiments also apply to respective embodiments for an encoder or encoding method, wherein the encoder generates a bitstream according to the bitstream embodiment. The bitstream embodiments also apply to respective embodiments for a decoder or decoding method, wherein the decoder decodes a bitstream according to the bitstream embodiment.

Figure 11:
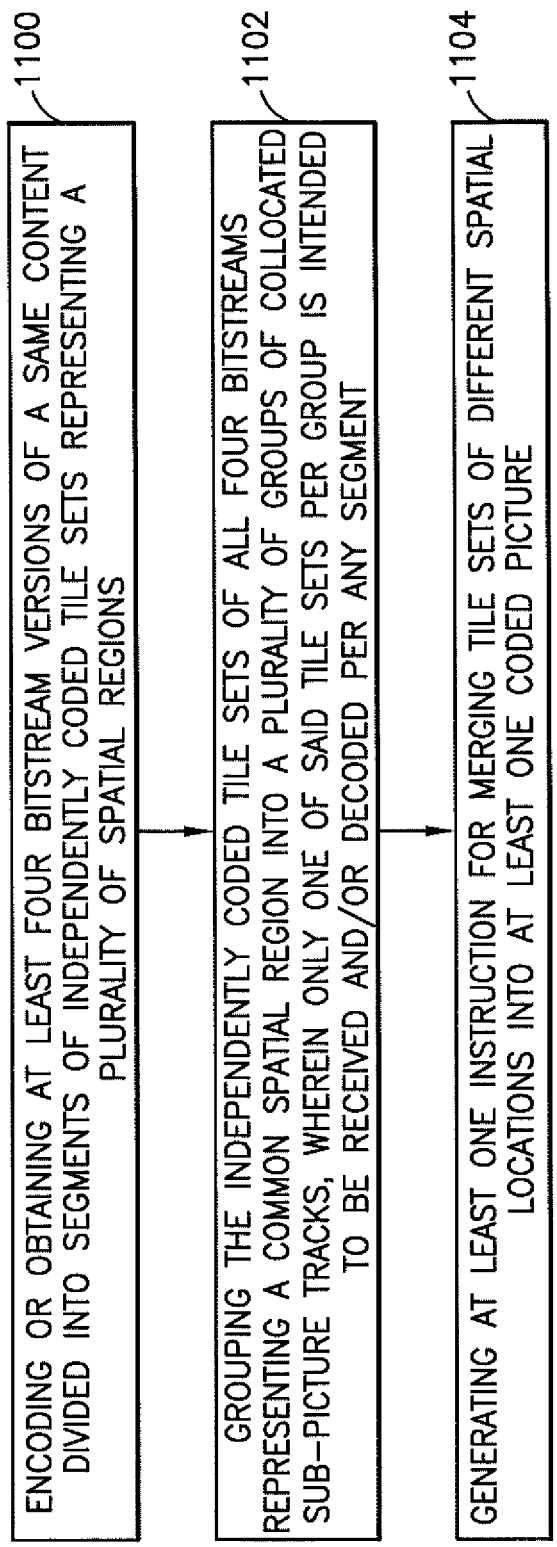
FIG. 11 shows a flow chart of an encoding method according to an embodiment of the invention.

The method according to an aspect, as shown in FIG. 11, comprises encoding or obtaining (1100) at least four bitstream versions of a same content divided into segments of independently coded tile sets representing a plurality of spatial regions, wherein a first and a second bitstream comprise independently coded tile sets encoded at a first quality, and a third and a fourth bitstream comprise independently coded tile sets encoded at a second quality, wherein the first and the third bitstream have first random access picture interval and the second and the fourth bitstream have second random access picture interval, which is an integer multiple of the first random access picture interval; grouping (1102) the independently coded tile sets of all four bitstreams representing a common spatial region into a plurality of groups of collocated sub-picture tracks, wherein only one of said tile sets per group is intended to be received and/or decoded per any segment; and generating (1104) at least one instruction for merging tile sets of different spatial locations into at least one coded picture, the at least one instruction causing a tile set originating from a random access picture to be decoded as a tile set originating from a non-random-access picture when merged with a tile set originating from a non-random-access picture.

According to an embodiment, the method further comprises encapsulating the at least one instruction into a collector track.

Figure 12:
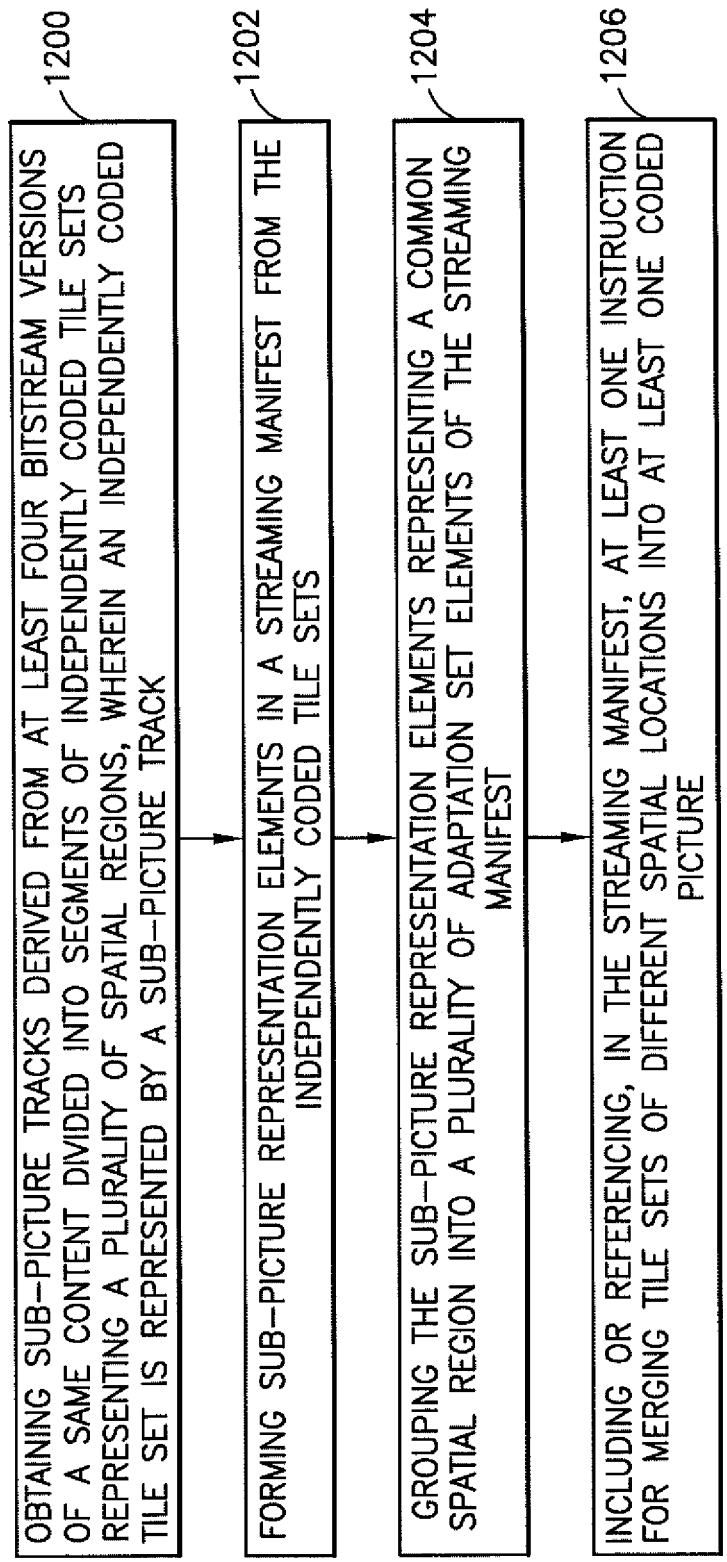
FIG. 12 shows a flow chart of a file writing method according to an embodiment of the invention.

A method according to another aspect, which may be implemented e.g. by a file writer and is shown in FIG. 12, comprises obtaining (1200) sub-picture tracks derived from at least four bitstream versions of a same content divided into segments of independently coded tile sets representing a plurality of spatial regions, wherein a first and a second bitstream comprise independently coded tile sets encoded at a first quality, and a third and a fourth bitstream comprise independently coded tile sets encoded at a second quality, wherein the first and the third bitstream have first random access picture interval and the second and the fourth bitstream have second random access picture interval, which is an integer multiple of the first random access picture interval, and wherein an independently coded tile set is represented by a sub-picture track; forming (1202) sub-picture representation elements in a streaming manifest from the independently coded tile sets; grouping (1204) the sub-picture representation elements representing a common spatial region into a plurality of adaptation set elements of the streaming manifest, wherein an adaptation set element comprises sub-picture representation elements of collocated sub-picture tracks, wherein content for only one of said sub-picture representation elements per adaptation set element is intended to be received and/or decoded per any segment; and including or referencing (1206), in the streaming manifest, at least one instruction for merging tile sets of different spatial locations into at least one coded picture, the at least one instruction causing a tile set originating from a random access picture to be decoded as a tile set originating from a non-random-access picture when merged with a tile set originating from a non-random-access picture.

According to an embodiment wherein the at least one instruction is encapsulated in a collector track, the method further comprises forming a collector representation element in the streaming manifest from the collector track.

According to an embodiment, the method further comprises indicating, in the streaming manifest, the first random access picture interval and the second random access picture interval; and indicating, in the streaming manifest, a mapping of the first random access picture interval and the second random access picture interval to the sub-picture representation elements.

Figure 13:
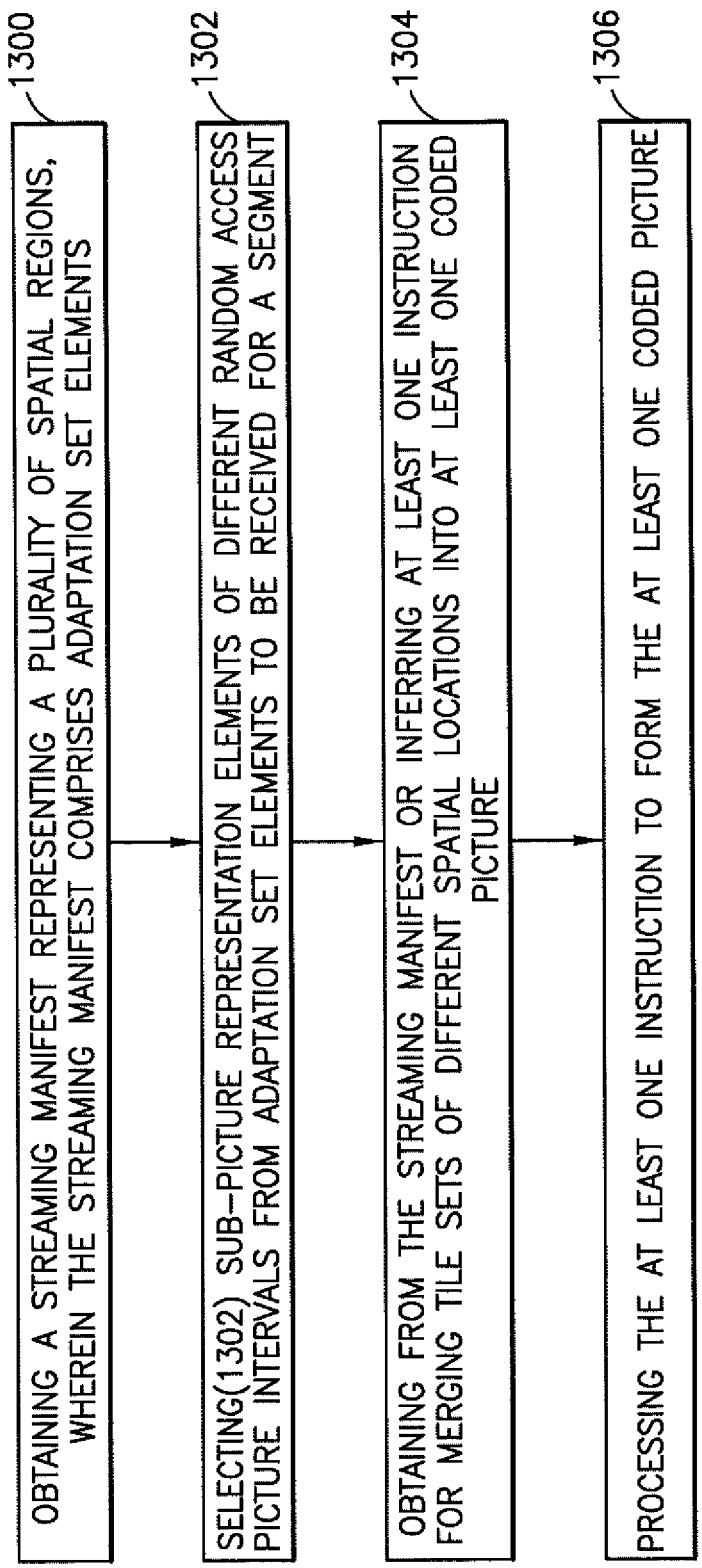
FIG. 13 shows a flow chart of a player operation according to an embodiment of the invention.

A method according to a further aspect, which may be implemented e.g. by a player and is shown in FIG. 13, comprises obtaining (1300) a streaming manifest representing a plurality of spatial regions, wherein the streaming manifest comprising adaptation set elements, the adaptation set elements comprising sub-picture representation elements of a common spatial resolution, wherein content for one sub-picture representation element per adaptation set element is intended to be received and/or decoded per any segment, the content for sub-picture representations comprises sub-picture tracks derived from at least four bitstream versions of a same content divided into segments of independently coded tile sets representing the plurality of spatial regions, wherein a first and a second bitstream comprise independently coded tile sets encoded at a first quality, and a third and a fourth bitstream comprise independently coded tile sets encoded at a second quality, wherein the first and the third bitstream have first random access picture interval and the second and the fourth bitstream have second random access picture interval; selecting (1302) sub-picture representation elements of different random access picture intervals from adaptation set elements to be received for a segment; obtaining (1304) from the streaming manifest or inferring at least one instruction for merging tile sets of different spatial locations into at least one coded picture, the at least one instruction causing a tile set originating from a random access picture to be decoded as a tile set originating from a non-random-access picture when merged with a tile set originating from a non-random-access picture; and processing (1306) the at least one instruction to form the at least one coded picture.

Figure 14:
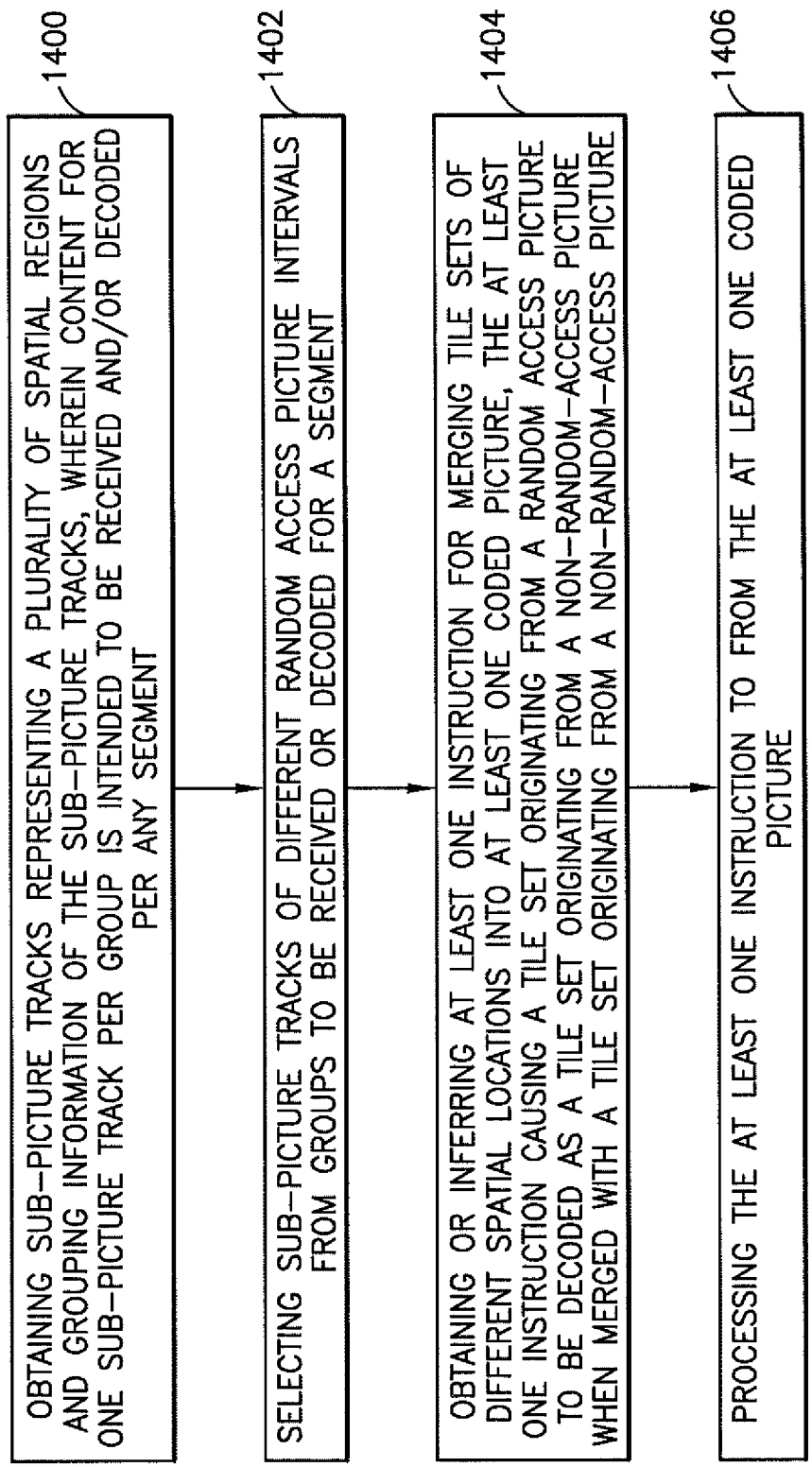
FIG. 14 shows a flow chart of a player operation according to an embodiment of the invention.

A method according to a further aspect, which may be implemented e.g. by a player and is shown in FIG. 14, comprises obtaining (1400) sub-picture tracks representing a plurality of spatial regions and grouping information of the sub-picture tracks, wherein the grouping information is indicative of groups comprising sub-picture tracks of a common spatial resolution, wherein content for one sub-picture track per group is intended to be received and/or decoded per any segment, the content for sub-picture tracks being derived from at least four bitstream versions of a same content divided into segments of independently coded tile sets representing the plurality of spatial regions, wherein a first and a second bitstream comprise independently coded tile sets encoded at a first quality, and a third and a fourth bitstream comprise independently coded tile sets encoded at a second quality, wherein the first and the third bitstream have first random access picture interval and the second and the fourth bitstream have second random access picture interval; selecting (1402) sub-picture tracks of different random access picture intervals from groups to be received or decoded for a segment; obtaining or inferring (1404) at least one instruction for merging tile sets of different spatial locations into at least one coded picture, the at least one instruction causing a tile set originating from a random access picture to be decoded as a tile set originating from a non-random-access picture when merged with a tile set originating from a non-random-access picture; and processing (1406) the at least one instruction to form the at least one coded picture.

According to an embodiment, said at least one instruction is obtained or inferred from a collector track, which may be e.g. an extractor track or a tile base track or alike.

The approach provides different solutions for enabling parts of the coded video data of a single time instance to originate from both random-access pictures and non-random-access pictures in a manner that the coded video data is merged into a single bitstream and can be decoded with a single video decoder. The feature can be used for but is not limited to partial intra updating responding to viewing orientation changes in viewport-dependent 360° video streaming. For example, the feature could be used in response to a change of viewing position and/or viewing orientation in streaming and/or decoding of point cloud data and/or volumetric video data.

Figure 15:
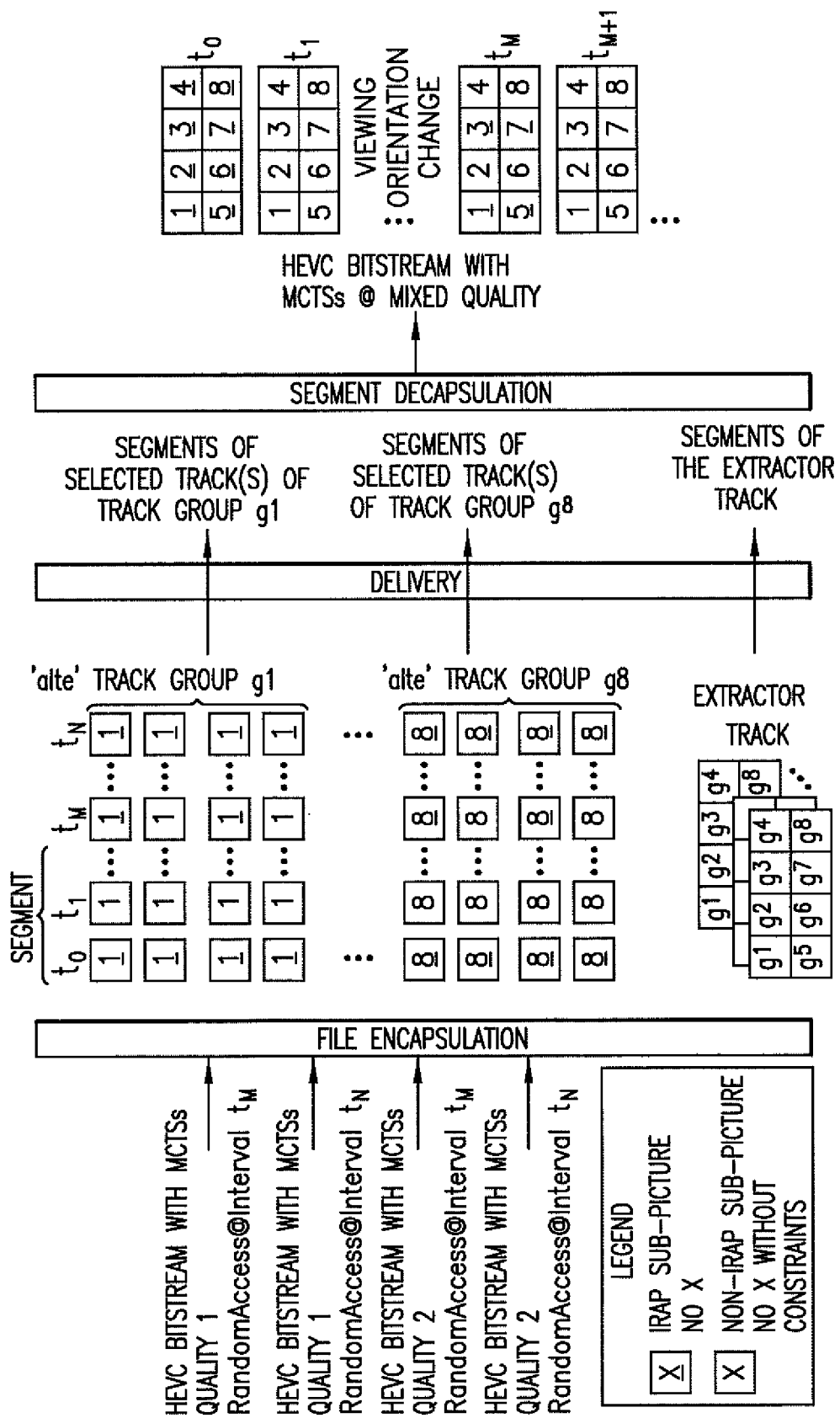
FIG. 15 shows an example of mixing random access and non-random access NAL units in the same coded picture according to an embodiment of the invention.

An embodiment is described with reference to FIG. 15, but is not limited to any particular configuration choices in the figure.

Encoding: Four versions of the content are generated using either MCTS-based content authoring or sub-picture-based content authoring, e.g. as described in clause D.4.2 of OMAF. In the following, N is an integer multiple of M.

- Bitstream 1: Quality 1, random-access (e.g. IRAP) picture interval $t_M$.
- Bitstream 2 (horizontal shading): Quality 1, random-access picture interval $t_N$.
- Bitstream 3 (vertical shading): Quality 2, random-access (e.g. IRAP) picture interval $t_M$.
- Bitstream 4 (grid shading): Quality 2, random-access picture interval $t_N$.

The picture output order and the picture decoding order are kept respectively identical in all the four bitstreams. The reference picture sets and/or reference picture marking are kept the same in all pictures of the same time instance.

Encapsulation of coded data: Groups of collocated sub-picture tracks are formed. Each group of collocated sub-picture tracks may be indicated with the 'alte' track group as described earlier.

The random-access pictures may be indicated in the file e.g. using SyncSampleBox, SAP sample grouping, and/or sample_is_non_sync_sample for movie fragments.

MPD and Segment Generation:

Each track forms a Representation in the MPD. An Adaptation Set is generated per each group of sub-picture tracks that is collocated and also otherwise share the same properties such that switching between the Representations of an Adaptation Set is possible e.g. with a single decoder instance. If the file(s) given as input to MPD and Segment generation contains 'alte' track group, an Adaptation Set for each 'alte' track group is created. In the example of FIG. 12, 8 sub-picture Adaptation Sets are created. The sub-picture Adaptation Set and/or Representation may include a content coverage (CC) descriptor and/or 2D region quality ranking (2DQR) descriptor and/or sphere region quality ranking (SRQR) descriptor to indicate that they do not provide a full coverage.

According to an embodiment, if an extractor track is present, an extractor track is carried in a Representation in its own Adaptation Set and a Preselection descriptor is included in the Adaptation Set carrying the extractor track. The Preselection descriptor points to the sub-picture Adaptation Sets used as source for extraction. The sub-picture Adaptation Sets may contain a Preselection essential descriptor, e.g. to imply that they do not provide a full coverage.

According to an embodiment, all sub-picture Representations contain the RandomAccess element with @interval set according to the random-access picture interval. In this example, a Segment is generated for each period of duration $t_M$. Thus, for different embodiments, RandomAccess@interval indicates the first random access picture interval and the second random access picture interval, and a mapping of the first random access picture interval and the second random access picture interval to the sub-picture representation elements is indicated through the RandomAccess element being contained by the mapped sub-picture Representation element.

According to an embodiment, quality ranking information for each sub-picture Representation may be included in the MPD, e.g. in the @qualityRanking attribute of DASH and/or in the SRQR descriptor of OMAF and/or in the 2DQR descriptor of OMAF.

In the following, some examples of a player behavior upon receiving the Representations and Adaptation Sets are given. It is remarked that the player behaviors are provided only as example embodiments, and other player strategies can be realized similarly.

When the player implements late-binding operation (see a description earlier in this document), the player discovers the main Adaptation Set (i.e. the Adaptation Set carrying the extractor track) from the Preselection descriptor. Likewise, the player discovers the partial Adaptation Sets based on the Preselection descriptor(s).

When the player operation is not based on resolving an extractor track, the player discovers which sub-picture Adaptation Sets are suitable for its use, e.g. by parsing SRQR descriptors.

For each selected sub-picture Adaptation Set (i.e. an Adaptation Set carrying collocated sub-picture tracks), the player selects the Representation whose bitrate is expected to be suitable for the network conditions and which provides the best possible picture quality, e.g. as determined by the quality ranking information, given the bitrate constraint imposed by the network conditions. Since intra-coding is typically less efficient in rate-distortion performance than inter-coding, the player is more likely to select bitstream 2 than bitstream 1, or bitstream 4 than bitstream 3, i.e. more likely to select the Representation with a greater switch point interval.

When a viewing orientation switch causing a new selection of high-quality sub-picture tracks takes place and affects an Adaptation Set of a particular sub-picture location, for each such Adaptation Set the player switches to the sub-picture Representation with RandomAccess@interval equal to $t_M$ for the remaining of the interval of duration $t_N$.

When the player operation is based on resolving an extractor track, the player follows the instructions in the extractor track to create a single bitstream from the samples of the selected sub-picture Representations.

For the next interval of duration $t_N$, this process of the previous steps is repeated.

NAL Unit Header Rewriting Approach

Encoding: In this approach, the NAL unit header contains a NAL unit type syntax element (e.g. referred to as nal_unit_type). At least two NAL unit types are specified for video coding layer (VCL) data, such as an IRAP NAL unit type and a non-IRAP NAL unit type. VCL NAL unit types may be categorized into random-access or random-access (picture) VCL NAL unit types and non-random-access (picture) VCL NAL unit types, which may be understood to correspond to IRAP NAL unit types and non-IRAP NAL unit types, respectively, in HEVC. In general, HEVC can be regarded as an example of defining VCL NAL unit types. It may be required, e.g. by a coding standard, that the same NAL unit type is used in all VCL NAL units of the same coded picture. According to an embodiment, the VCL NAL unit syntax (beyond NAL unit header) does not depend on the NAL unit type. For example, the slice header or the tile group header or alike has the same syntax regardless of the NAL unit type.

Creation of extractor tracks: In some embodiments, one extractor track is created as explained in this paragraph. However, it needs to be understood that embodiments for the NAL unit header rewriting approach may be realized also without creating and/or parsing the extractor track. The 'scal' track references in the extractor track refer to track group identifier values of the 'alte' track groups. The extractor track may include NAL unit headers in-line (e.g. within an in-line constructor) for selected or all samples of the extractor track. Specifically, the NAL unit headers of samples at picture interval $t_M$ (i.e., those samples where some of the bitstreams may have random-access pictures and some other bitstreams may have non-random-access pictures) may include VCL NAL unit headers with a NAL unit type indicating a non-random-access picture. This enables extracting VCL NAL units from both bitstreams having a random-access picture and bitstreams not having a random-access picture at a particular time instance.

According to an embodiment, a file writer or alike indicates in a container file that a group of track groups may be combined into a single bitstream. For example, an entity group may be created referring to track group identifiers of track groups of a particular type (such as 'alte'). The indication may be accompanied by information if NAL unit header rewriting is required for such rewriting and, if so, indication which NAL unit header is to be used or which track(s) contain the NAL units header suitable for rewriting. According to an embodiment, a file reader or alike decodes from a container file that a group of track groups may be combined into a single bitstream. The file reader determines, e.g. as described in other embodiments, which track of each track group is appropriate for its use. The file reader merges the data of the samples of the selected tracks. As a part of the merging the file reader may rewrite NAL unit headers. The file reader may parse, from the container file, information if NAL unit header rewriting is required, and, if so, parse information how NAL unit headers are to be rewritten, and then follow the parsed information in the merging/rewriting operation. The indicates that a group of track groups may be combined into a single bitstream and/or the information if NAL unit header rewriting is required and/or how NAL unit headers are to be rewritten may be regarded as the at least one instruction for merging tile sets of different spatial locations into at least one coded picture in different embodiments.

According to an embodiment, a file writer or alike includes an indication into a container file that indicates a possibility to rewrite NAL unit types, and/or a file reader or alike decodes an indication from a container file that indicates a possibility to rewrite NAL unit types. The indication may be accompanied by a NAL unit type or a NAL unit header that is suitable for such rewriting. The indication may be included for example in a TrackGroupTypeBox of a particular type, such as 'alte'. The indication may be regarded as the at least one instruction for merging tile sets of different spatial locations into at least one coded picture in different embodiments.

According to an embodiment, if the player implements late-binding operation and/or is not using extractor tracks or decoding any other instruction(s) for merging tile sets of different spatial locations into at least one coded picture, then upon receiving NAL units from both random-access and non-random-access pictures for a single time instance, the player may infer at least one instruction for merging tile sets of different spatial locations into at least one coded picture. For example, the player may infer that the at least one instruction is to rewrite all the NAL unit types of those NAL units to indicate a non-random-access picture. Consequently, the player rewrites all the NAL unit types of those NAL units to indicate a non-random-access picture.

According to an embodiment, a file writer or alike includes merging identifiers or alike associated to sub-picture tracks in a container file, wherein sub-picture tracks with the same merging identifier value can be merged to form coded pictures with a pre-defined or inferred process. For example, it can be pre-defined or inferred that sub-picture tracks with the same merging identifier can be merged to form coded pictures by rewriting slice position information in the slice headers or alike. If some of the time-aligned sub-pictures have a random-access picture or NAL unit type while others have a non-random-access picture or NAL unit type, it may be pre-defined or inferred that all such time-aligned sub-pictures are treated of having a non-random-access picture or NAL unit type. When sub-picture tracks have a different merging identifier value, it might not be possible to form coded pictures with a pre-defined or inferred process from the sub-picture tracks. In an embodiment, a box defining a track group indicating a group of tracks with two dimensional spatial relationships (e.g. corresponding to spatial parts of a video source) is amended with a merging identifier syntax element.

According to an embodiment relating to decoding, a decoder keeps track of decoding initialization status e.g. on MCTS basis. Initially decoding of all MCTSs may be uninitialized. If decoding of an MCTS is uninitialized and VCL NAL units of the MCTS are not of random-access NAL unit type, the decoding of the VCL NAL units of the MCTS may be omitted. When VCL NAL units of the MCTS are of random-access NAL unit type, the VCL NAL units of an MCTS are decoded and the decoding is inferred to be initialized for that MCTS. When decoding of an MCTS has already been initialized, all VCL NAL units of that MCTS are decoded regardless of their NAL unit type. The decoder may indicate (as an output of the decoder) with the output pictures the regions that have been initialized and the regions that have not been initialized (i.e. that might not have valid picture content). This embodiment enables gradual decoding refresh e.g. to smooth out large bitrate variations and consequently to avoid latency in bandwidth-limited transmission. Another benefit is the utilization of partially valid pictures in a rendering process that might need only parts of the output pictures of the decoder (e.g. rendering of 360° video on a head-mounted display wherein only the viewport needs to be valid in content).

Picture Type Indication in Picture Level

According to an embodiment, the NAL unit type is encoded as the same type or value regardless of whether random-access picture or non-random-access picture is coded. For example, a single NAL unit type value may be specified for a VCL NAL unit or an image segment NAL unit.

According to an embodiment, a picture-level indication, e.g. in a picture header, a header parameter set, a picture parameter set, and/or alike may be encoded to indicate a picture type and/or decoded to conclude the picture type. For example, two picture types may be specified, such as random-access picture and non-random-access picture. In another example, three picture types may be specified, such as IDR, CRA, and non-IRAP picture (defined similarly as in HEVC). In yet another example, picture types may comprise the HEVC VCL NAL unit types or a subset thereof. The possible picture types may be enumerated with specific integer values, e.g. as part of a coding standard.

According to an embodiment, the syntax of a VCL NAL unit or an image segment NAL unit is the same for random-access and non-random-access pictures. For example, the syntax of a VCL NAL unit or an image segment NAL unit includes reference picture management, such as reference picture sets, also for random-access pictures. It may be constrained, e.g. in a coding standard, that all reference pictures marked as "used for reference" are inactive in a VCL NAL unit or an image segment NAL unit that originates from a random-access picture. Keeping the same syntax of a VCL NAL unit or image segment NAL unit enables changing the NAL unit type from indicating random-access picture or NAL unit to non-random-access picture or NAL unit, as needed in different embodiments. Keeping the same syntax of a VCL NAL unit or image segment NAL unit also enables converting a random-access picture or NAL unit of one type to another type of random-access picture or NAL unit. For example, a CRA picture (which may have associated RASL pictures) may be converted to an IDR picture with decodable leading pictures by removing all associated RASL pictures or to an IDR picture without leading pictures by removing all associated leading pictures.

According to an embodiment, the NAL unit type of a VCL NAL unit or an image segment NAL unit indicates the type of the respective image segment and does not necessarily indicate the type of the entire picture. For example, the NAL unit type of a VCL NAL unit or an image segment NAL unit may indicate a random-access image segment, but the picture containing the image segment may also contain image segments that are not random-access image segments. A picture-level indication of the picture type may be present, as described in the embodiment above. In an embodiment, VCL NAL unit types (or image segment NAL unit types) and picture types are selected among the same enumerated type values, e.g. as discussed above in relation to picture types. In an embodiment, VCL NAL unit types (or image segment NAL unit types) have their own enumerated type value(s), separate from the picture type values. For example, only one value may be defined, or two values may be defined (random-access and non-random-access), or three values may be defined (IDR, CRA, and non-random-access) for VCL NAL units types (or image segment NAL unit types), while a larger set of type values may be present for picture types.

In a draft VVC standard, the PPS syntax includes a 1-bit syntax element (i.e. a flag) named mixed_nalu_types_in_pic_flag. When equal to 1, mixed_nalu_types_in_pic_flag specifies that each picture referring to the PPS has more than one VCL NAL unit and that the VCL NAL units do not have the same value of nal_unit_type and that the picture is not an IRAP picture. mixed_nalu_types_in_pic_flag equal to 0 specifies that each picture referring to the PPS has one or more VCL NAL units and the VCL NAL units of each picture referring to the PPS have the same value of nal_unit_type. The draft VVC standard also contains the following constraints:

- If mixed_nalu_types_in_pic_flag is equal to 0, the value of nal_unit_type shall be the same for all coded slice NAL units of a picture. A picture or a picture unit (PU) is referred to as having the same NAL unit type as the coded slice NAL units of the picture or PU.
- Otherwise (mixed_nalu_types_in_pic_flag equal to 1), one or more of the VCL NAL units shall all have a particular value of nal_unit_type in the range of IDR_W_RADL to CRA_NUT, inclusive, and the other VCL NAL units shall all have a particular value of nal_unit_type in the range of TRAIL_NUT to RSV_VCL_6, inclusive, or equal to GRA_NUT.

Furthermore, a draft VVC standard also contains the following constraints related to mixed_nalu_types_in_pic_flag equal to 1:

For each slice with a nal_unit_type value nalUnitTypeA in the range of IDR_W_RADL to CRA_NUT, inclusive, in a picture picA that also contains one or more slices with another value of nal_unit_type (i.e., the value of mixed_nalu_types_in_pic_flag for the picture picA is equal to 1), the following applies:
- The slice shall belong to a subpicture subpicA for which the value of the corresponding subpic_treated_as_pic_flag[i] is equal to 1.
- The slice shall not belong to a subpicture of picA containing VCL NAL units with nal_unit_type not equal to nalUnitTypeA.
- For all the following PUs in the CLVS in decoding order, neither RefPicList[0] nor RefPicList[1] of a slice in subpicA shall include any picture preceding picA in decoding order in an active entry.

The third bullet above disables the use of RASL pictures with a CRA picture that whose subpictures are subject to being mixed with subpictures of a corresponding TRAIL picture in another bitstream. In general, a draft VVC standard contains specifications of and related to mixed_nalu_types_in_pic_flag having a consequence that it is not possible to mix NAL units of two different non-IRAP types into the same coded picture.

According to an embodiment, a picture-level indication indicates, e.g. when its value is equal to 1, that the picture is a trailing picture in the encoding process and/or in the decoding process, and the NAL unit type of a VCL NAL unit or an image segment NAL unit indicates the type of the respective image segment.

According to an embodiment, a picture referencing a PPS with mixed_nalu_types_in_pic_flag equal to 1 is a trailing picture in the encoding process and/or in the decoding process.

According to an embodiment, an IRAP subpicture in a picture with mixed_nalu_types_in_pic_flag equal to 1 is allowed to be followed, in decoding order, by RASL subpicture(s) that include pictures preceding, in decoding order, the IRAP subpicture in their reference picture lists. The above-cited constraint (in the third bullet) may be accordingly modified to the following:

For all the following PUs in the CLVS in decoding order, neither RefPicList[0] nor RefPicList[1] of a slice in subpicA with nal_unit_type not equal to RASL_NUT shall include any picture preceding picA in decoding order in an active entry.

The above-described embodiments have the benefits that RASL pictures can be used with feature of mixing several VCL NAL unit types into the same picture. This provides increased compression, i.e. better rate-distortion performance. The benefits are believed to be important in viewport-dependent 360° video streaming to reach small motion-to-high-quality latency in response to viewing orientation changes. An example embodiments where the benefits of the above-described embodiments are realized is described next.

In the example embodiment, two bitstreams at different qualities are encoded, each with two subpictures. The bitstream for quality 1 has a shorter interval of CRA pictures, and the CRA pictures are followed, in decoding order, by one or more associated RASL pictures. It needs to be understood that embodiments are not limited to two bitstreams of different qualities, but any other number of bitstreams of different qualities could likewise be used. It needs to be understood that in addition to or instead of quality, the bitstreams may differ in other aspects, such as IRAP picture interval. It needs to be understood that different bitstreams may be encoded for each subpicture, i.e. even if two subpictures were originally included in the same input picture sequence, they may be encoded into separate bitstreams. It needs to be understood that embodiments are not limited to two subpictures, but any other number of subpictures could likewise be used.

Figure 16:
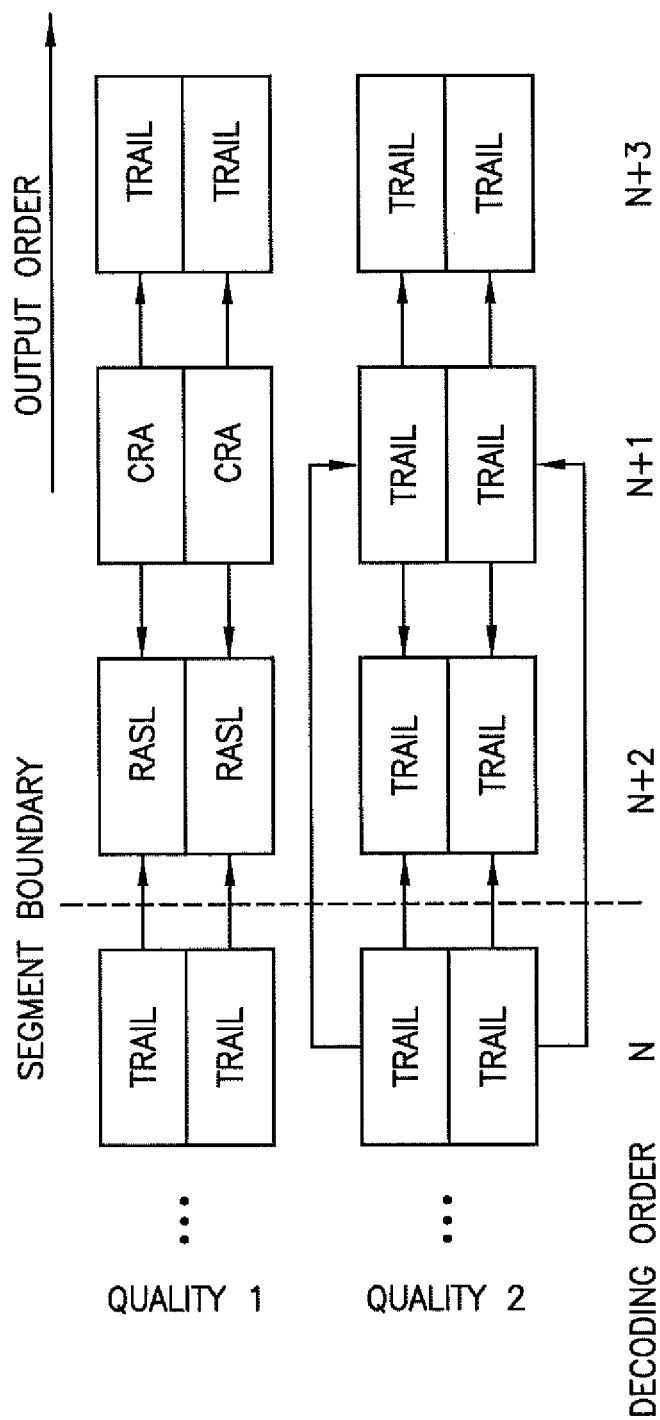
FIG. 16 shows an example of a bitstreams and segmentation of the bitstreams

In the example embodiment, subpicture sequences are made available for streaming individually. Subpicture sequences are split into segments, which contain subpictures in decoding order. FIG. 16 illustrates the bitstreams and segmentation of the bitstreams.

In the example embodiment, clients can choose on segment basis which subpicture sequences are received. IRAP pictures are aligned at segment boundaries so that switching from one subpicture sequence to another can take place by concatenating entire segments. It needs to be understood that embodiments can likewise be realized with Subsegments in addition to or instead of segments, wherein Subsegments and Segments may be defined as described above in relation to DASH.

Figure 17:
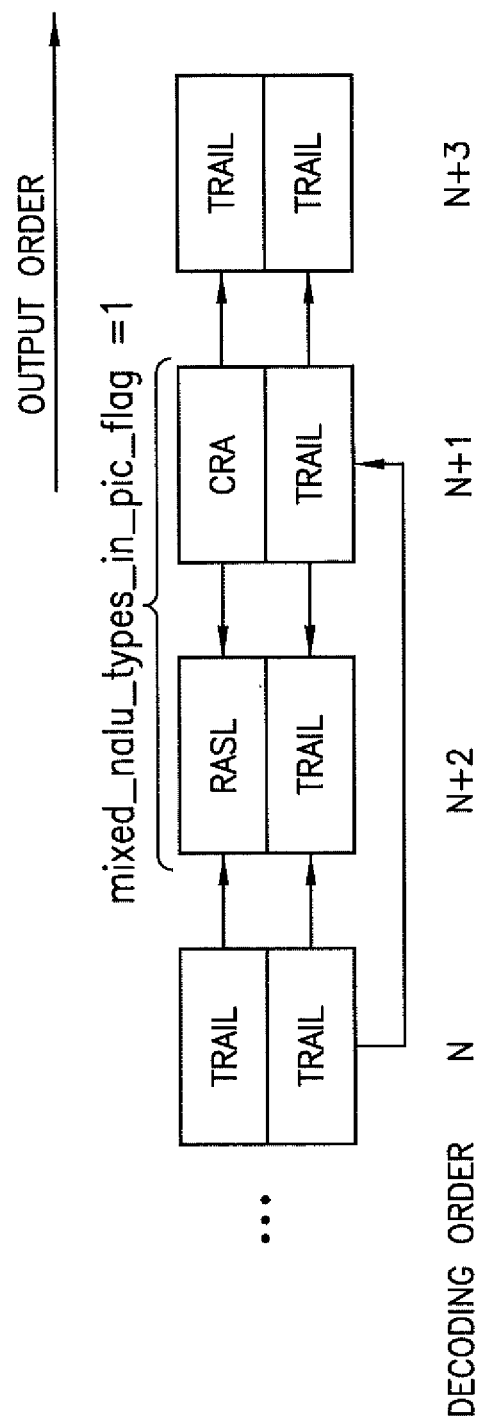
FIG. 17 shows an example of mixing subpictures from the bitstreams into a merged bitstream

In the example embodiment, mixed_nalu_types_in_pic_flag equal to 1 is indicated for the pictures containing CRA subpictures and RASL subpictures as illustrated in FIG. 17. In other words, the above-described embodiments enable mixing of subpictures from the bitstreams of FIG. 16 into a merged bitstream illustrated in FIG. 16. In the example illustrated in FIG. 17, a switch from quality 2 to quality 1 is made for the top subpicture at the segment boundary.

According to an embodiment, a picture referencing a PPS with mixed_nalu_types_in_pic_flag equal to 1 may or may not contain VCL NAL unit of different nal_unit_type values. In other words, a picture referencing a PPS with mixed_nalu_types_in_pic_flag equal to 1 may, but is not required to, contain VCL NAL unit of different nal_unit_type values. This embodiment has the benefit that PPSs for the merged bitstream can be provided by the content author and no client-side rewriting of the PPSs is required.

According to an embodiment, the semantics of mixed_nalu_types_in_pic_flag is specified as follows. mixed_nalu_types_in_pic_flag equal to 1 specifies that each picture referring to the PPS has more than one VCL NAL unit and that the VCL NAL units are not required to have the same value of nal_unit_type and that the picture is a trailing picture. mixed_nalu_types_in_pic_flag equal to 0 specifies that each picture referring to the PPS has one or more VCL NAL units and the VCL NAL units of each picture referring to the PPS have the same value of nal_unit_type.

Some embodiments were described above with reference to mixed_nalu_types_in_pic_flag. It needs to be understood that embodiments could likewise be realized with any other picture-level indication. For example, the picture-level need not be contained in a PPS but could be contained in a picture header or any other picture-level syntax structure.

According to an embodiment, a file writer creates sample(s) of the extractor track in a manner that they contain the picture-level indication in-line (e.g. within an in-line constructor). The picture type for samples at an integer multiple of $t_M$ but not at an integer multiple of $t_N$ may indicate a non-random-access picture, thus allowing extracting VCL NAL units from both random-access pictures and non-random-access pictures. The in-line picture-level indication may be regarded as the at least one instruction for merging tile sets of different spatial locations into at least one coded picture in different embodiments.

According to an embodiment, a file writer creates a collector track that includes picture-level indications. The picture-level indications in the collector track are used instead of the picture-level indications (if any) of sub-picture or tile tracks. The picture-level indications in the collector track may differ from the respective picture-level indications that were encoded in the bitstreams from which sub-picture or tile tracks were created. According to an embodiment, when a picture-level indication indicates, e.g. when its value is equal to 1, that the picture is a trailing picture in the encoding process and/or in the decoding process, a file writer creates and/or references a picture-level indication equal to 1 for each such picture (or each such sample of a collector track) which enables mixing of subpictures of different VCL NAL unit types. A file writer may generate a collector track to represent a merged bitstream where a client selects which subpicture tracks are used as sources for obtaining the subpictures. For example, with reference to FIG. 17, samples N+1 and N+2 in the collector track may reference a picture-level indication that indicates a trailing picture in the decoding process (e.g. may reference a PPS with mixed_nalu_types_in_pic_flag equal to 1 as specified in some embodiments), and samples N and N+3 in the collector track may reference a picture-level indication that indicates a picture having the type indicated by the VCL NAL unit types (e.g. may reference a PPS with mixed_nalu_types_in_pic_flag equal to 0 as specified in some embodiments).

According to an embodiment, which may be applied e.g. when the player is not using extractor tracks, upon receiving NAL units from both random-access and non-random-access pictures for a single time instance, the player or the decoder or alike rewrites the picture-level indication to indicate a non-random-access picture. This may be regarded as inferring for different embodiments that the at least one instruction for merging tile sets of different spatial locations into at least one coded picture comprises rewriting the picture-level indication to indicate a non-random-access picture.

Reference Picture Management

According to an embodiment, the bitstream with random-access picture period $t_M$ are encoded in a manner that when a random-access picture at an integer multiple of $t_M$ but not at an integer multiple of $t_N$ is encoded, the reference pictures are managed as in the corresponding picture of the bitstream with random-access picture period $t_N$. In other words, a random-access picture at an integer multiple of $t_M$ but not at an integer multiple of $t_N$ may contain such reference picture management that indicates reference pictures prior to the random-access picture in decoding order to be marked as "used for reference" or alike. Consequently, when VCL NAL units of bitstreams are combined to a "rewritten" bitstream, the VCL NAL units imply the same reference picture marking, and decoder may decode any VCL NAL unit regardless of their decoding order or selection from different bitstream.

According to an embodiment, an encoder has an interface, such as configuration parameter(s), that is indicative of additional reference pictures to be kept marked as "used for reference" (or alike) in addition to the reference pictures that are actually in use as potential prediction references for encoding. The additional reference pictures need not be available in the encoder (e.g. in the decoded picture buffer of the encoder), since the encoder is not using them as reference for prediction. The encoder processes the information received through the interface by encoding the reference picture marking in the bitstream in a manner that additional reference pictures are kept marked as "used for reference". The encoder may additionally indicate in the bitstream that those additional reference pictures are inactive, i.e. not used as reference for prediction. In an embodiment, the interface is specific to a certain picture in a structure of pictures or GOP given through the interface, such as the first picture. In an embodiment, the encoder is informed through the interface that random-access pictures at an integer multiple of $t_M$ but not at an integer multiple of $t_N$ have additional reference pictures to kept marked as "used for reference" and those additional reference pictures are set to be the same that are used in a bitstream where the random-access period is equal to $t_N$.

As discussed earlier, in an embodiment, random-access pictures are allowed to contain or refer to reference picture management syntax, such as reference picture set syntax structure. Reference picture management in a VCL NAL unit or an image segment NAL unit originating from a random-access picture is allowed to imply that no earlier pictures (in decoding order) are used for reference of the random-access picture and the pictures following the random-access picture (in decoding order). An IDR picture whose VCL NAL units or image segment NAL units contain or refer to reference picture management syntax is an example for this embodiment.

According to an embodiment, reference picture management is contained in a picture-level syntax structure, such as a picture header, a header parameter set, a picture parameter set, and/or alike. For example, a picture header may contain a reference picture set syntax structure based on which the reference picture marking is carried out, or a picture header may refer to a reference picture set syntax structure contained e.g. in a sequence-level structure, such as SPS, based on which the reference picture marking is carried out. The reference picture management contained in a picture-level syntax structure is applied regardless of the types of VCL NAL units or image segment NAL units in the picture. For example, even if the types of one or more VCL NAL units or image segment NAL units would imply that all no earlier pictures in decoding order are marked as "used for reference" (e.g. a type indicating a random-access picture without RASL pictures or alike), the reference picture management syntax in the picture-level syntax structure may include some earlier pictures in decoding order to be marked as "used for reference". The reference picture management syntax in the picture-level syntax structure may be regarded as the at least one instruction for merging tile sets of different spatial locations into at least one coded picture in different embodiments.

According to an embodiment, it is indicated, e.g. in a file and/or in an MPD, which track or Representation contains picture-level syntax structures that apply generally, e.g. in the case where VCL NAL units of bitstream of different random-access intervals are combined to the same bitstream. Thus, when a decoder decodes a bitstream with random-access period $t_M$ only, the reference picture marking may cause the decoded picture buffer memory to be used more optimally than when a decoder decodes a bitstream merged from VCL NAL units of bitstreams of multiple random-access periods. The indication in the file and/or in the MPD may be regarded as the at least one instruction for merging tile sets of different spatial locations into at least one coded picture in different embodiments.

According to an embodiment, VCL NAL units of a coded picture are treated collectively in reference picture management. If a reference picture is indicated to be marked as "used for reference" by any VCL NAL unit of the coded picture, then the reference picture is marked as "used for reference" by the decoder and/or the encoder. If a reference picture is indicated to be marked as "unused for reference" by all VCL NAL units of the coded picture, then the reference picture is marked as "unused for reference" by the decoder and/or the encoder. The process of this embodiment may be regarded as inferring and processing the at least one instruction for merging tile sets of different spatial locations into at least one coded picture in different embodiments.

In order to address the problem of the limitations of using the Switching element of DASH in the context of switching from one extractor Representation to another extractor Representation only, a further embodiment is disclosed herein at least for alleviating the problem.

In this embodiment, viewport switching in viewport-dependent streaming is enabled at switch points, which involve intra coding and hence a greater bitrate compared to respective inter coded pictures at the same quality. A compromise between the switch point interval and the rate-distortion performance is hence chosen in an encoding configuration.

DASH allows creating Representations of a different switch point interval. The Switching element enables indicating intervals of switch points for Segments flexibly. A content author may provide the same content at several qualities and at several switch point intervals. Segments may have the same duration across the different Representations; i.e. they may be time aligned.

Figure 18:
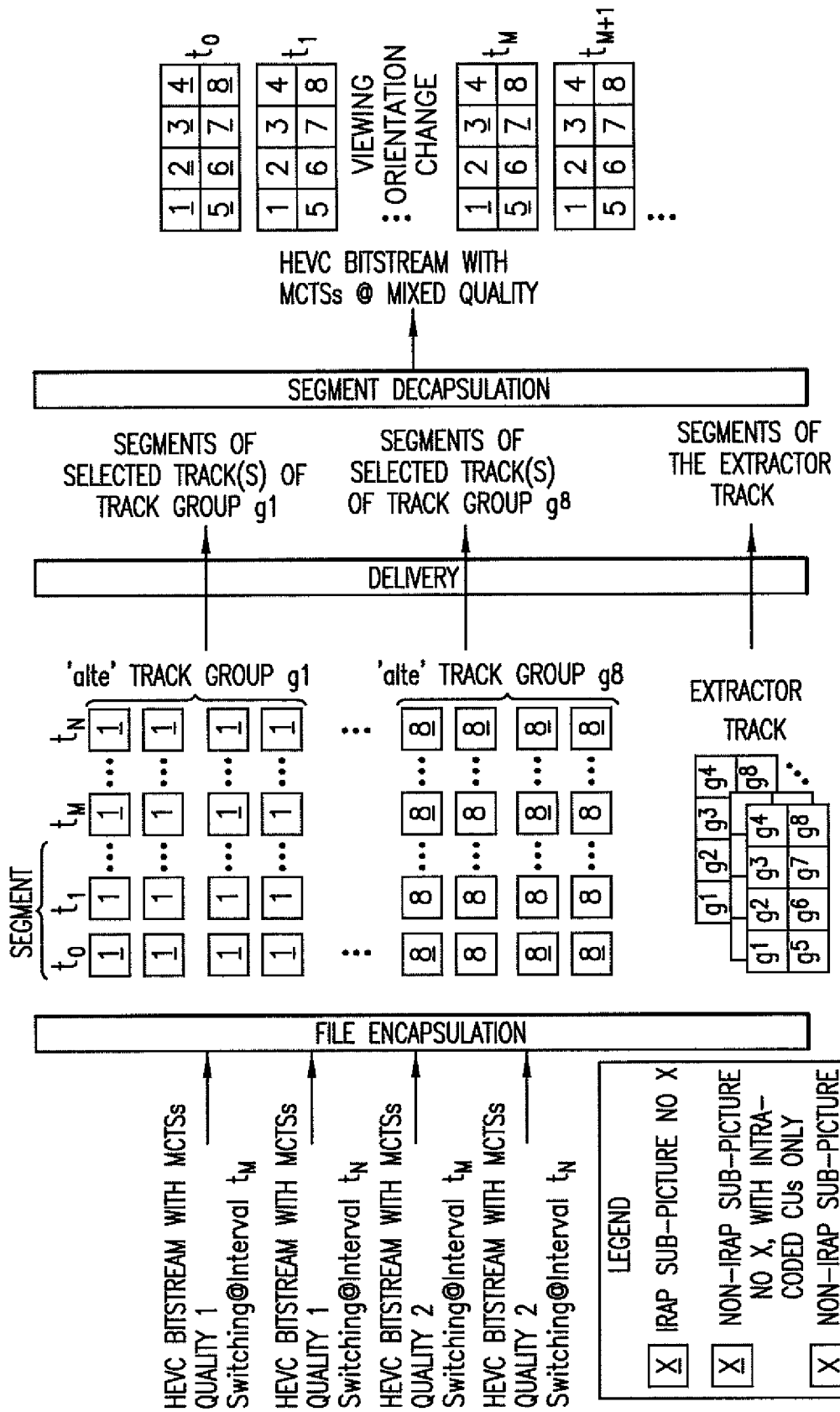
FIG. 18 shows an example of using switching elements for indicating switch point intervals according to an embodiment of the invention.

The embodiment is described with reference to FIG. 18, but is not limited to any particular configuration choices in the figure. The example is described by referring to Segments and by using the Switching element.

The non-IRAP sub-pictures with intra-coded CUs only ("X") serve as switch points from the respective sub-picture Representation with long interval of intra-coded sub-pictures.

Encoding: Four versions of the content are generated using either MCTS-based content authoring or sub-picture-based content authoring, e.g. as described in clause D.4.2 of OMAF. In the following, N is an integer multiple of M.

Bitstream 1: Quality 1, switch point interval $t_M$, random-access (e.g. IRAP) picture interval $t_N$.

Bitstream 2 (horizontal shading): Quality 1, random-access picture interval $t_N$, no switch points besides random-access pictures.

Bitstream 3 (vertical shading): Quality 2, switch point interval $t_M$, random-access (e.g. IRAP) picture interval $t_N$.

Bitstream 4 (grid shading): Quality 2, random-access picture interval $t_N$, no switch points besides random-access pictures.

The picture output order and the picture decoding order are kept respectively identical in all the four bitstreams. The reference picture sets and/or reference picture marking are kept the same in all pictures of the same time instance.

The encoding of any switch-point picture and the pictures following the switch-point picture in decoding order is constrained as follows: The switch-point pictures are indicated as non-random-access point pictures, e.g. TRAIL pictures of HEVC. The switch-point pictures are coded as P or B slices or alike that contain only intra-coded blocks. The pictures following any switch-point picture in decoding order have the same constraints in their selection of reference pictures as the pictures following a random-access picture that replaced the switch-point picture. For example, the pictures following any switch-point picture in decoding order may not be allowed to use any picture preceding the switch-point picture, in decoding order, as a reference for prediction.

Embodiments described earlier are applicable by considering both random-access pictures and switch-point pictures qualify for determining random access picture interval.

According to an embodiment, an encoder includes a switch-point SEI message into the bitstream and/or a decoder decodes a switch-point SEI message from the bitstream, where the switch-point SEI message indicates that constraints described in this paragraph are obeyed by the switch-point picture and the following pictures in decoding order.

Encapsulation of coded data: Groups of collocated sub-picture tracks are formed. Each group of collocated sub-picture tracks may be indicated with the 'alte' track group as described in clause D.4.1 of OMAF.

According to an embodiment, a file writer or alike includes metadata indicating a switch point into a container file or segment and/or a file reader or alike decodes metadata indicating a switch point from a container file. The metadata may be generated based on switch-point SEI messages in the bitstream. The metadata may for example use any of the following mechanisms:

Sample grouping
Timed metadata track
Sample auxiliary information
Box of a new type stored e.g. in a SampleTableBox and/or in a TrackFragmentBox An extension of the TrackGroupTypeBox, e.g. of type 'alte', which includes the metadata, such as the switch-point picture interval One extractor track is created. The 'scal' track references in the extractor track refer to track group identifier values of the 'alte' track groups.

MPD and Segment Generation:

Each track forms a Representation in the MPD. An Adaptation Set is generated per each 'alte' track group, i.e., 8 sub-picture Adaptation Sets are created in this example. An extractor track is carried in a Representation in its own Adaptation Set.

A Preselection descriptor is included in the Adaptation Set carrying the extractor track. The Preselection descriptor points to the sub-picture Adaptation Sets used as source for extraction. The sub-picture Adaptation Sets may contain a Preselection essential descriptor or a content coverage descriptor to indicate that they do not provide a full coverage.

All sub-picture Representations contain the Switching element with @interval set according to the switch-point picture interval or, if switch-point pictures are not present, the random-access picture interval. In this example, a Segment is generated for each period of duration $t_M$. The Switching element may be generated based on the container file format metadata indicating switch points. Thus, for different embodiments, Switching@interval indicates the first random access picture interval and the second random access picture interval, and a mapping of the first random access picture interval and the second random access picture interval to the sub-picture representation elements is indicated through the Switching element being contained by the mapped sub-picture Representation element.

According to an embodiment, quality ranking information for each sub-picture Representation may be included in the MPD, e.g. in the @qualityRanking attribute of DASH and/or in the SRQR descriptor of OMAF and/or in the 2DQR descriptor of OMAF.

In the following, some examples of a player behavior upon receiving the Representations and Adaptation Sets are given. It is remarked that the player behaviors are provided only as example embodiments, and other player strategies can be realized similarly.

The player discovers the main Adaptation Set (i.e. the Adaptation Set carrying the extractor track). For each partial Adaptation Set (i.e. an Adaptation Set carrying collocated sub-picture tracks), the player selects the Representation whose bitrate is expected to be suitable for the network conditions and which provides the best possible picture quality, e.g. as determined by the quality ranking information, given the bitrate constraint imposed by the network conditions. Since intra-coding is typically less efficient in rate-distortion performance than inter-coding, the player is more likely to select bitstream 2 than bitstream 1, or bitstream 4 than bitstream 3, i.e. more likely to select the Representation with a greater switch point interval.

When a viewing orientation switch causing a new selection of high-quality sub-picture tracks takes place and affects an Adaptation Set of a particular sub-picture location, for each such Adaptation Set the player switches to the sub-picture Representation with Switching@interval equal to $t_M$ for the remaining of the interval of duration $t_N$.

For the next interval of duration $t_N$, this process of the previous paragraphs is repeated.

Another embodiment for addressing the problem of the limitations of using the Switching element of DASH in the context of switching from one extractor Representation to another extractor Representation only relates to using Subsegments. In this embodiment, encoding, encapsulation of coded data, and creation of extractor tracks are performed similarly to what has been described above.

MPD and Segment Generation:

According to an embodiment, each track may be encapsulated as a single Segment for DASH delivery. Each Segment may be partitioned into Subsegments, each having duration $t_M$. Each Subsegment may be described by a SegmentIndexBox. For sub-picture tracks, the SegmentIndexBox is appended to contain switch-point information.

Each track forms a Representation in the MPD. An Adaptation Set is generated per each 'alte' track group, i.e., 8 sub-picture Adaptation Sets are created in this example. The Subsegments of an Adaptation Set can be indicated to be aligned with the @subsegmentAlignment attribute set to TRUE.

An extractor track is carried in a Representation in its own Adaptation Set.

A Preselection descriptor is included in the Adaptation Set carrying the extractor track. The Preselection descriptor points to the sub-picture Adaptation Sets used as source for extraction. The sub-picture Adaptation Sets may contain a Preselection essential descriptor or a content coverage descriptor to indicate that they do not provide a full coverage.

According to an embodiment, quality ranking information for each sub-picture Representation may be included in the MPD, e.g. in the @qualityRanking attribute of DASH and/or in the SRQR descriptor of OMAF and/or in the 2DQR descriptor of OMAF.

For implementing the embodiment, the syntax of SegmentIndexBox may be appended with the last loop below (underlined).

```
aligned(8) class SegmentIndexBox extends FullBox('sidx', version, 0) {
    unsigned int(32) reference_ID;
    unsigned int(32) timescale;
    if (version==0) {
        unsigned int(32) earliest_presentation_time;
        unsigned int(32) first_offset;
    }
    else {
        unsigned int(64) earliest_presentation_time;
        unsigned int(64) first_offset;
    }
    unsigned int(16) reserved = 0;
    unsigned int(16) reference_count;
    for(i=1; i <= reference_count; i++)
    {
        bit (1)                reference_type;
        unsigned int(31)       referenced_size;
        unsigned int(32)       subsegment_duration;
        bit(1)                 starts_with_SAP;
        unsigned int(3)        SAP_type;
        unsigned int(28)       SAP_delta_time;
    }
    for(i=1; i <= reference_count; i++) {
        if (reference_type == 0)
            unsigned int(8) switch_point_type;
    }
}
``` switch_point_type equal to 0 specifies that the referenced Subsegment does not start with a switch-point picture. switch_point_type equal to 1 specifies that the referenced Subsegment starts with a switch-point picture and that the player can use the media level switching strategy as defined for the Switching element. switch_point_type equal to 2 specifies that the referenced Subsegment starts with a switch-point picture and that the player can use the bitstream switching strategy as defined for the Switching element. Other switch_point_type values are reserved.

switch_point_type values may be specified to be valid among the tracks belonging to the same track group of a particular type, such as the same 'alte' track group Regarding the player operation, the player may operate as in the previous embodiment, but the viewing orientation switch may be handled as follows: When a viewing orientation switch causing a new selection of high-quality sub-picture tracks takes place and affects an Adaptation Set of a particular sub-picture location, for each such Adaptation Set the player switches to the sub-picture Representation having the closest switch-point (at an integer multiple of $t_M$) for the remaining of the interval of duration $t_N$.

It is noted that the merging of bitstreams can be carried out in different entities in the end-to-end system, such as:

Content authoring, i.e. merged bitstreams can be pre-constructed.

Origin server, i.e. merged bitstreams may be formed in a server, e.g. as a response to client's request.

A middle-box, such as an edge server. Merged bitstreams may be formed for example in a CDN edge server or a mobile edge cloud that receive all tile rectangle sequences and compose a merged bitstream e.g. as a response to client's request.

A client (e.g. a player within the client). The coded tile rectangle sequences are received separately and merged at the client before decoding.

It needs to be understood that the embodiments are not limited to any particular splitting to tile sets or tile rectangles. Moreover, the embodiments are not limited to any particular shape or grid of tile sets or tile rectangles in the merged bitstream.

It needs to be understood that while some embodiments were described with reference to tile rectangles or tile rectangle sequences, embodiments similarly apply to tiles, tile sets, motion-constrained tiles, motion-constrained tile sets, isolated regions, slices, motion-constrained slices, or any similar spatial concepts and the sequences of such spatial units.

Regarding the options for transmission connections and protocols, the embodiments may be realized with various protocols enabling to request segments or sub-segments, including but not limited to different versions of HTTP, such as HTTP/1.1 and HTTP/2.0, WebSockets, QUIC and SPDY. Some embodiments have been described with reference to HTTP GET requests, but it needs to be understood that embodiments can be similarly realized with requests specified in other protocols.

The embodiments may be realized with various configurations to establish and use TCP connections, including but not limited to the following.

Separate TCP connections may be used for downloading different Representations. In the case that bandwidth rapidly decreases and there appears a danger of a pause in playback, this enables easier and faster termination of the reception of (Sub)segments from temporal-enhancement base-quality Representations and/or from temporal-enhancement predicted Representations and/or from temporal-base predicted Representations.

Alternatively or additionally, the same TCP connection may be used for different Representations. In that case, the HTTP GET requests may be pipelined. The client may select the order of HTTP GET requests in a manner that a greater duration of temporal-base segments gets buffered in the client (compared to the buffered duration of temporal-enhancement segments).

Embodiments may be realized with various types of access links and link layer protocols and their configurations for access links. For example, if QoS specified by 3GPP is in use, the TCP connection for temporal-enhancement segments could run on a best-effort QoS while the temporal-base segments could have a guaranteed QoS channel.

Figure 19:
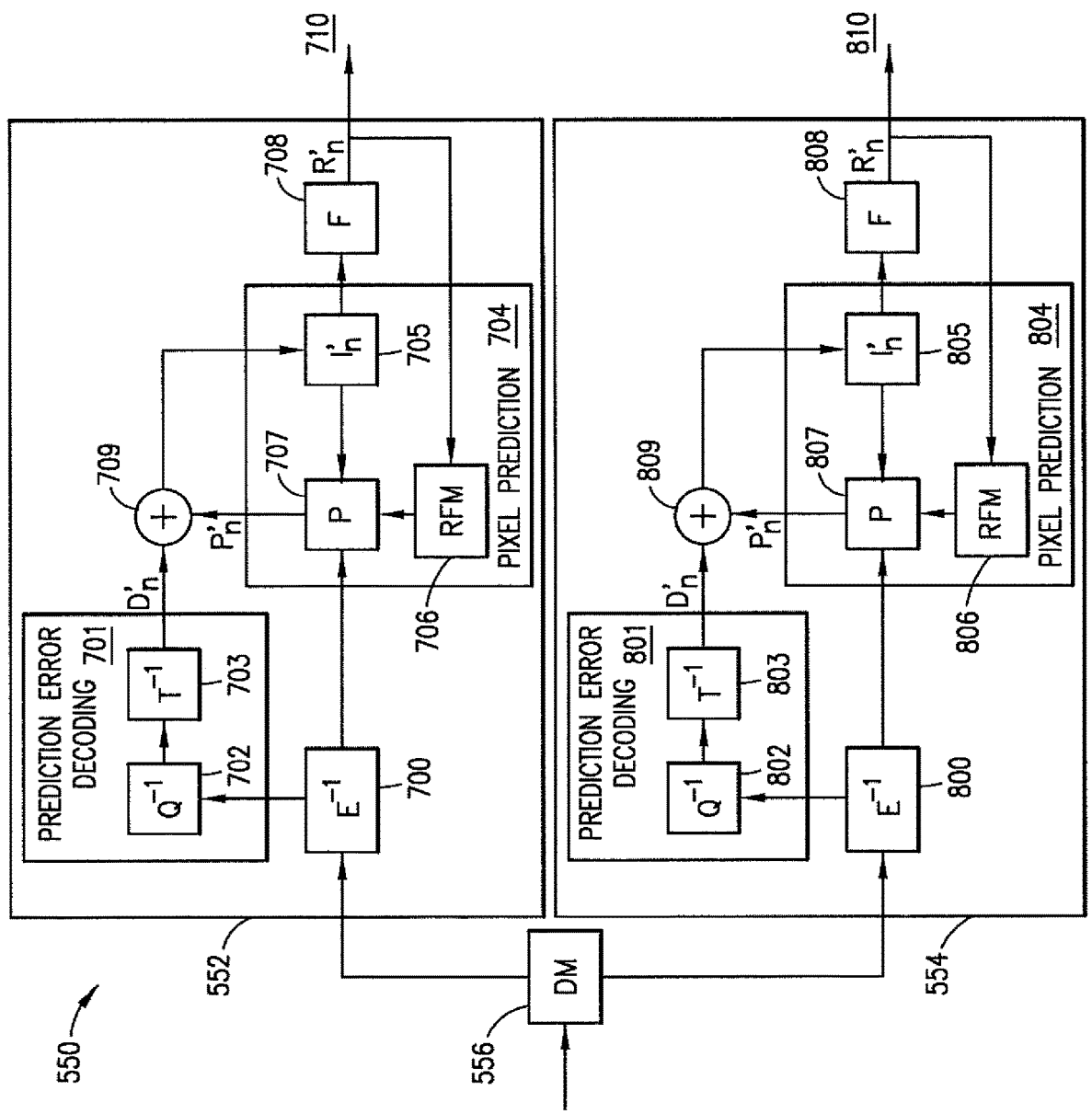
FIG. 19 shows a schematic diagram of a decoder suitable for implementing embodiments of the invention.

FIG. 19 shows a block diagram of a video decoder suitable for employing embodiments of the invention. FIG. 19 depicts a structure of a two-layer decoder, but it would be appreciated that the decoding operations may similarly be employed in a single-layer decoder.

The video decoder 550 comprises a first decoder section 552 for a base layer and a second decoder section 554 a predicted layer. Block 556 illustrates a demultiplexer for delivering information regarding base layer pictures to the first decoder section 552 and for delivering information regarding predicted layer pictures to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base layer/predicted layer images to obtain the final reconstructed images (R'n) 710, 810. Preliminary reconstructed and filtered base layer images may be output 709 from the first decoder section 552 and preliminary reconstructed and filtered base layer images may be output 809 from the first decoder section 554.

Herein, the decoder should be interpreted to cover any operational unit capable to carry out the decoding operations, such as a player, a receiver, a gateway, a demultiplexer and/or a decoder.

Figure 20:
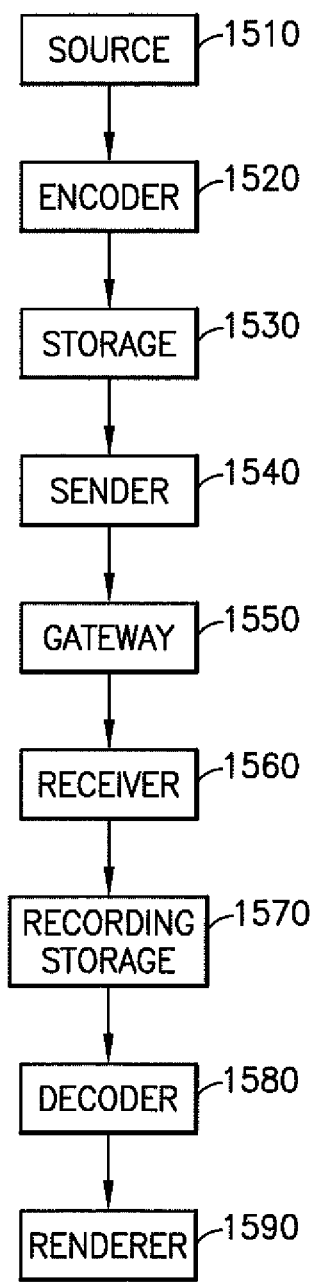
FIG. 20 shows a schematic diagram of an example multimedia communication system within which various embodiments may be implemented.

FIG. 20 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for switching between different viewports of 360-degree video content, view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for switching between different viewports of 360-degree video content, view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 1580 is multi-tasking and uses computing resources for other purposes than decoding the video bitstream. In another example, faster decoding operation might be needed when content is played back at a faster pace than the normal playback speed, e.g. twice or three times faster than conventional real-time playback rate.

In the above, some embodiments have been described in relation to several bitstreams encoded at or being of a particular quality. It needs to be understood that the picture sequences decoded from the these bitstreams need not be identical in content but have approximately similar quality level. Furthermore, embodiments can be realized also when bitstreams have different qualities.

In the above, some embodiments have been described in relation to first and second random access picture intervals. It needs to be understood that these random access picture intervals may vary over time. Embodiments have been described in relation to a second random access picture interval being an integer multiple of a first random access picture interval, but embodiments could be similarly realized when no such integer-multiple relation applies. In general, embodiments can be realized for any case where a sub-picture or tile set originates from a random-access picture and a collocated sub-picture or tile set (of the same time instance) originates from a non-random-access picture.

In the above, some examples and embodiments have been described in relation to the preselection descriptor of DASH. It needs to be understood that examples and embodiments could be similarly realized with the Preselection element or any other element providing similar functionality.

In the above, some embodiments have been described in relation to DASH or MPEG-DASH. It needs to be understood that embodiments could be similarly realized with any other similar streaming system, and/or any similar protocols as those used in DASH, and/or any similar segment and/or manifest formats as those used in DASH, and/or any similar client operation as that of a DASH client. For example, some embodiments could be realized with the M3U manifest format.

In the above, some embodiments have been described in relation to extractor track. It needs to be understood that any similar concepts, such as tile base track, could be used instead of extractor track.

In the above, some embodiments have been described in relation to ISOBMFF, e.g. when it comes to segment format. It needs to be understood that embodiments could be similarly realized with any other file format, such as Matroska, with similar capability and/or structures as those in ISOBMFF.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
    receiving a merged bitstream;
    decoding an indication that a first image segment in a coded picture at a first time instance of the merged bitstream is provided with a video coding layer network abstraction layer (VCL NAL) unit type indicative of a random access image segment;
    decoding an indication that a second image segment in the coded picture is provided with a VCL NAL unit type indicative of a non-random access image segment;
    decoding a picture level indication to conclude a picture type of the coded picture; and
    decoding the coded picture according to its picture type.

2. The method according to claim 1, further comprising:
decoding from the picture level indication that the picture type is a non-random access picture; and
decoding the coded picture as a non-random access picture.

3. The method according to claim 1, further comprising:
keeping track of a decoding initialization status on an image segment basis; and
initializing the decoding based on the VCL NAL unit types of an image segment.

4. The method according to claim 3, further comprising, responsive to image segments being uninitialized and the VCL NAL unit types of at least one image segment being indicative of non-random access image segments, omitting decoding of VCL NAL units of the at least one image segment.

5. The method according to claim 3, further comprising
responsive to the decoding of image segments being uninitialized and the VCL NAL unit type of at least one image segment being indicative of random access image segments, decoding VCL NAL units of the at least one image segment; and
inferring the decoding of the at least one image segment to be initialized.

6. The method according to claim 3, further comprising, responsive to the decoding of the image segment being initialized, decoding VCL NAL units of the image segment regardless of the VCL NAL unit types.

7. An apparatus comprising:
one or more processors; and
one or more memories storing instructions that, when executed by the one or more processors, cause the apparatus at least to perform:
receiving a merged bitstream;
decoding an indication that a first image segment in a coded picture at a first time instance of the merged bitstream is provided with a video coding layer network abstraction layer (VCL NAL) unit type indicative of a random access image segment;
decoding an indication that a second image segment in the coded picture is provided with a VCL NAL unit type indicative of a non-random access image segment;
decoding a picture level indication to conclude a picture type of the coded picture; and
decoding the coded picture according to its picture type.

8. The apparatus according to claim 7, wherein the one or more memories further store instructions that, when executed by the one or more processors, cause the apparatus at least to perform:
decoding from the picture level indication that the picture type is a non-random access picture; and
decoding the coded picture as a non-random access picture.

9. The apparatus according to claim 8, wherein the one or more memories further store instructions that, when executed by the one or more processors, cause the apparatus at least to perform:
keeping track of a decoding initialization status on an image segment basis; and
initializing the decoding based on the VCL NAL unit types of an image segment.

10. The apparatus according to claim 9, wherein the one or more memories further store instructions that, when executed by the one or more processors, cause the apparatus at least to perform:
omitting, responsive to image segments being uninitialized and the VCL NAL unit types of at least one image segment being indicative of non-random access image segments, decoding of VCL NAL units of the at least one image segment.

11. The apparatus according to claim 9, wherein the one or more memories further store instructions that, when executed by the one or more processors, cause the apparatus at least to perform:
responsive to the decoding of image segments being uninitialized and the VCL NAL unit type of the at least one image segment being indicative of random access image segments, decoding VCL NAL units of the at least one image segment; and
inferring the decoding of the at least one image segment to be initialized.

12. The apparatus according to claim 9, wherein the one or more memories further store instructions that, when executed by the one or more processors, cause the apparatus at least to perform: responsive to the decoding of the image segment being initialized, VCL NAL units of the image segment regardless of the VCL NAL unit types.

13. A computer program product includes a non-transitory computer-readable storage medium bearing instructions that, when executed by an apparatus, cause the apparatus to perform at least the following:
receiving a merged bitstream;
decoding an indication that a first image segment in a coded picture at a first time instance of the merged bitstream is provided with a video coding layer network abstraction layer (VCL NAL) unit type indicative of a random access image segment;
decoding an indication that a second image segment in the coded picture is provided with a VCL NAL unit type indicative of a non-random access image segment;
decoding a picture level indication to conclude a picture type of the coded picture; and
decoding the coded picture according to its picture type.

14. The computer program product according to claim 13, wherein the non-transitory computer-readable storage medium bears instructions that, when executed by the apparatus, cause the apparatus to perform at least the following:
decoding from the picture level indication that the picture type is a non-random access picture; and
decoding the coded picture as a non-random access picture.

15. The computer program product according to claim 14, wherein the non-transitory computer-readable storage medium bears instructions that, when executed by the apparatus, cause the apparatus to perform at least the following:
keeping track of a decoding initialization status on an image segment basis; and
initializing the decoding based on the VCL NAL unit types of an image segment.

16. The computer program product according to claim 15, wherein the non-transitory computer-readable storage medium bears instructions that, when executed by the apparatus, cause the apparatus to perform at least the following:
responsive to image segments being uninitialized and the VCL NAL unit types of at least one image segment being indicative of non-random access image segments, omitting the decoding of VCL NAL units of the at least one image segment.

17. The computer program product according to claim 15, wherein the non-transitory computer-readable storage medium bears instructions that, when executed by the apparatus, cause the apparatus to perform at least the following:
responsive to the decoding of image segments being uninitialized and the VCL NAL unit type of at least one image segment being indicative of random access image segments, decoding VCL NAL units of the at least one image segment; and inferring the decoding of the at least one image segment to be initialized.

18. The computer program product according to claim 15, wherein the computer-readable storage medium bears instructions that, when executed by the apparatus, cause the apparatus to perform at least the following: responsive to the decoding of the image segment being initialized, decoding VCL NAL units of the image segment regardless of the VCL NAL unit types.

* * * * *